US006480918B1

(12) United States Patent
McKenney et al.

(10) Patent No.: US 6,480,918 B1
(45) Date of Patent: Nov. 12, 2002

(54) LINGERING LOCKS WITH FAIRNESS CONTROL FOR MULTI-NODE COMPUTER SYSTEMS

(75) Inventors: Paul E. McKenney, Beaverton; Kevin A. Closson, Forest Grove, both of OR (US); Raghupathi Malige, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/219,229

(22) Filed: Dec. 22, 1998

(51) Int. Cl.[7] .............................. G06F 9/46; G06F 13/14

(52) U.S. Cl. ........................ 710/200; 709/104; 710/240; 710/241; 710/244; 710/260; 710/263

(58) Field of Search ................................ 709/100, 101, 709/102, 103, 104; 707/200, 202; 710/200, 240, 241, 244, 260, 261, 262, 263, 264

(56) References Cited

U.S. PATENT DOCUMENTS

| | | | | |
|---|---|---|---|---|
| 5,805,900 A | * | 9/1998 | Fagan et al. | 710/220 |
| 6,052,695 A | * | 4/2000 | Abe et al. | 707/202 |
| 6,105,085 A | * | 8/2000 | Farley | 710/41 |

OTHER PUBLICATIONS

Margaret H. Eich, "Graphic Directed Locking", IEEE Transaction of Software Eng., vol. 14, No. 2, Feb. 1988, p. 133–140.*

Marina Roesler, "Efficient Deadlock Resolution for Lock-Based Concurrency Control Schemes", *8th Intl. Conf. on Distributed Computing System, Jun. 13–17, 1988, IEEE 1988, p. 224–233.*

Suh–Yin Lee et al., "A Multi–Granularity Locking Model for Concurrency Control in Object–Oriented Database Systems", IEEE Transaction on Knowledge and data Engineering, vol. 8, No. 1, Feb. 1996, p. 144–156.*

Y.C. Tay, "Locking Performance in Centralized Database", ACM Transaction on Database System, vol. 10, No. 4, Dec. 1985, p. 415–462.*

Bach, "Multiprocessor Systems,"*The Design of the UNIX Operating System*, Prentice–Hall, Inc., pp. 1–3, 391–411 (© 1986).

(List continued on next page.)

*Primary Examiner*—Majid A. Banankhah
(74) *Attorney, Agent, or Firm*—Klarquist Sparkman Campbell Leigh & Whinston LLP

(57) ABSTRACT

The processors in a multiprocessor computer system are grouped into nodes. The processors can request a lock, but the lock is granted to only one processor at any given time to provide exclusive processor access to the resource protected by the lock. When a processor releases the lock, the lock is made available to another processor at the same node, even though a processor at a different node may have requested the lock earlier. To maintain fairness, the lock is forced to another node after granting a certain number of consecutive requests at a node or after a certain time period. In one embodiment, a specialized data structure representing a lock request from a processor at a particular node is placed into a queue. A later requesting processor can acquire a preemptive position in the queue by spinning on a data structure already in the queue if the data structure corresponds to the processor's node. To maintain fairness, the data structure is limited to a certain number of uses, after which additional processors are not permitted to spin on it. When the data structure has no more active spinners, it is dequeued, and the lock is made available to a processor spinning on the next structure in the queue. Logic for handling interrupts is included, and the bitfield arrangement of the data structure is tailored to the locking scheme. Preallocating data structures for the queue increases performance.

32 Claims, 32 Drawing Sheets

OTHER PUBLICATIONS

Bolosky et al., "Simple But Effective Techniques for NUMA Memory Management," *ACM SIGOPS Operating Systems Review*, 23:5; pp. 19–31 (Dec. 3–6, 1989).

Bonwick, "The Slab Allocator: an Object–Caching Kernal Memory Allocator," *Sun Microsystems* (1993).

Chapin, et al., "Memory System Performance of UNIX on CC–NUMA Multiprocessors," *Sigmetrics '95*, Computer Science Laboratory, Stanford University pp. 1–13 (1995).

Craig, "Building FIFO and Priority–Queuing Spin Locks from Atomic Swap," *Technical Report 93–02–02*, Department of Computer Science and Engineering, FR–35, University of Washington, pp. 1–29 (Feb. 1993).

Graunke et al., "Synchronization Algorithms for Shared-Memory Multiprocessors," *Computer*, pp. 60–69 (Jun. 1990).

Grunwald et al., "CustoMalloc: Efficient Synthesized Memory Allocators," *Software—Practice and Experience*, vol. 23(8), pp. 851–869 (Aug. 1993).

Lim, et al., "Reactive Synchronization Algorithms for Multiprocessors," *ASPLOS*, vol. 1 (© Oct. 1994).

McKenney, et al., "Efficient kernel Memory Allocation on Shared Memory Multiprocessors," 1993 Winter, *USENIX*, pp. 295–305, Jan. 25–29 (1993).

Magnusson et al., "Efficient Software Synchronization on Large Cache Coherent Multiprocessors," *SICS Research Report T94:07*, pp. 1–32 (Feb. 1994).

Mellor–Crummey et al., "Algorithms for Scalable Synchronization on Shared–Memory Multiprocessors," *ACM Transcations on Computer Systems*, 9:1, pp. 21–65 (Feb. 1991).

Mellor–Crummey et al., "Synchronization Without Contention," *ACM SIGARCH Computer Architecture News*, 19:2, pp. 269–278 (Apr. 1991).

Vahalia, "Synchronization and Multiprocessors," *UNIX® Internals the New Frontiers*, Prentice–Hall, Inc., pp. 1–3; 187–219 (© 1996).

Verghese et al., "Operating system support for improving data locality on CC–NUMA compute servers," *ACM SIGOPS Operating System Review*, 30:5, pp. 279–289 (Dec. 1996).

Wills, "Process Synchronization and Interprocess Communication," *The Computer Science and Engineering Handbook*, CRC Press, Ch. 79, pp. 1725–1746 (© 1997).

Wolski et al., "Program Partitioning for NUMA Multiprocessor Computer Systems," *Journal of Parallel and Distributed Computing*, vol. 19, pp. 203–218 (1993).

\* cited by examiner

INITIAL STATE

CPU 0 ACQUIRES LOCK, PART 1

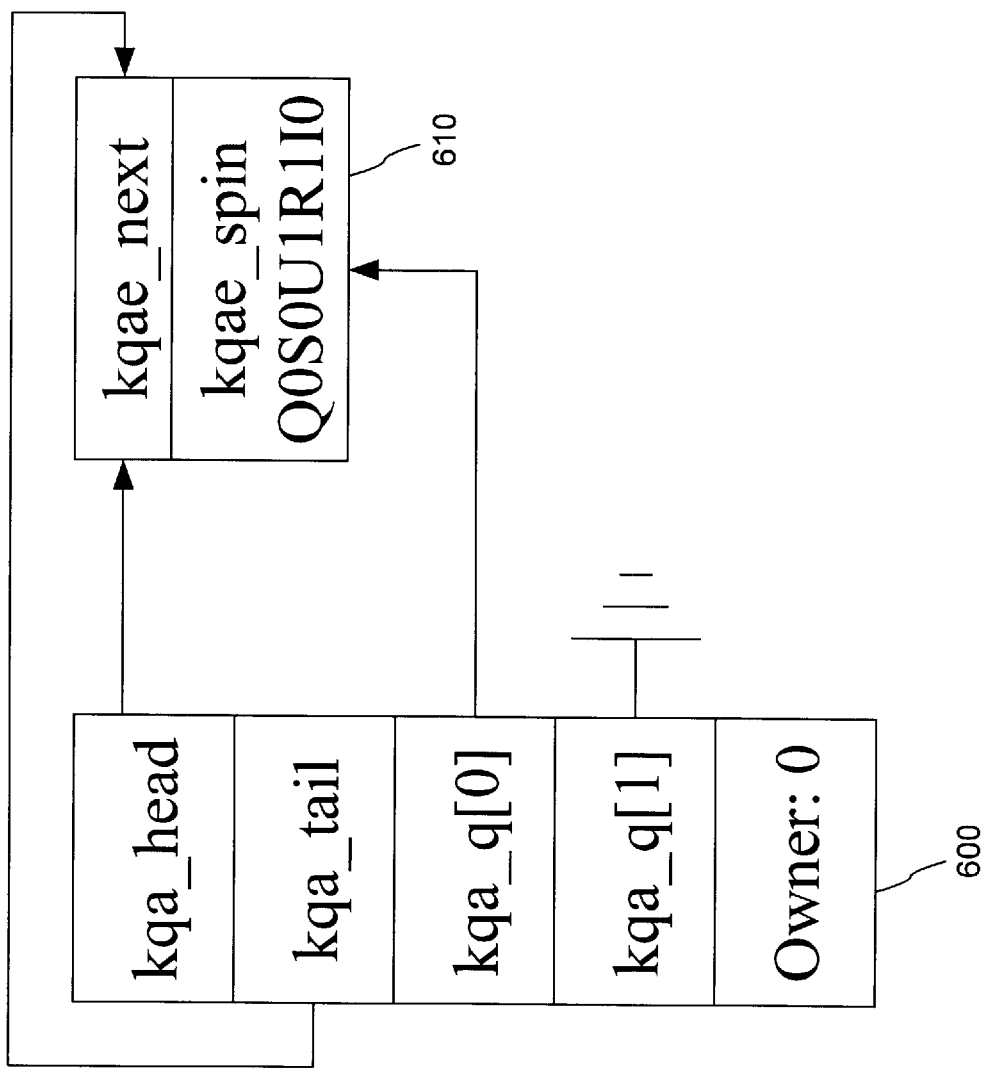
FIG. 11C  CPU 0 ACQUIRES LOCK, PART 2

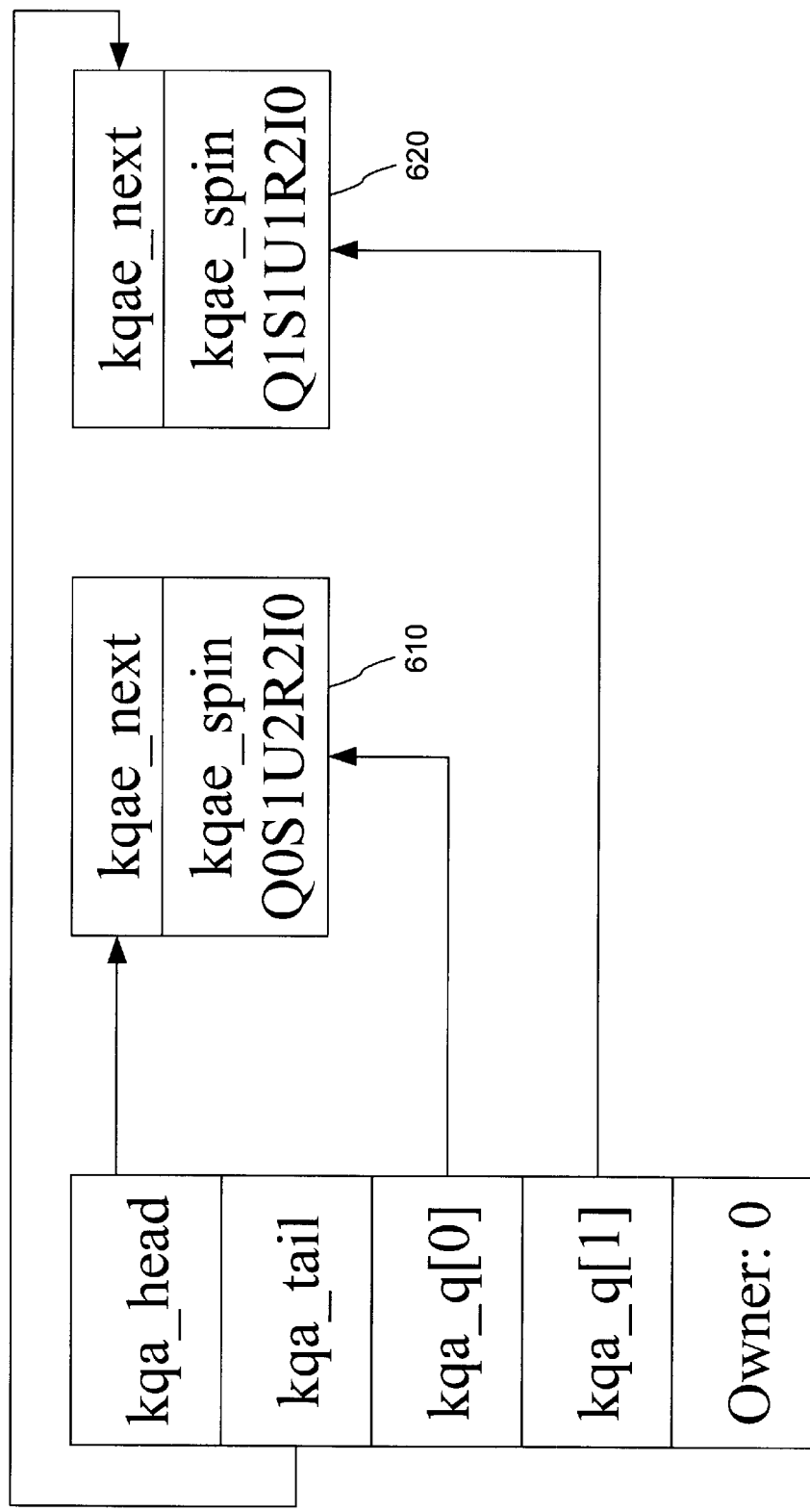

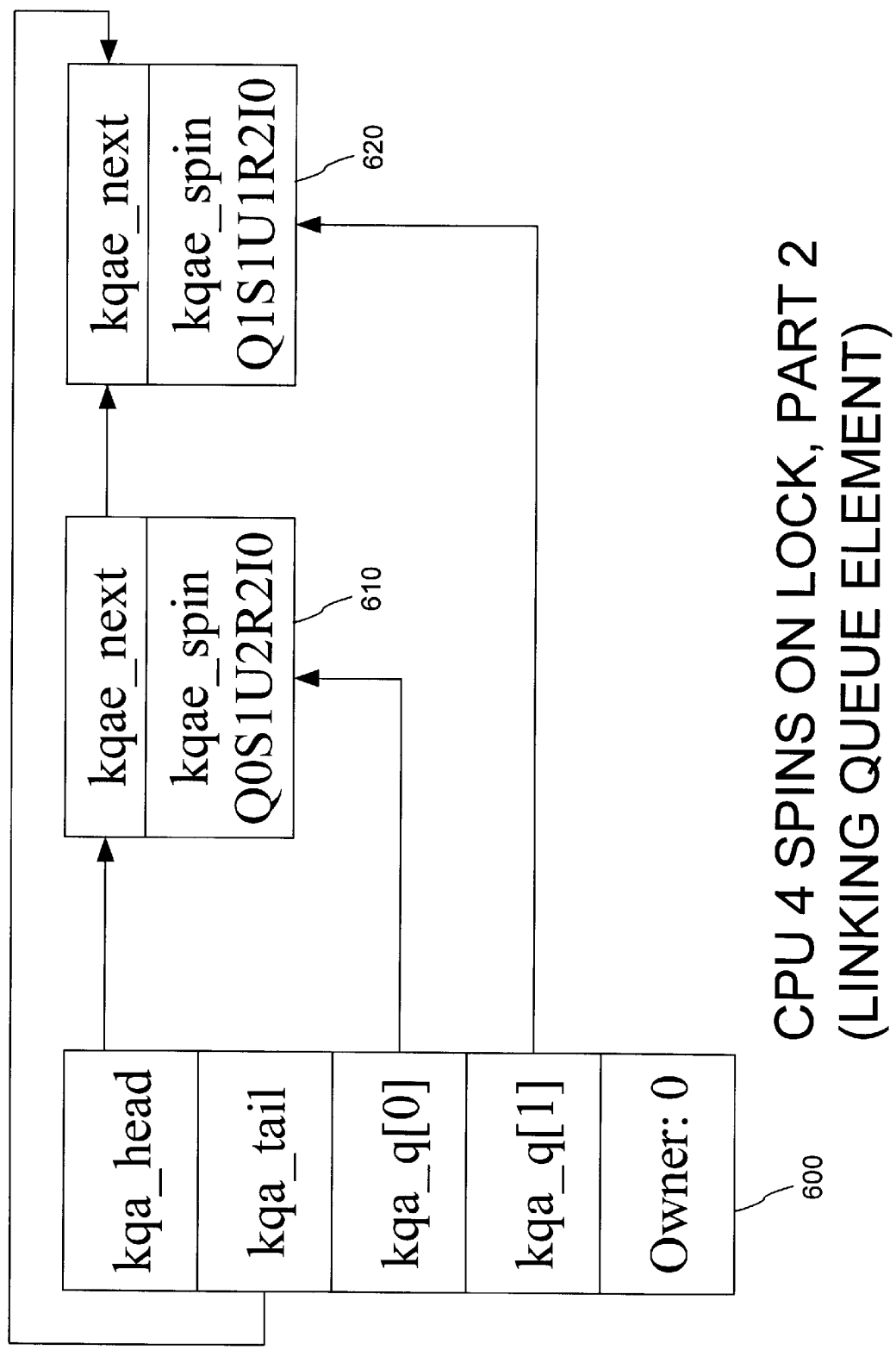

CPU 3 SPINS ON LOCK

CPU 0 RELEASES LOCK;
CPU 3 ACQUIRES LOCK

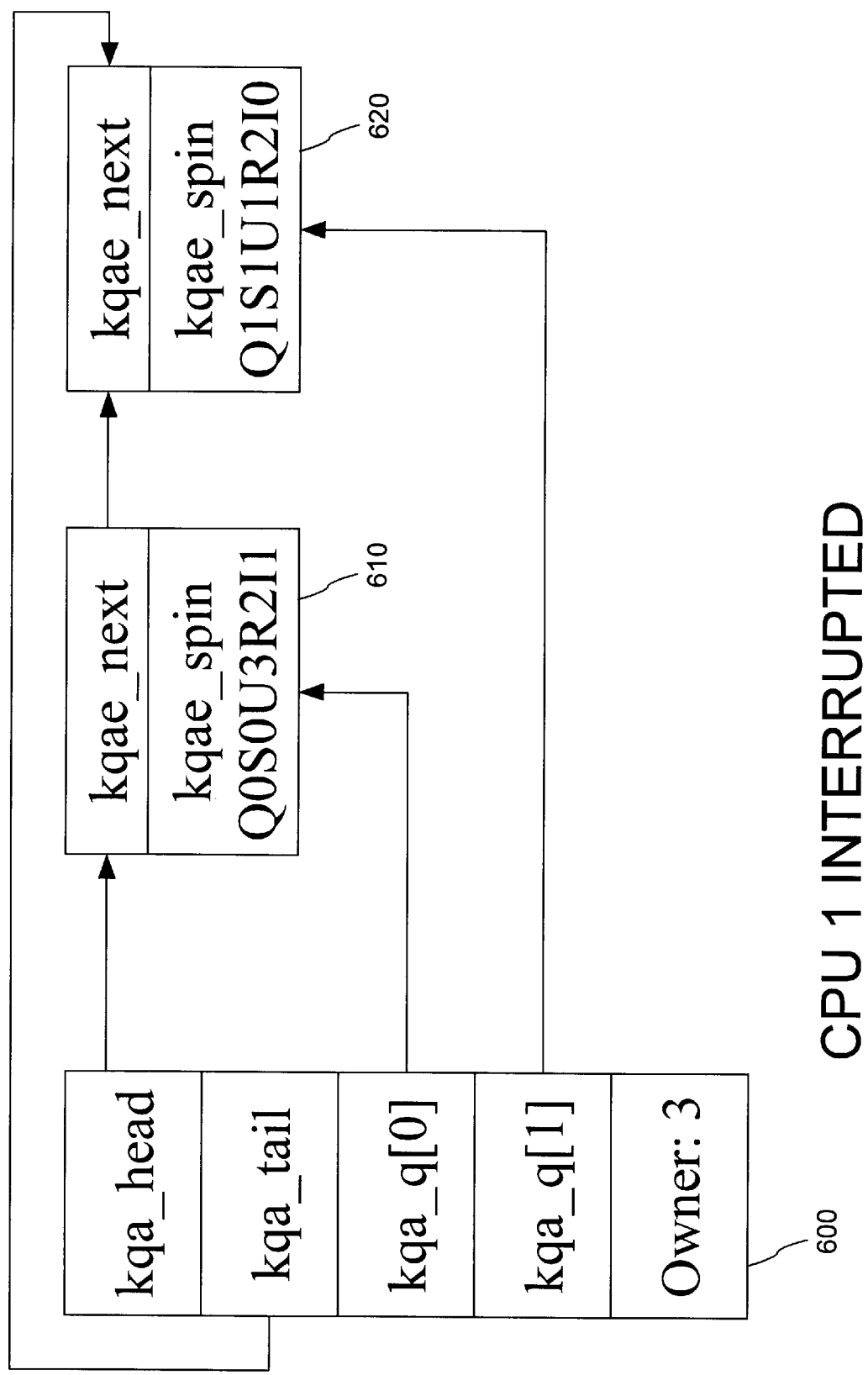

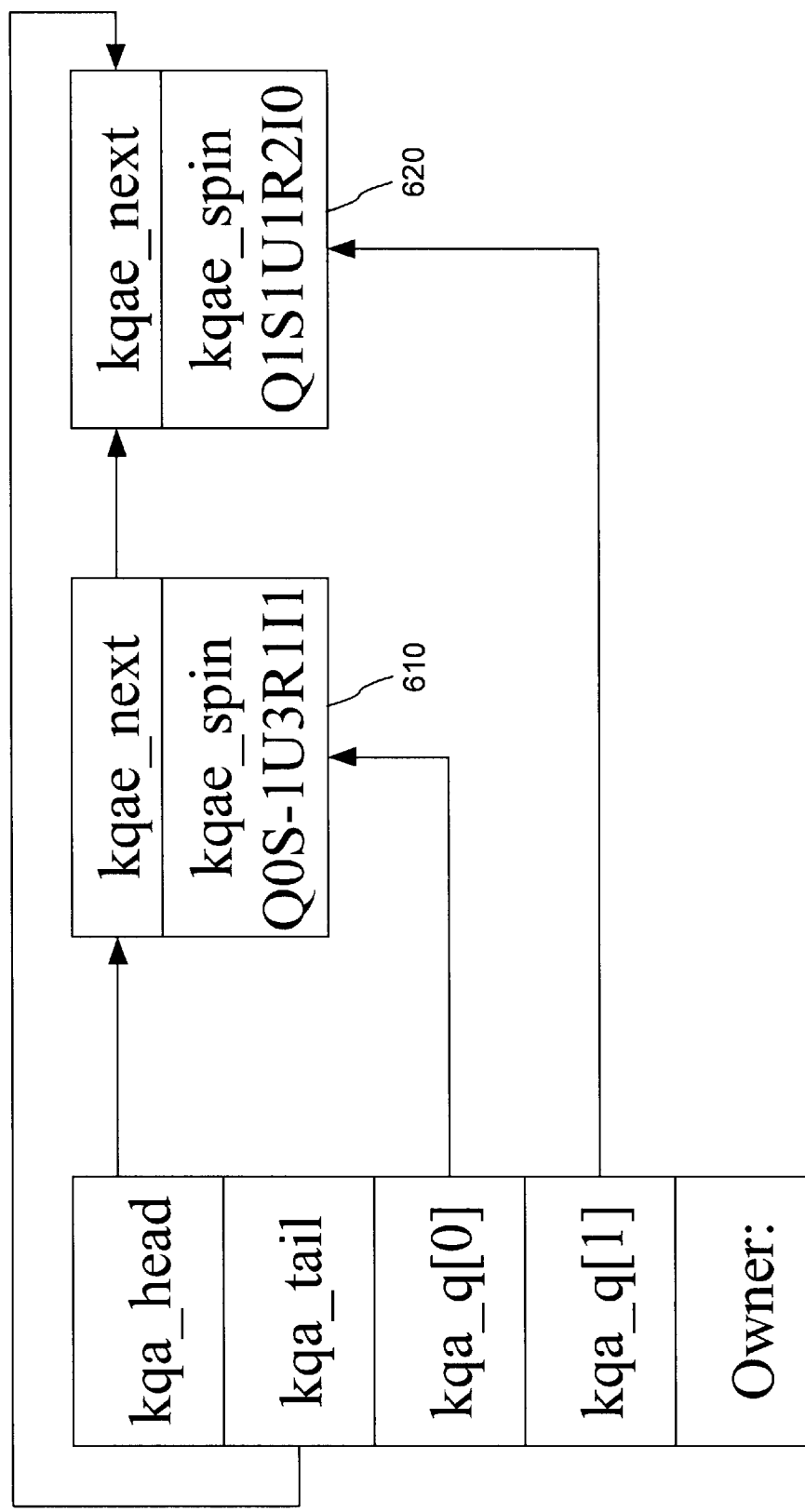
FIG. 11J  CPU 3 RELEASES LOCK, PART 1

CPU 3 RELEASES LOCK, PART 2;
CPU 4 ACQUIRES LOCK

CPU 1 RETURNS FROM INTERRUPT

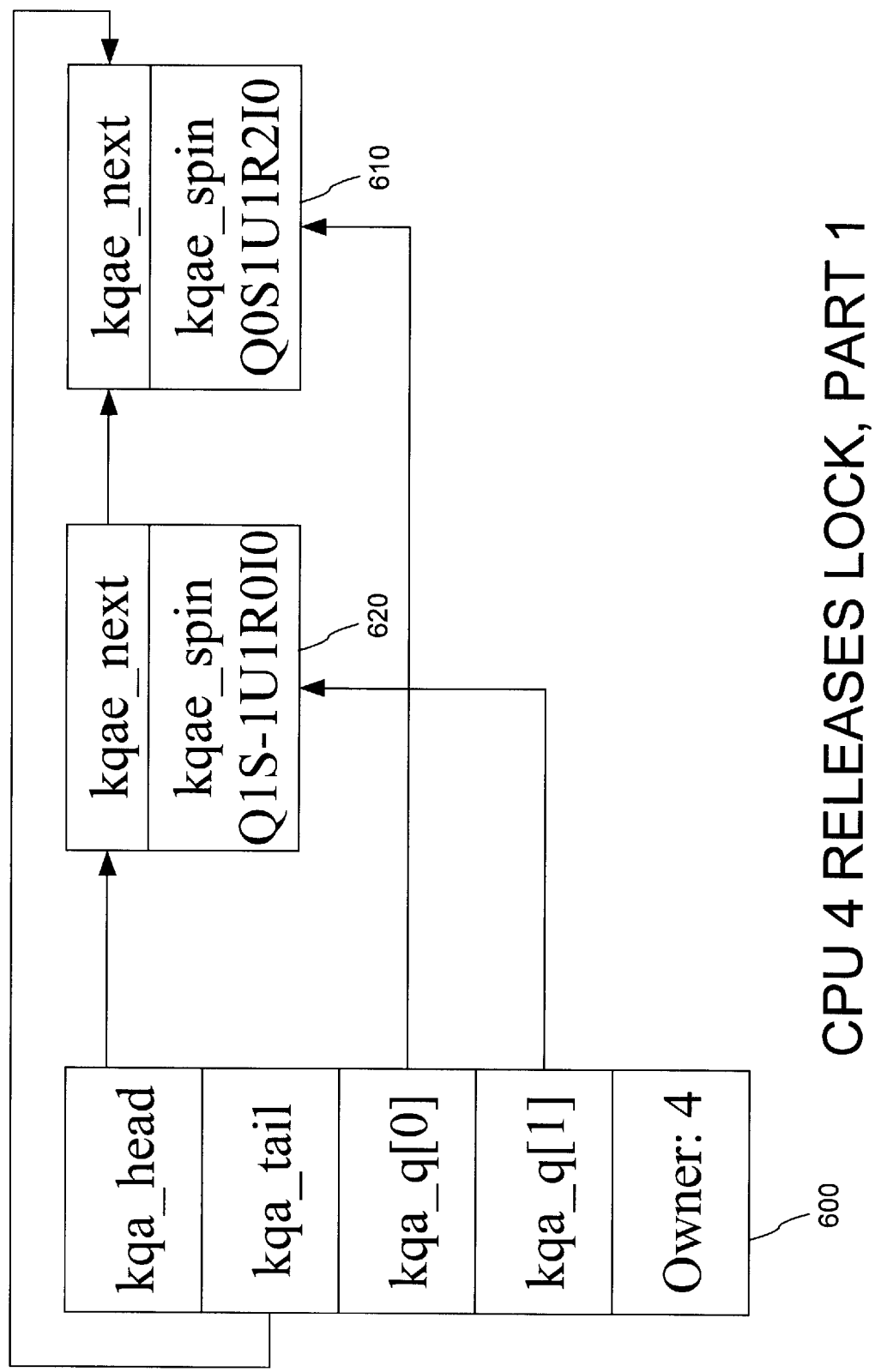

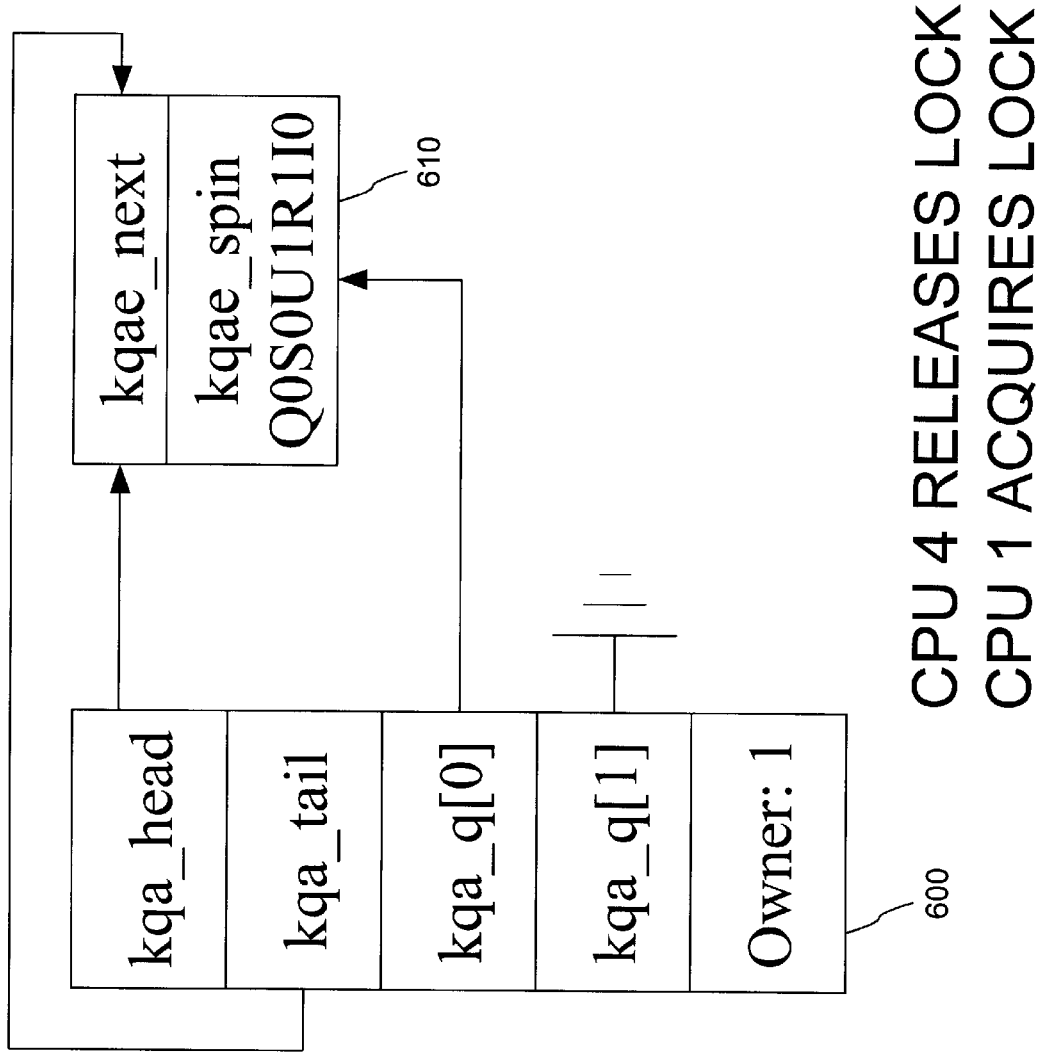
FIG. 11N  CPU 4 RELEASES LOCK, PART 2; CPU 1 ACQUIRES LOCK

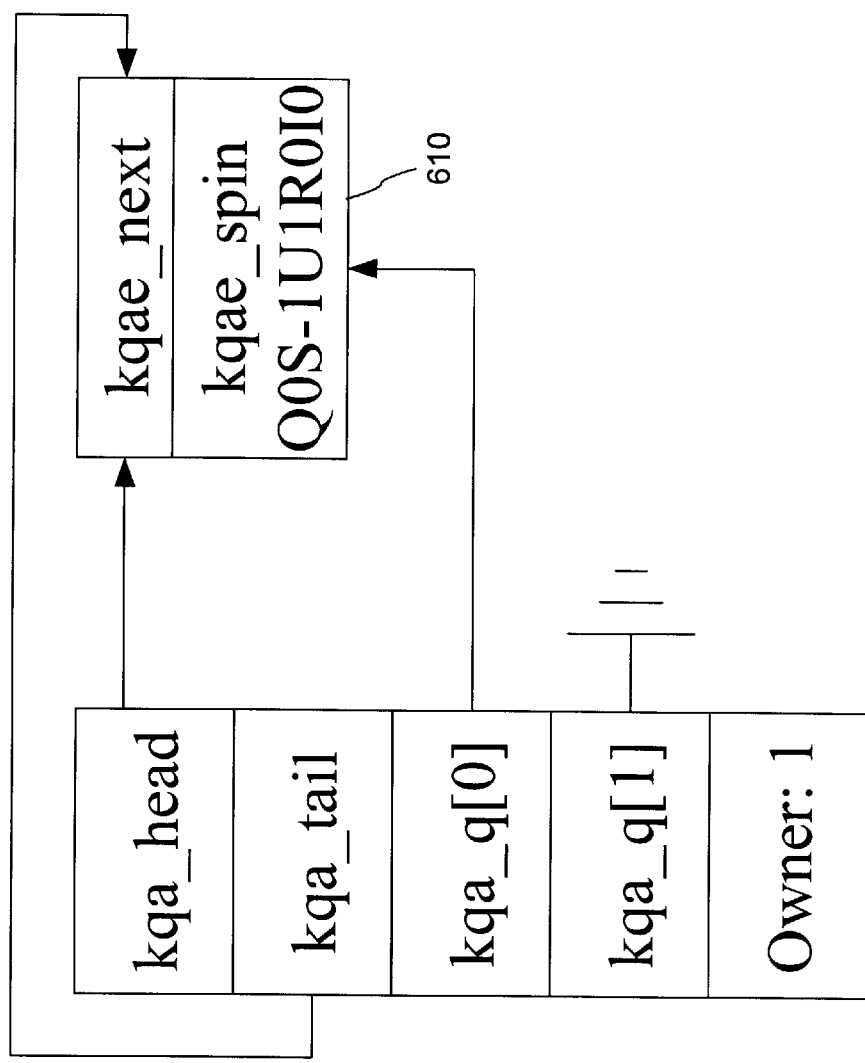

CPU 1 RELEASES LOCK, PART 2

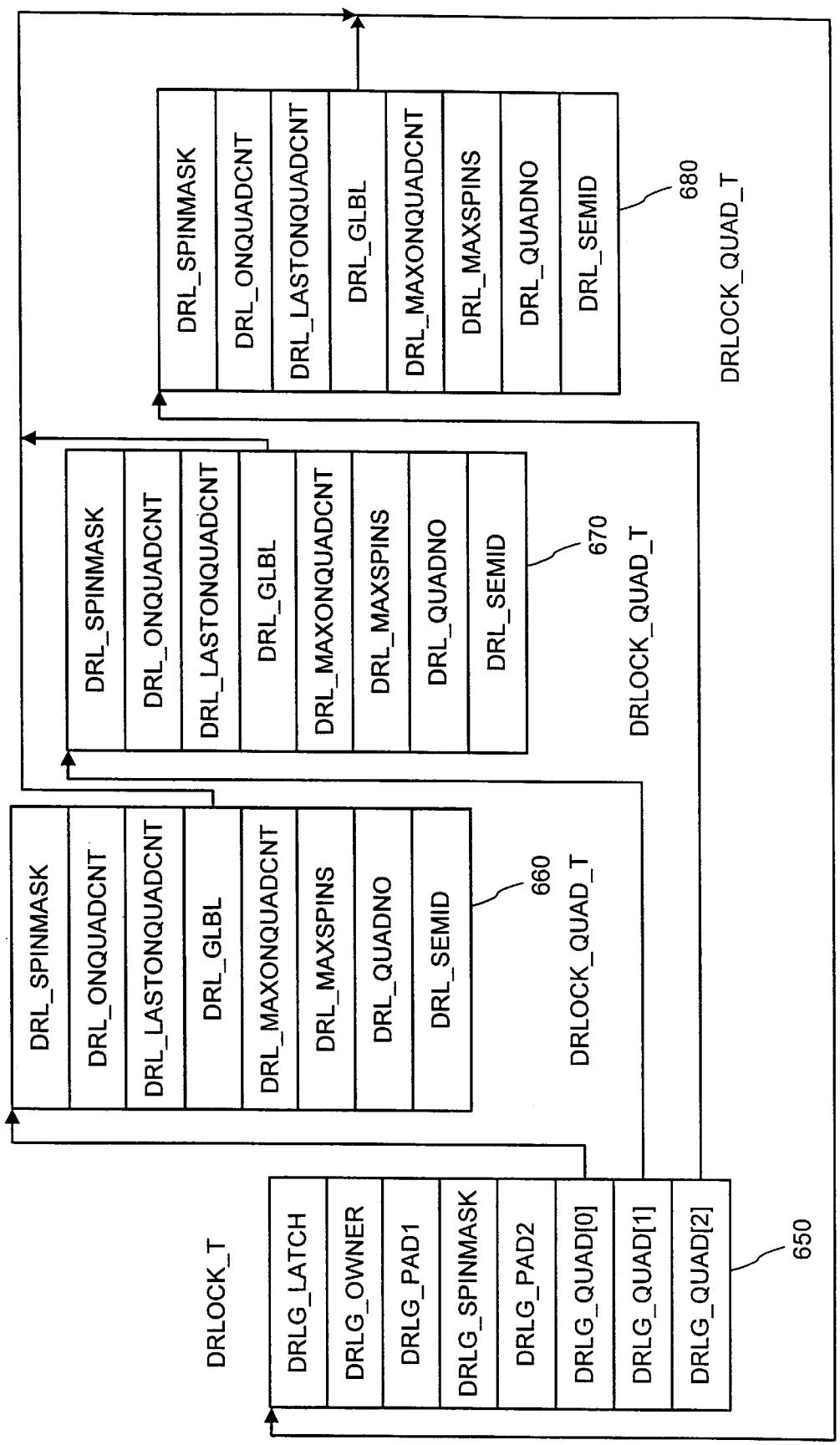

LINGERING LOCKS WITH FAIRNESS CONTROL FOR MULTI-NODE COMPUTER SYSTEMS

FIELD OF THE INVENTION

This invention relates generally to multiprocessor computers that are comprised of a number of separate but interconnected processor nodes. More particularly, this invention relates to a method for efficiently granting a lock to requesting processors while maintaining fairness among the processor nodes.

BACKGROUND OF THE INVENTION

Multiprocessor computers by definition contain multiple processors that can execute multiple parts of a computer program or multiple distinct programs simultaneously, in a manner known as parallel computing. In general, multiprocessor computers execute multithreaded programs or multiple concurrent single-threaded programs faster than conventional single processor computers, such as personal computers (PCs), that must execute programs sequentially. The actual performance advantage is a function of a number of factors, including the degree to which parts of a multithreaded program and/or multiple distinct programs can be executed in parallel and the architecture of the particular multiprocessor computer at hand.

Multiprocessor computers may be classified by how they share information among the processors. Shared memory multiprocessor computers offer a common physical memory address space that all processors can access. Multiple processes or multiple threads within the same process can communicate through shared variables in memory that allow them to read or write to the same memory location in the computer. Message passing multiprocessor computers, in contrast, have a separate memory space for each processor, requiring processes in such a system to communicate through explicit messages to each other.

Shared memory multiprocessor computers may further be classified by how the memory is physically organized. In distributed shared memory (DSM) machines, the memory is divided into modules physically placed near each processor. Although all of the memory modules are globally accessible, a processor can access memory placed nearby faster than memory placed remotely. Because the memory access time differs based on memory location, distributed shared memory systems are also called non-uniform memory access (NUMA) machines. In centralized shared memory computers, on the other hand, the memory is physically in one location. Centralized shared memory computers are called uniform memory access (UMA) machines because the memory is equidistant in time from each of the processors. Both forms of memory organization typically use high-speed cache memory in conjunction with main memory to reduce execution time. An alternative form of memory organization in an UMA machine involves groups of processors sharing a cache. In such an arrangement, even though the memory is equidistant from all processors, data can circulate among the processors sharing a cache with lower latency than among processors not sharing a cache.

Multiprocessor computers with distributed shared memory are organized into nodes with one or more processors per node. Also included in the node are local memory for the processors, a remote cache for caching data obtained from memory in other nodes, and logic for linking the node with other nodes in the computer. A processor in a node communicates directly with the local memory and communicates indirectly with memory on other nodes through the node's remote cache.

For example, if the desired data is in local memory, a processor obtains the data directly from a block (or line) of local memory. But if the desired data is stored in memory in another node, the processor must access its remote cache to obtain the data. Further information on multiprocessor computer systems in general and NUMA machines in particular can be found in a number of works including *Computer Architecture: A Quantitative Approach* ($2^{nd}$ Ed. 1996), by D. Patterson and J. Hennessy, which is incorporated herein by reference.

Although the processors can often execute in parallel, it is sometimes desirable to restrict execution of certain tasks to a single processor. For example, two processors might execute program instructions to add one to a counter. Specifically, the instructions could be the following:

1. Read the counter into a register.
2. Add one to the register.
3. Write the register to the counter.

If two processors were to execute these instructions in parallel, the first processor might read the counter (e.g., "5") and add one to it (resulting in "6"). Since the second processor is executing in parallel with the first processor, the second processor might also read the counter (still "5") and add one to it (resulting in "6"). One of the processors would then write its register (containing a "6") to the counter, and the other processor would do the same. Although two processors have executed instructions to add one to the counter, the counter is only one greater than its original value.

To avoid such an undesirable result, some computer systems provide a mechanism called a lock for protecting sections of programs. When a processor requests the lock, it is granted to that processor exclusively. Other processors desiring the lock must wait until the processor with the lock releases it. A common arrangement is to require possession of a particular lock before allowing access to a designated section of a program; the processor then releases the lock when it is finished with the section. The section is thereby protected by the lock.

Accordingly, when a processor has acquired the lock, the processor is guaranteed that it is the sole processor executing the protected code.

To solve the add-one-to-a-counter scenario described above, both the first and the second processors would request the lock. Whichever processor first acquires the lock would then read the counter, increment the register, and write to the counter before releasing the lock. The remaining processor would have to wait until the first processor finishes, acquire the lock, perform its operations on the counter, and release the lock. In this way, the lock guarantees the counter is incremented twice if the instructions are run twice, even if processors running in parallel execute them.

Program instructions requiring exclusive execution are grouped into a section of program code called a critical section or critical region. Typically, the operating system handles the details of granting and releasing the lock associated with the critical section, but critical sections can also be implemented using user-level functions.

Accordingly, when code in a critical section is executing, the lock guarantees no other processors are executing the same code. To prevent the add-one-to-a-counter problem. in the above example, the program instructions for manipulating the counter could be grouped into a critical section.

Locks are useful for solving a wide variety of other problems such as restricting concurrent data structure access to a single processor to avoid data inconsistency. For more information on locks and related topics, see "Process Synchronization and Interprocess Communication" in *The Computer Science and Engineering Handbook* (1996) by A. Tucker, CRC Press, pages 1725–1746, which is incorporated herein by reference.

A typical scheme for managing lock requests is to use a first-come-first-served queued lock design. Under this design, the operating system grants a lock to the first requesting processor, queues subsequent requests by other processors until the first processor finishes with the lock, and grants the lock to processors waiting in the queue in order. However, a first-come-first-served scheme has certain drawbacks relating to performance.

For example, if the architecture of the multiprocessor system groups processors into nodes, communication latencies between processors in two different nodes are typically greater than that for processors in the same node. Accordingly, it is typically more expensive in terms of processing resources to move the lock from a processor in one node to a processor in another node. However, if a multiprocessor system implements a first-come-first-served queued lock scheme, each lock request might result in a lock trip between the nodes under certain conditions. Since each inter-node lock trip is expensive, lock synchronization can consume tremendous processing resources, leaving less resources for completing program tasks. As a result, a first-come-first served scheme may exhibit poor performance.

To reduce lock synchronization overhead, a variation of the queued lock scheme grants the lock to the next processor in the queue at the same node at which the lock was most recently released. In other words, the lock is kept in the node until all processors in the node with outstanding lock requests have been granted the lock. In this way, the scheme avoids some inter-node lock trips. In certain applications, critical sections are rare enough that this variation works well. However, under some circumstances, a particular node can become saturated with lock requests. Processors outside the saturated node are unable to acquire the lock in a reasonable time, so certain tasks or programs perform poorly while others enjoy prolonged access to the lock. The processors unable to acquire the lock are said to be subjected to starvation due to unfair allocation of the lock.

SUMMARY OF THE INVENTION

In accordance with the invention, a method of granting a lock to requesting processors tends to keep the lock at a particular node but maintains fairness among the nodes. When a lock is released by a first processor, the lock is kept at the node if there is an outstanding lock request by a second processor at the same node, even if other processors at other nodes requested the lock before the second processor. However, fairness control prevents starvation of the other nodes by limiting how the lock is kept at the node according to some criterion (e.g., by limiting the number of consecutive lock grants at a node or limiting the time a lock can be kept at a node).

In one aspect of the invention, logic for handling lock requests of interrupted processors is incorporated into the scheme. For example, lock requests by interrupted processors are ignored when determining when to keep the lock at a node.

In another aspect of the invention, a specialized data structure may be used to represent lock requests. The data structure can be placed in a queue, and the fields are arranged to prevent corrupting other fields in the data structure when atomic operations related to locking are performed on the data structure. A spin state field is crafted to fit within 32 bits.

In yet another aspect of the invention, before a lock is requested, data structures representing requests for the lock are preallocated to avoid having to allocate structures when the lock is requested.

In yet another aspect of the invention, the locking scheme avoids excess remote memory accesses by the processors by allowing processors to spin on a field local to the node, thereby enhancing performance.

In still another aspect of the invention, threads are blocked if they spin on the lock for more than a predetermined maximum amount of time. When the lock is circulated to a node, the processors at the node are unblocked.

The detailed description sets forth two detailed illustrative embodiments: a kernel-level locking implementation and a user-level locking implementation. In the kernel-level embodiment, a method for queuing lock requests generally keeps the lock at a node while maintaining fairness among the nodes by tracking lock requests in a specialized queue. A processor requesting the lock can acquire a preemptive position in the queue if another processor at the same node has placed a queue element in the queue and the queue element has not been used more than a predetermined maximum number of times. The queuing method handles interrupted processors, requeuing them if passed over while servicing an interrupt.

In the user-level embodiment, a method of keeping the lock at a node employs a round-robin lock scheme that circulates the lock among the nodes, generally keeping the lock at a. node while maintaining fairness among the nodes. A specialized data structure tracks which nodes have processors holding the lock or attempting to acquire the lock.

Although the illustrated embodiments portray the invention implemented in a NUMA machine in which each node has local memory, a lingering lock scheme can be applied to machines having other memory organization designs. Any processor interconnection design wherein processors are grouped so processors within a group have significantly lower communications latencies (e.g., an UMA machine in which processors are grouped to share cache) can benefit from the described lingering lock scheme. The term "node" includes any such grouping of processors as well as a NUMA machine node.

Additional aspects and advantages of the invention will become apparent with reference to the following description which proceeds with reference to the accompanying drawings.

BRIEF DESCRIPTION OF THE DRAWINGS

FIG. 12 is a block diagram showing the overall data structure arrangement for a user-level distributed round-robin locking scheme.

DETAILED DESCRIPTION OF ILLUSTRATIVE EMBODIMENTS

The invention has been implemented within a multiprocessor computer system such as the one shown and described herein. It should be readily recognized from this disclosure however, that the invention is not limited to this implementation but can be applied in any suitable computer system having multiple nodes, wherein communications latencies between processing units within a node are lower than the communications latencies between processing units in different nodes.

Figure 1:
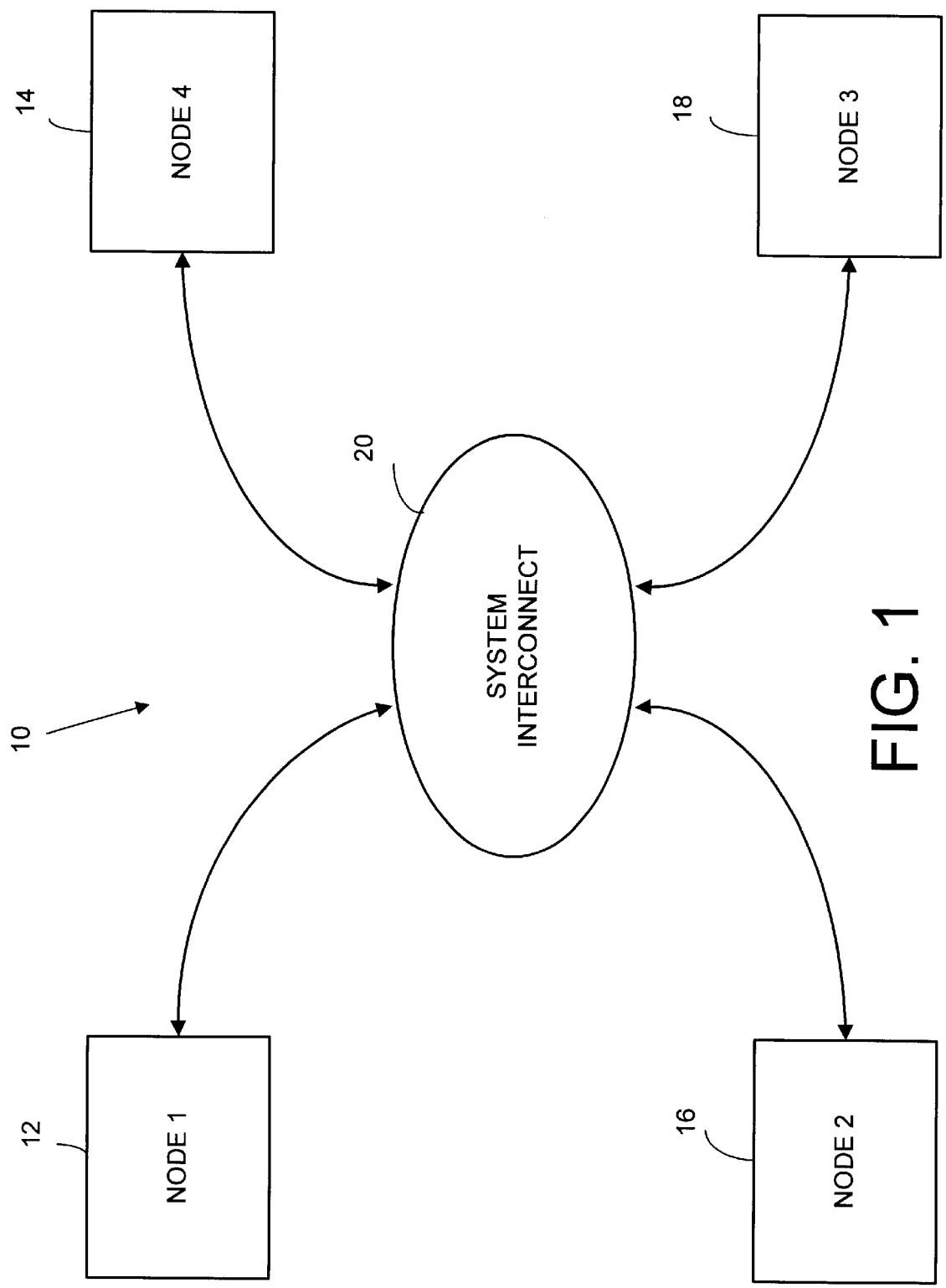
FIG. 1 is a block diagram of a multiprocessor computer having multiple nodes, with a system interconnect coupling the nodes together.

FIG. 1 is a block diagram of a multiprocessor computer system 10 that uses a computer architecture based on distributed shared memory (DSM). This type of computer system is also known as a NUMA machine. Four nodes 12, 14, 16, and 18 are shown connected by a system interconnect 20 (i.e., a network) that permits any node to communicate with any other node. The purpose of system interconnect is to allow processors in any node to directly and transparently access the physical memory that resides in any other node. System interconnect 20 is a switch-based network that in the illustrative embodiment uses the Scalable Coherent Interface (SCI) interconnection mechanism. SCI is an IEEE-approved standard that is well documented in a number of publications including IEEE Std 1596–1992 (Aug. 2, 1993) and *Multiprocessor Interconnection Using SCI*, a Master Thesis by Ivan Tving, DTH ID-E 579 (1994), both of which are incorporated herein by reference. A multiprocessor computer system using the SCI mechanism is shown and described in U.S. Pat. No. 5,802,578, which is also incorporated herein by reference.

The physical links of interconnect 20 provide high bandwidth and low latency and are scalable to allow for the addition of more nodes. Links that meet these requirements presently include point-to-point interconnects with a data throughput of one gigabyte/second or greater. The links can be configured in any number of suitable ways for connecting nodes 12, 14, 16, and 18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin—Madison, which is incorporated herein by reference.

Node Overview

Figure 2:
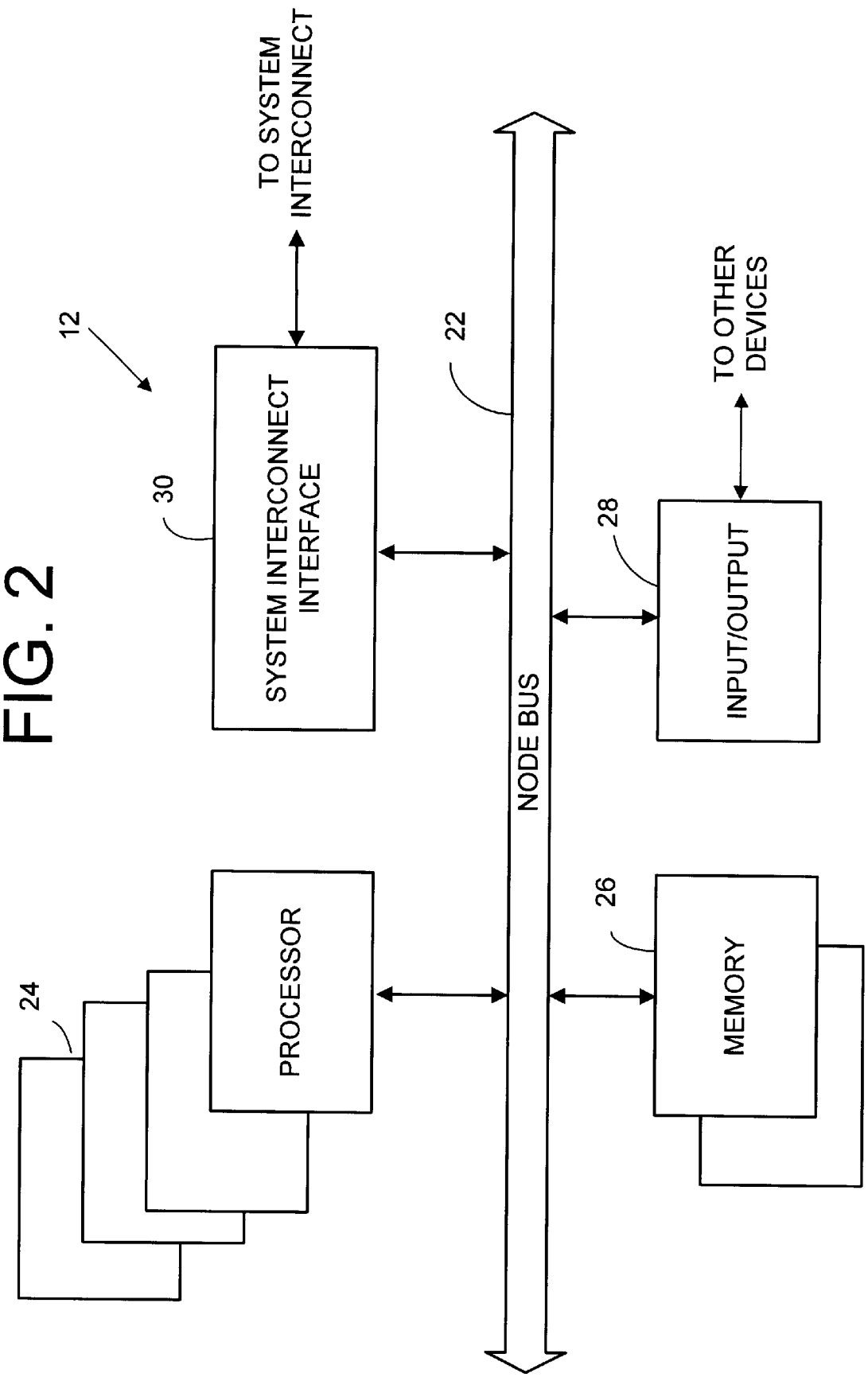
FIG. 2 is a block diagram of one of the nodes of the multiprocessor computer of FIG. 1.

A block diagram of node 12 on system 10 is shown in FIG. 2. The node includes a symmetric multiprocessor (SMP) node bus 22 for connecting multiple data processors 24 to local memory 26 (a computer-readable medium). For clarity, nodes 12, 14, 16, and 18 may be referred to as home nodes or remote nodes. A home node is one whose local memory stores a memory block of interest (i.e., the physical address of the memory block falls within the address range supported by the local memory or cache); all of the other nodes are then remote nodes with respect to that memory block. Additionally, a node may be a requesting node or a responding node. A requesting node is one requesting data; a responding node is one furnishing requested data. Input/output (I/O) device 28, which is also connected to bus 22, connects the node to devices outside computer system 10 for communicating information between the computer system and the outside world. I/O device 28 may be of conventional design and includes means for connecting the node. (and hence system 10) to personal computers, local area networks, etc., that wish to communicate with the computer system 10. The I/O device 28 may also allow for connection to peripheral devices, such as floppy disks, hard disks, CD-ROMs, etc., and other computer-readable media. To connect node 12 to the other nodes in the system, the node includes a system interconnect interface 30. The system interconnect interface forms part of interconnect 20 along with the physical links between nodes and the interface devices on the other nodes of the computer system 10. In the illustrative embodiment, interface 30 is constructed to implement the SCI standard for data communication between the nodes, allowing a processor on one node to transparently. access memory physically located on another node. The interface also contains a remote cache in the illustrative embodiment, although the remote cache could also be separate from the system interconnect interface.

Although a processing unit in one node can access the memory of another node, inter-node communication exhibits higher latencies (i.e., is slower) than intra-node communication.

Operating System Overview

Figure 3:
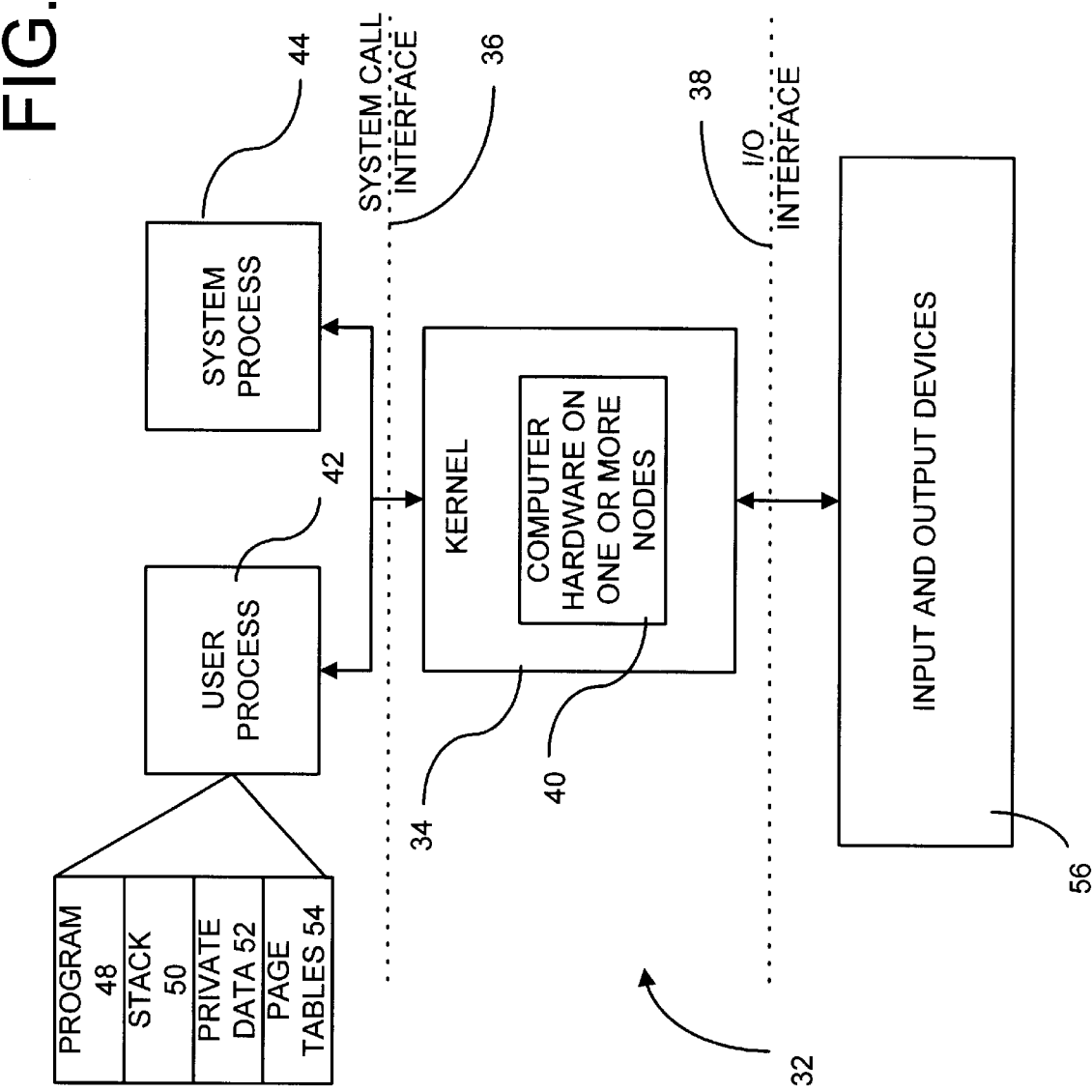
FIG. 3 is a block diagram of how an operating system for the system of FIG. 1 operates with multiple processes.

FIG. 3 shows an operating system 32 for computer system 10, which includes a kernel 34, a system call interface 36 and an I/O interface 38 to input/output devices 56. The same operating system environment exists on the other nodes. The illustrated operating system is a UNIX-based operating system, although other operating systems may also be used. The kernel 34 (which is the heart of the operating system 32) is a program stored in memory 26 on one or more nodes. Memory 26, processors 24, and other hardware shown in FIG. 3 are used for running the kernel 34 and are shown generally as computer hardware 40. The kernel 34 is responsible for controlling the computer system's resources and scheduling user requests so that each user request receives a fair share of the system resources. A system resource can be, for example, a lock, an I/O device, a shared memory segment, a file, a process, a processing unit, etc.

Requests are generated by one or more processes, such as user process 42 and system process 44 that run on computer system 10. User process 42 includes a part of a program 48 (i.e., instructions) and an execution environment for running the program. For example, process 42 includes several components, such as a stack 50, private data 52 for storing local variables, and page tables 54 used to define physical memory associated with the process. Although two processes 44 and 42 are shown, any number of processes may run on the node at one time. The processes make requests to the kernel 34 through system calls which are passed to the kernel by the system call interface 36. Processes execute in parallel to the extent they can be run concurrently on the different processors of the system 10.

In an illustrated embodiment of the invention, the operating system 32 provides several functions (also known as primitives) that are used in system processes for managing locks. These primitives work with unique data structures to respond to lock requests, lock releases, and interrupts in an efficient way while avoiding lock starvation at any one node.

Broad Overview and Simple Example of the Lingering Lock Scheme

Figure 4:
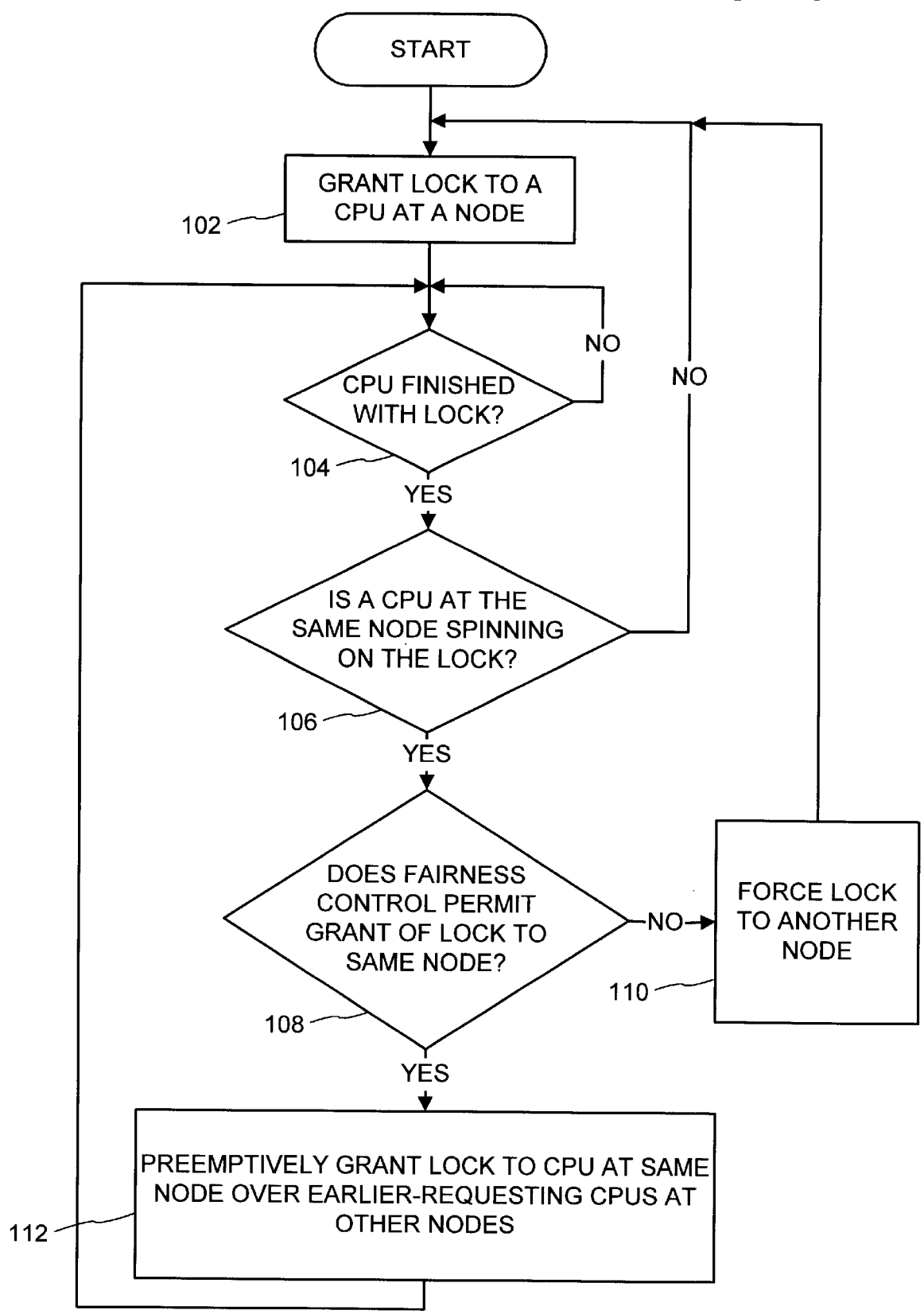
FIG. 4 is a flowchart showing operation of a basic lingering lock scheme with fairness control for implementation on the system of FIG. 1.

A method in accordance with the invention for granting a lock in a lingering lock scheme with fairness control is illustrated generally in the flowchart of FIG. 4. The lock is granted to a requesting processing unit at a node (step 102). The method waits until the processing unit is finished with (i.e., releases) the lock (step 104). The releasing processing unit's node is then checked to see if there are any other processing units at the node spinning on the lock (step 106). If so, some fairness control (e.g., consecutive lock grants at the node or a timing control) is consulted to determine if it is permitted to grant the lock at the same node (step 108). If not, the lock is granted to a processing unit at another node (step 110). If so, the lock is preemptively granted to a processing unit at the same node, even if other processing units at other nodes requested the lock earlier (step 112).

Another illustrative example of a lingering lock scheme in accordance with the invention is shown implemented in a system with three nodes (nodes 0–2) each having four: processing units (P0–P11) in FIGS. 5A–5D. In the example, fairness control has been set to permit a maximum of two preemptions for expository convenience.

Figure 5A:
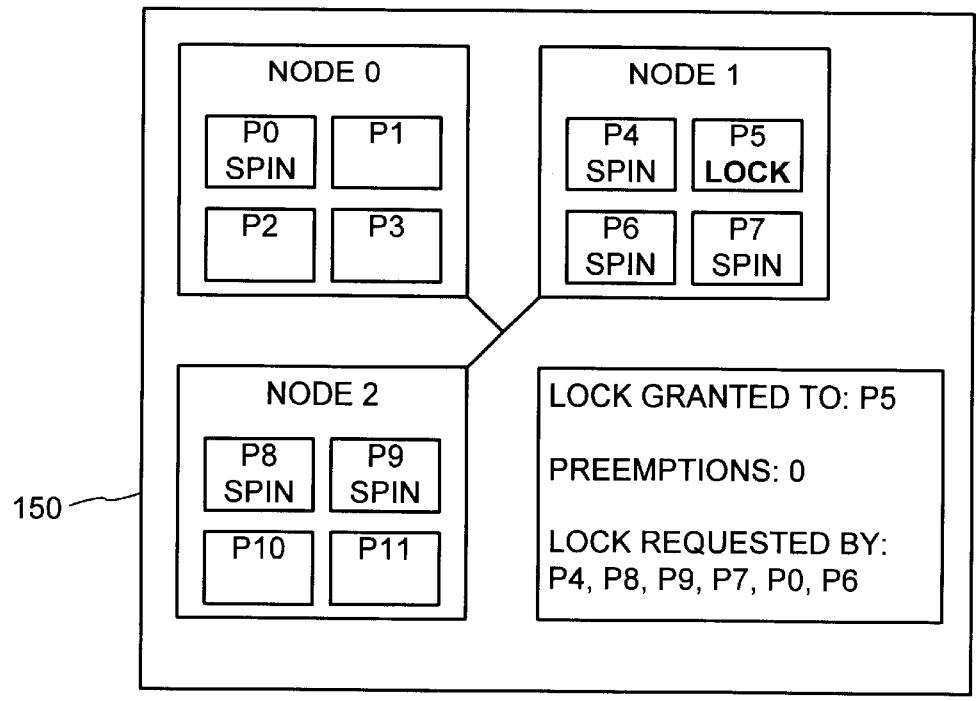
FIGS. 5A–5D are block diagrams showing intra- and inter-node lock movement according to the scheme of FIG. 4.
Figure 5B:
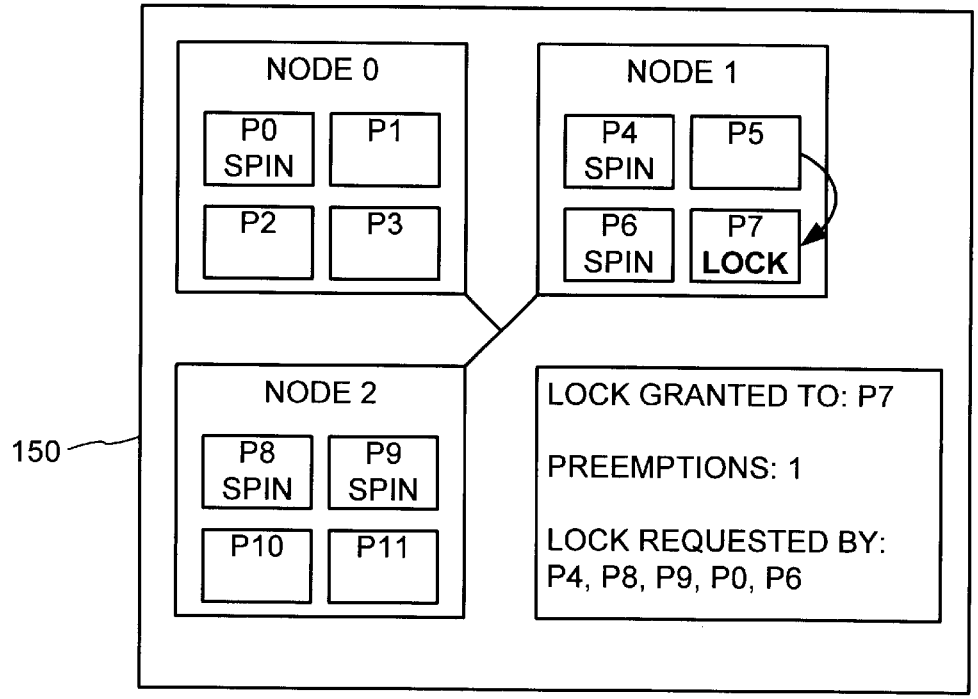

In FIG. 5A, the lock is currently held by processing unit P5 and has been requested by processing units P4, P8, P9, P7, P0, and P6, in the order listed. When processing unit P5 releases the lock, it is passed to processing unit P7 as shown in FIG. 5B, even though processing units at other nodes (i.e., P8 and P9) requested the lock before P7. In this way, an inter-node lock trip is avoided.

In the example, a first-come-first-served discipline is not enforced within a node. Thus, unit P7 was granted the lock even though processing unit P4 requested the lock first and was at the same node. An alternative embodiment could implement such a first-come-first-served discipline.

Figure 5C:
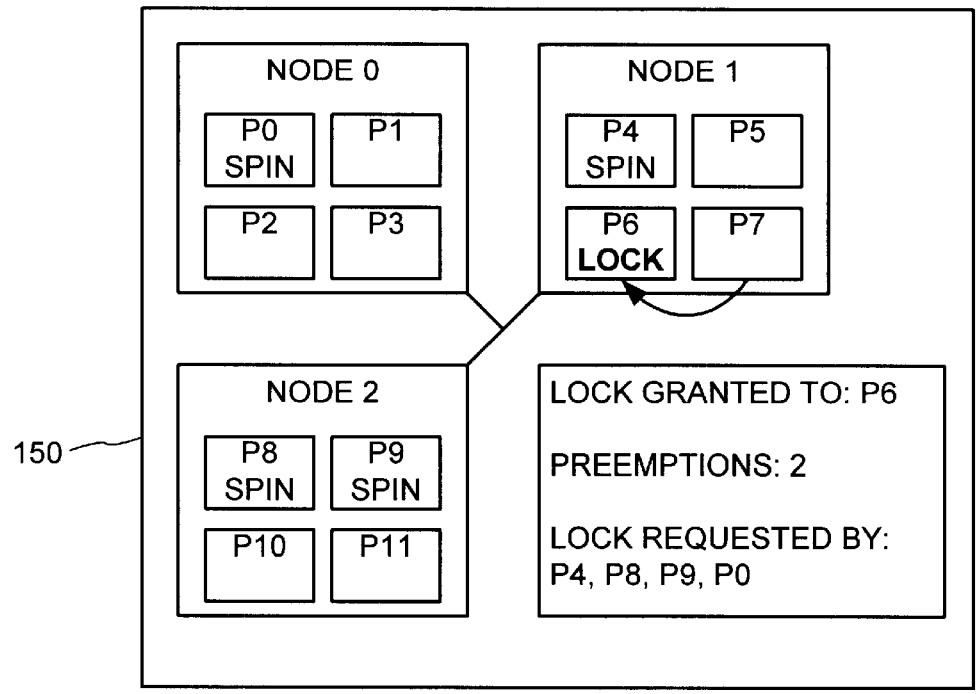

Next, as shown in FIG. 5C, the lock is passed to processing unit P6, even though processing units P8, P9, and P0 requested the lock before P6. In this way, another inter-node lock trip is avoided.

Figure 5D:
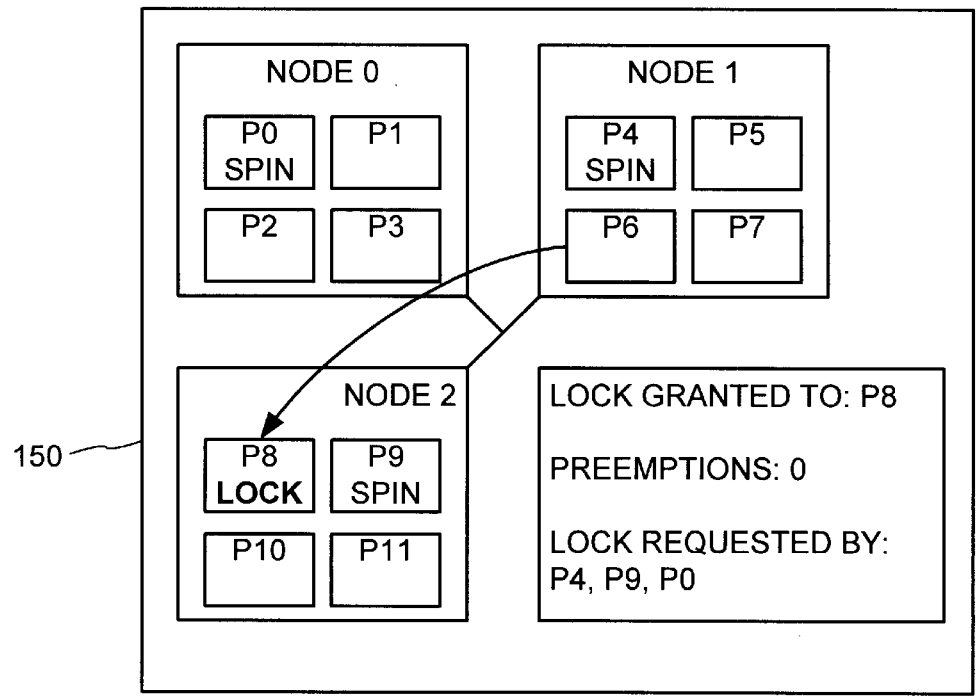

However, when processing unit P6 releases the lock, the maximum number of preemptions (i.e., 2 in the example) has been reached, so the lock is passed off to another node. As shown in FIG. 5D, the lock is acquired by processing unit P8 in an inter-node lock trip. In this way, fairness is maintained among the nodes, and node 2 does not experience starvation.

Kernel-level Lingering Lock Scheme

A first set of detailed illustrated embodiments implements a lingering lock scheme with fairness control using a set of kernel-level primitives incorporated into the operating system. One illustrated embodiment has a computer system implementing an SCI interconnect with three nodes called quads, each quad having four processing units supporting ten interrupt levels; however, the invention could be implemented in various other configurations. The illustrated scheme is sometimes called a kernel quad aware locking scheme, or "kqalock." Specifically, the primitives include functions to acquire a lock conditionally (cp_kqalock), acquire a lock unconditionally (p_kqalock), and to release a lock (v_kqalock).

The primitives maintain a specialized data structure arrangement to implement the locking scheme. In the arrangement, each lock has a queue-header data structure with both a head and tail pointer to queue elements, and each queue element is associated with a particular node. A processing unit acquires a position in the queue by spinning on one of the nodes. A processing unit can acquire a preemptive position (also known as "taking cuts") in the queue by spinning on a queue element placed in the queue by another processing unit from the same node. For example, a processing unit could jump to the head of the queue if a processing unit from the same node is currently holding the lock. After the last active (i.e., uninterrupted) spinner for a queue element releases the lock, the second element in the queue is move to the head. Accordingly, the lock is then granted to a processing unit at the node for the new head queue element.

To avoid starvation, the method adds a new (i.e., "empty") queue element for a node to the end of the queue after a queue element is used more than a predetermined number of times (i.e., it "fills up"), leaving the old (i.e., "filled up") node in place. By the time a new queue element is added, queue elements for other nodes may have been added.

Consequently, the lock lingers in a particular node as lock requests associated with a particular queue element are granted, but the lock is forced to another node when a queue element for another node comes to the head of the queue.

The predetermined number can be set at compile time, or alternatively through a function call. A counter in the queue element tracks the number of times the queue element is used, and the number is compared to the predetermined number. The predetermined number is settable on a per-lock basis and is likely to be on the order of 10 to 100 in the illustrated embodiment, but the value may vary considerably according to lock behavior. Other alternative fairness control criteria are possible, such as a dynamic number or a time limit. Within a node, first-come-first-served queue discipline is not enforced but could be in an alternative embodiment.

A processing unit that is interrupted while spinning on an element makes its absence known so its queue element may be bypassed in favor of a processing unit that can immediately use the lock. If the interrupted processing unit's queue element is removed from the queue before the processing unit returns, a notification is provided, and the processing unit's lock request is requeued.

Figure 6:
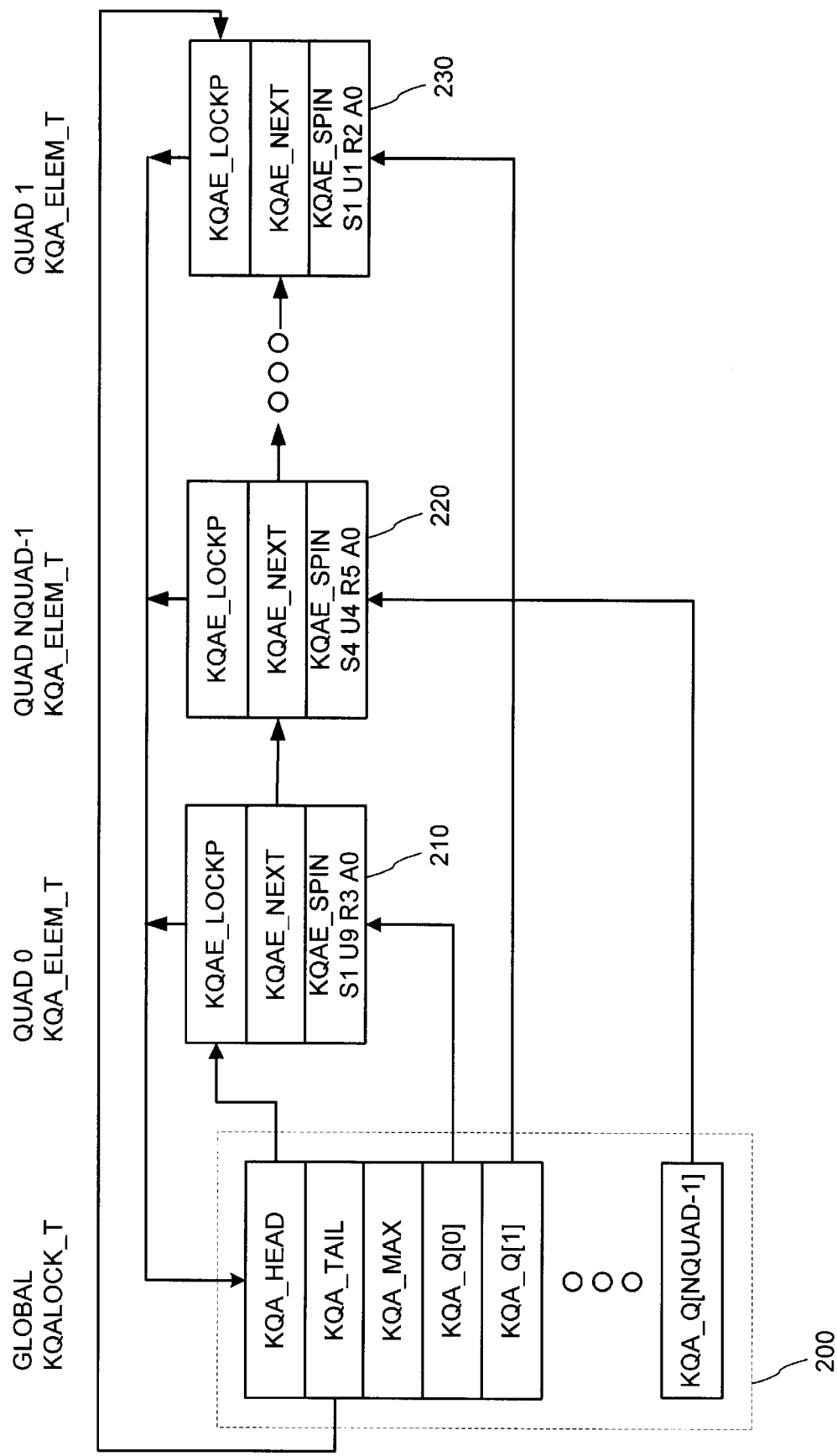
FIG. 6 is a block diagram showing the overall data structure arrangement for a kernel-level implementation of a lingering lock scheme.

An overall data structure for implementing a lingering lock scheme with fairness control is shown in FIG. 6. The main components are a per-lock header structure 200 of type kqalock_t and queue elements 210, 220, and 230 of type kqa_elem_t. The header structure 200 exists even if no processing units are currently holding or spinning on the lock. The queue elements, on the other hand, are linked into the structure only if a processing unit is currently spinning on or holding the lock. The queue elements are stored in memory local to the node with which they are associated.

The header structure 200 shown in FIG. 6 has a head (kqa_head) and tail pointer (kqa_tail) for the queue of nodes containing processing units currently holding or spinning on the lock, as well as a maximum field (kqa_max) limiting the number of times that processing units on a given node can use an element to acquire a position in the queue. In addition, there is a per-node pointer (array kqa_q[ ]) to that node's queue element, or NULL if no processing unit on that quad is either holding or spinning on the lock.

The head and tail pointers share a cache line, while the per-quad queue-element pointers are each in their own cache line. The per-quad queue-element pointers make up a kqa_q[ ] array, allowing a processing unit to find a queue element that has already been allocated by one of the other processing units on the same node. Since each entry of the kqa_q[ ] array is in its own 64-byte SCI cache line, manipulating this array on a heavily-used lock incurs almost no SCI latency penalty.

The kqa_elem_t queue elements have a pointer (kqae_lockp) to the header structure 200 in order to allow interrupt entry and exit to properly remove and requeue a node's element, a next pointer (kqae_next) to link the queue together, and a spin-state word (kqae_spin) that is manipulated with atomic instructions in order to control access to the lock. The spin state word has the following five fields:

TABLE 1

| Field | Description |
| --- | --- |
| Sn | A number-of-spinners field indicating the number of processing units actively spinning on this queue element. |
| Un | A number-of-uses field indicating the number of processing units that have used (i.e., spun on or created) this queue element. This is used to enforce fairness; if this count exceeds a predetermined value, this structure may no longer be used to acquire a position in the queue. |
| Rn | A number-of-references field indicating the number of processing units certain to reference this queue element some time in the future. This will be one larger than the number-of-spinners field. It may be even larger if there are processing units that have been interrupted while spinning on the lock. |
| An | This field is nonzero if the lock is currently available. It will be nonzero during lock handoff. |
| In | An optional interrupted-spinners field for debug purposes. It indicates the number of processing units interrupted from spinning on this queue element. It will be equal to (R-S-1). That is, the referencing processing units are either spinning on the lock, interrupted from spinning on the lock, or holding the lock. |

Figure 7:
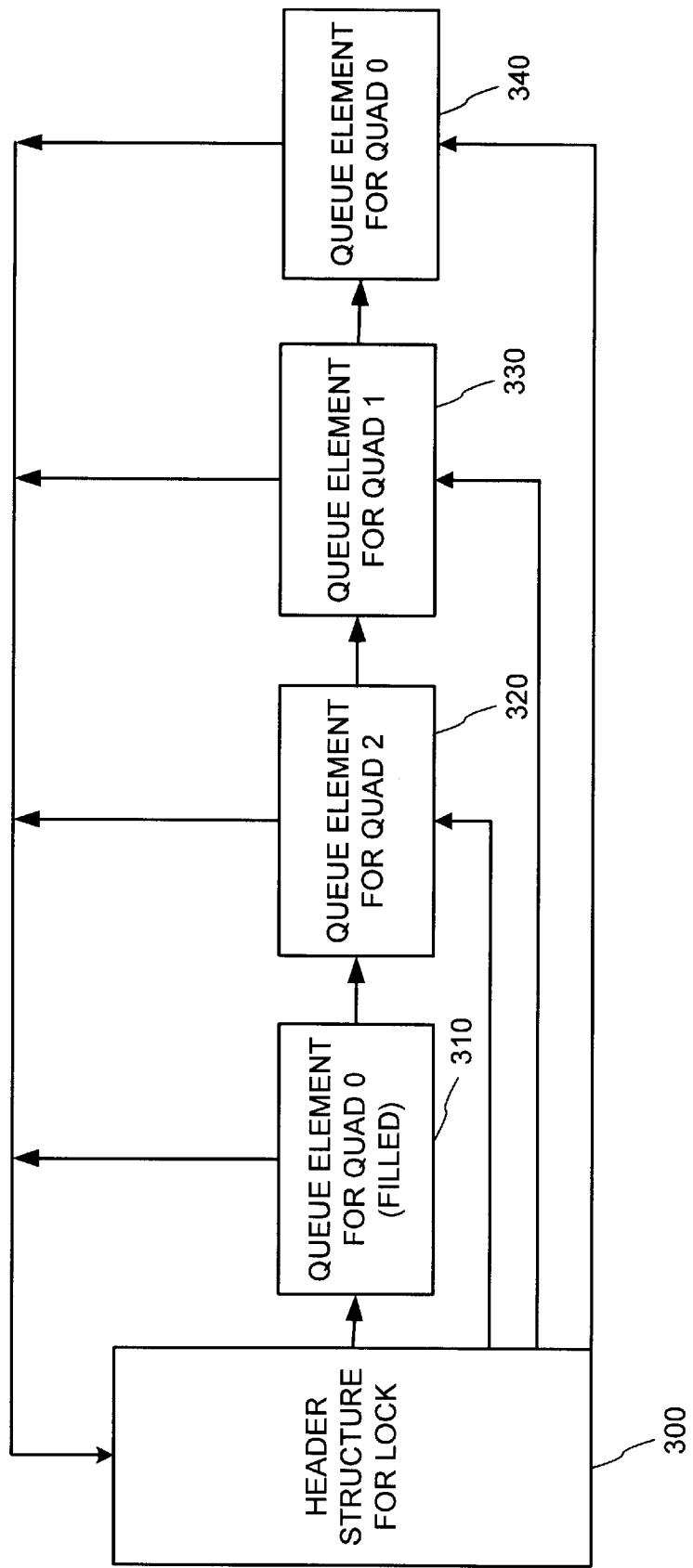
FIG. 7 is a simplified block diagram showing the overall data structure arrangement for a kernel-level implementation of a lingering lock scheme.

It is possible for a node to have more than one queue element in the queue (e.g., if the first element has "filled up" with requests); if so, the kqa_q[ ] array points to the last queue element for that node. Such an arrangement is shown in the simplified block diagram of FIG. 7. Two queue elements 310 and 340 are in the queue to hold requests for quad 0. Since the header structure 300 points to the last of the two elements (i.e., 340), subsequent requests from quad 0 will spin on the queue element 340. The other queue elements 320 and 330 hold requests for quads 2 and 1, respectively.

Spin State Fields

To maintain the spin state fields, various arrangements supporting multiple-processing unit access to the fields can be used. For example, the fields could be protected by a simple lock. In such an arrangement, the processing units would acquire the lock before performing operations on the spin state fields, thereby ensuring atomicity when multiple operations are performed on the fields.

Figure 8:
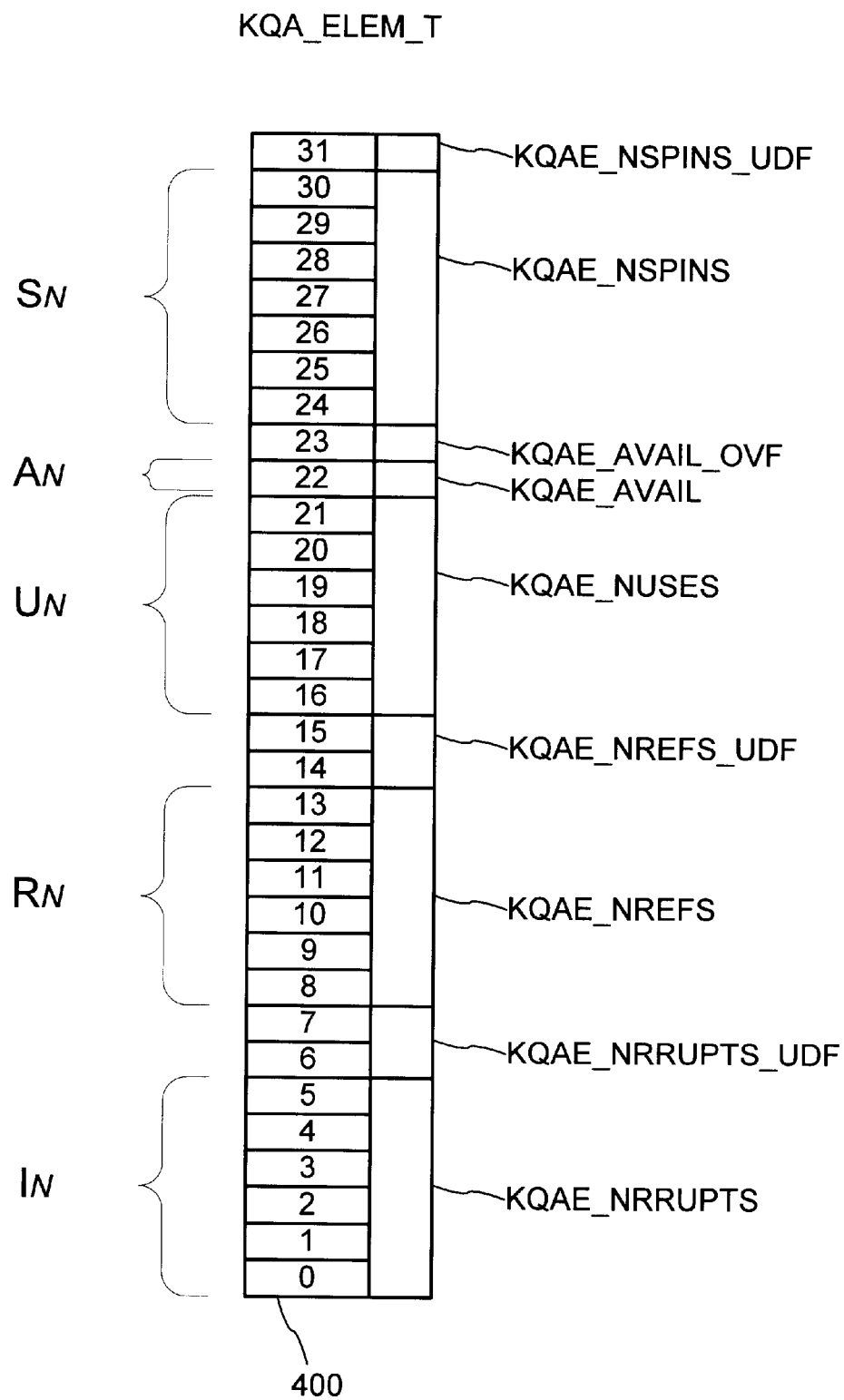
FIG. 8 is a block diagram showing the bitfield layout for a 32-bit queue element for use in the data structure arrangement of FIG. 6.

Another possible arrangement avoids employing a lock for the spin state fields and instead facilitates atomic operations on the spin state fields by arranging the fields to allow concurrent operations upon various fields in a single data structure without corrupting other fields in the data structure. An exemplary implementation of a queue element's spin state fields in a single data structure is shown in FIG. 8.

In the example, the Sn, Un, Rn, An, and In fields of a queue element are represented by bitfields placed within a 32-bit data structure named kqae spin. Various guard fields are arranged at positions more significant than the bitfields to prevent corruption of other bitfields during atomic operations on the data structure. For example, atomic add (atomic_xadd_uint) and atomic compare-and-exchange (atomic_cmp_xchg_uint) operations supported by a wide variety of processor types can be performed on the data structure to perform multiple operations on the data structure (e.g., adding 1 to Sn, Un, and Rn) atomically. During atomic operations to the bitfields, some may overflow or underflow. Various guard fields are arranged within the data structure to prevent overflows and underflows from corrupting other bitfields during the atomic operations.

The example has the following fields defined:

TABLE 2

| Field | Description |
| --- | --- |
| KQAE_NSPINS_UDF | Underflow from actively-spinning bitfield |
| KQAE_NSPINS | Number of processing units actively spinning on this kqa_elem_t. Note that the number of active spinners can potentially be as large as the number of processing units per quad times the maximum number of interrupt levels, or 40. This field serves as Sn. |
| KQAE_AVAIL_OVF | Overflow bit for lock-available field |
| KQAE_AVAIL | Lock-available field. This field serves as An. |
| KQAE_NUSES | Number of times processing units have used this structure to acquire a position in the queue. This includes the processing unit that originally allocated the structure, any processing units that have already been granted the lock, any actively spinning, and any that have been interrupted from their spin. When this bitfield reaches its maximum value, then this queue element may no longer be used to take cuts. This field serves as Un. |
| KQAE_NREFS_UDF | Guard field to handle underflow from need-to-look bitfield below. |

TABLE 2-continued

| Field | Description |
| --- | --- |
| KQAE_NREFS | Number of processing units that need to look at this kqa_elem_t structure sometime in the near future. This includes processing units actively spinning, processing units that have been interrupted from their spins, and the processing unit holding the lock. This field serves as Rn. |
| KQAE_NRRUPTS_UDF | Guard field to handle underflow from interrupted-spinners bitfield below. |
| KQAE_NRRUPTS | Number of processing units that have been interrupted from spinning on this queue element. Note that a given processing unit may be interrupted from spins on the same lock at several levels of interrupt nesting. Therefore, this field must handle values up to 40. This field serves as In. |

A system to facilitate field manipulation uses a MASK and SHIFT variant for each field, instead of using the field names directly. For example, KQAE_NSPINS_MASK has a value of 0x7f000000 and KQAE_NSPINS_SHIFT has a value of 24, indicating the field is 7 bits wide and starts at bit 24.

When a processing unit is enqueuing itself on the lock, it uses an atomic compare-and-exchange operation (atomic_cmpxchg_long), which allows the opportunity to reset the overflow and underflow fields. Since there can be at most two pass-off operations before an enqueue operation is done (which clears the underflow), the underflow fields KQAE_NREFS_UDF and KQAE_NRRUPTS_UDF need be no larger than a particular size (i.e., two bits). The overflow field KQAE_AVAIL_OVF is for debug checks and typically will not overflow. Various other atomic operations on the data structure are described at length in the pseudo-code set forth below.

Another advantage of the illustrated arrangement of FIG. 8 is the placement of the number-of-spinners guard field (KQAE_NSPINS_UDF) at the most significant portion of the data structure, which avoids corruption of other fields when the guard field itself underflows.

Preallocation of Queue Elements

Managing allocation of the queue elements representing the lock requests can be achieved in a variety of ways. A description of an efficient multi-processor computer memory allocation facility using kmem_struct is described in McKenney: et al., "Memory Allocator For A Multiprocessor Computer System," U.S. patent application Ser. No. 09/028,285, filed Feb. 24, 1998, which is incorporated herein by reference. Further information regarding memory allocation for shared-memory multiprocessors can be found in McKenney et al., "Efficient Kernel Memory Allocation on Shared-Memory Multiprocessors," Winter 1993 USENIX proceedings, Feb. 12, 1993, which is also incorporated herein by reference.

To avoid having to allocate memory for queue elements during lock management, a certain number of queue elements can be preallocated for each node using a memory allocation facility such as kmem_struct before requests for the lock are accepted. The number of elements preallocated (nblks) for a node is computed as follows:

nblks=maxengpernode*maxrruptlevels

In the formula, maxengpernode is the number of processing units on the node with the greatest number of processing units and maxrruptlevels is the largest possible interrupt nesting depth on any processing unit plus one. Certain memory allocators may exhibit increased performance is additional elements are preallocated due to the idiosyncracies within the allocator.

Elements for a node are allocated on memory local to the node by so specifying to the memory allocator. For increased performance on the kmem_struct facility, an identifier can be provided to advise the facility to preallocate the structures in a reserve pool and not use the dynamic allocation feature.

Basic Method for Acquiring and Releasing Locks

Figure 9:
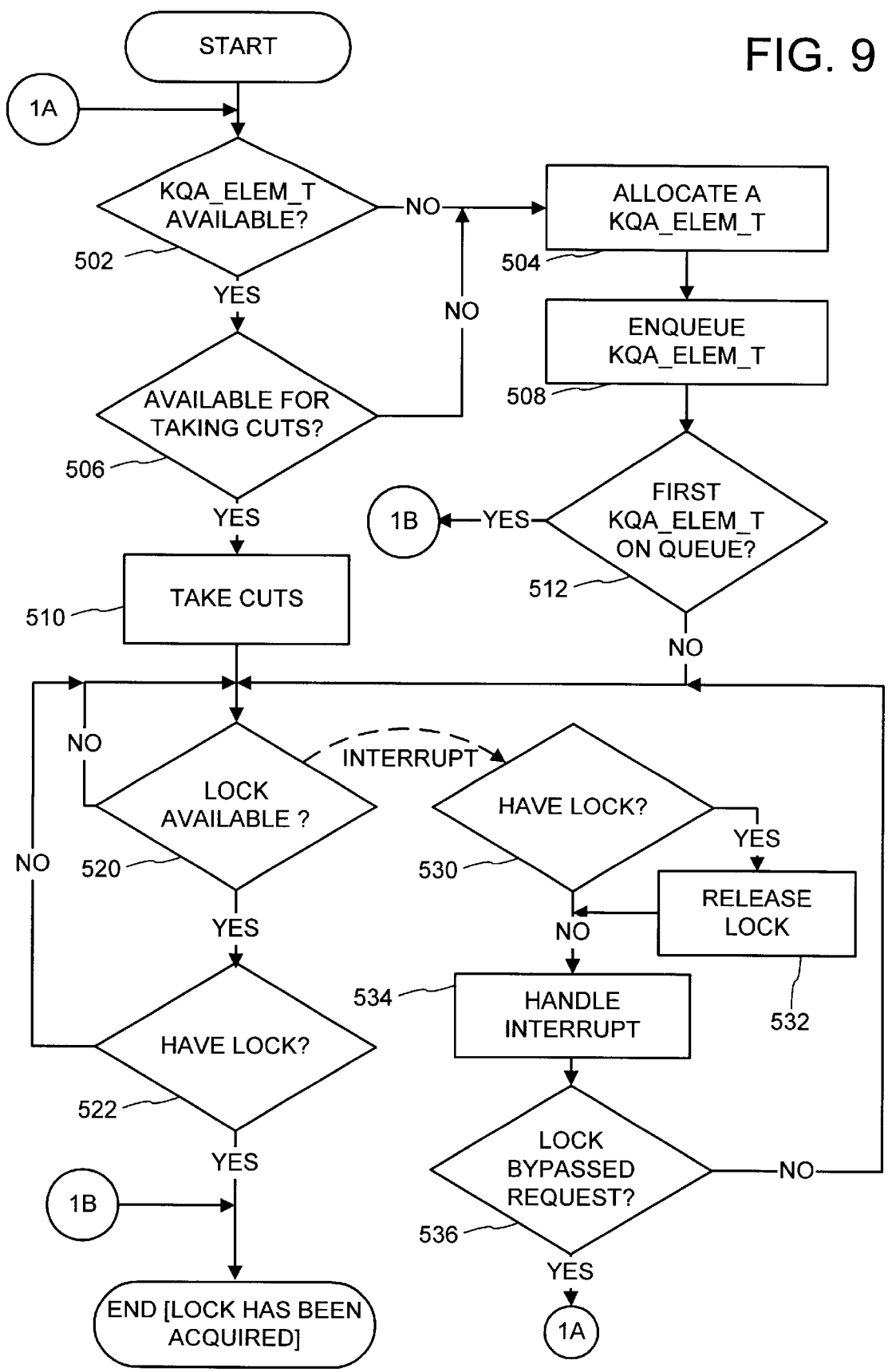
FIG. 9 is a flowchart showing the basic logic for acquiring a lock in a kernel-level lingering lock scheme.
Figure 10:
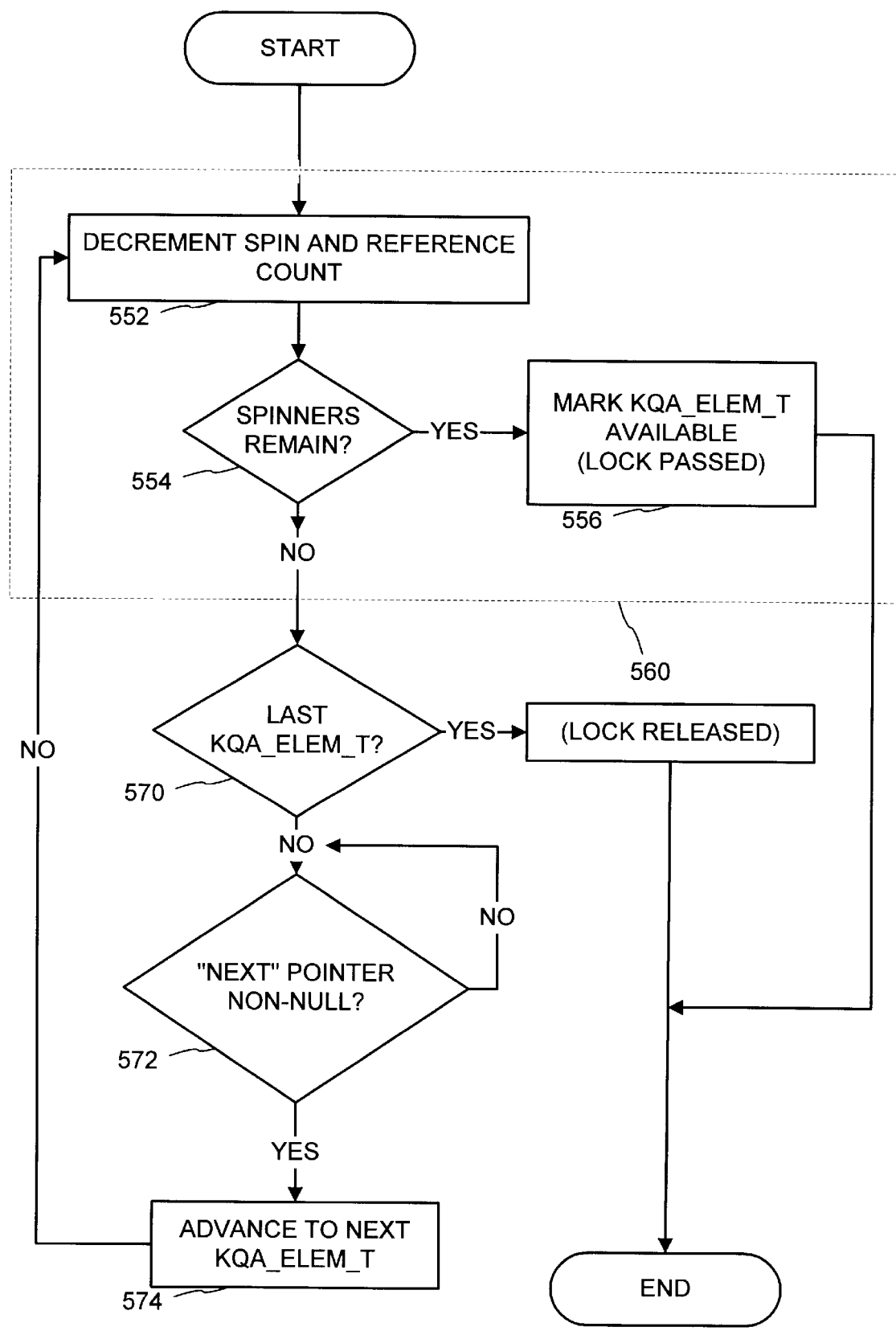
FIG. 10 is a flowchart showing the basic logic for releasing a lock in a kernel-level lingering lock scheme.

A basic method for a kernel-level lingering lock scheme is shown at FIGS. 9 and 10. FIG. 9 shows a method implemented by the function p_kqalock() for acquiring a lock; FIG. 10 shows a method implemented by the function v_kqalock() for releasing a lock. An implementation for actual use would likely be slightly varied, to account for a number of races that can occur as set forth in pseudo-code in another section, below.

The methods of FIGS. 9 and 10 track the lock requests using a queue of queue elements representing the lock requests, such as shown in FIG. 6. With reference now to FIG. 9, when the lock acquisition primitive is invoked, it first checks to see if a queue element for the node of the requesting processing unit is already in the queue (step 502). If so, fairness control (e.g., number of times the element has been used or an elapsed time) is used to check the queue element to see if it is available for conferring a preemptive position in the queue (step 506); if the queue element is so available, a preemptive position in the queue is acquired (step 510). If the conditions in steps 502 or 506 fail, the method allocates a queue element (step 504) and enqueues the element (step 508). If the enqueued element was the first one on the queue (step 512), the lock has been acquired. If not, the method spins on the lock (step 520). Once the lock is available, the method checks to see if it was acquired (step 522). If the lock was not acquired, the method again spins on the lock (step 520).

If the processing unit is interrupted while spinning, the method checks to see if the processing unit :has the lock (step 530). If so, it releases the lock (step 532). The method then invokes the interrupt handler (step 534). Upon return, it is determined if the lock bypassed the request (i.e., whether the kqa_elem_t has been bypassed in the queue while the interrupt was being handled) (step 536). If not, the method spins on the lock again (step 520); if so, the method again enqueues the lock request (step 502).

With reference now to FIG. 10, when the lock release primitive is invoked with reference to a present queue element (i.e., the queue element the releasing processing unit used to acquire the lock), the method decrements the spin and reference count of the queue element (step 552). Then it is determined if any processing units remain spinning on the queue element (step 554). If so, the queue element is marked as available to pass it to a processing unit spinning on the queue element (step 556). If not, it is determined whether the present queue element is the last one (step 570). If so, the lock has been released. Otherwise, the "next" pointer of the element is checked to see if it is non-null (step 572). If not, the "next" pointer will be updated by another processing unit, so step 572 executes until the pointer is non-null. Then, the method advances to the next element in the queue (step 574) and resumes at step 552. The group 560 of steps 552, 554, and 556 are performed atomically as explained below in the pseudo-code of v_kqalock_dequeue.

Detailed Logic for Acquiring and Releasing Locks

The following describes pseudo-code that accounts for races using the locking primitives shown below in Table 3, including primitives for conditionally acquiring a lock (cp_kqalock), acquiring a lock (p_kqalock), and releasing a lock (v_kqalock).

TABLE 3

| Function | Description |
| --- | --- |
| cp_kqalock(kqalock_t *kp, spl_t s) | conditionally acquire a lock |
| p_kqalock(kqalock_t *kp, spl_t s) | acquire a lock |
| p_kqalock_spin(kqalock_t *kp, spl_t s) | perform spinning for primitives |
| v_kqalock(kqalock_t *kp, spl_t s) | release a lock |
| v_kqalock_dequeue(kqalock_t kp) | performs operations for v_kqalock() and kqalock_rrupt_enter_chk() |
| kqalock_dequeue_free(kqpq, kqaep) | free elements for primitives |
| kqalock_alloc() | allocate global element for primitives |
| kqalock_dealloc(kqalock_t *kp) | deallocate global element for primitives |
| kqalock_rrupt_enter_chk() | adjust state for interrupted processor |
| kqalock_rrupt_exit_chk() | adjust state for processor returning from interrupt |
| kqa_elem_alloc() | allocate queue elements for primitives |
| kqa_elem_free(kqalock_t *kp) | free queue elements for primitives |

The following pseudo-code implements a kernel-level locking scheme on a computer system having nodes with four processing units; accordingly, for purposes of the pseudo code, the nodes are called quads. The pseudo-code makes reference to SPL (set-priority-level), which can be used to block certain levels of interrupts in a system having multiple levels of interrupts. The following variables and functions are made available to the primitives in order to carry out their functionality:

TABLE 4

| Variable/Function | Description |
| --- | --- |
| ql.ql_mutex | A per-quad simple spinlock |
| l.pl_kqa_elem_t | A per-processing unit pointer to a kqa_elem_t if one is cached on the present processing unit. A NULL pointer if there is no kqa_elem_t cached on the present processing unit. |
| QUAD_NUM() | A primitive that returns the number (ID) of the quad of which the executing processing unit is a member. |
| ENG_NUM() | A primitive that returns the number (ID) of the processing unit executing it. |

As previously shown in FIG. 6, a kqa_q[ ] array element is kept for each node. For purposes of the following pseudo-code, the array elements are defined as kqa_quad_t structures and include a pointer to the queue element for the node (kqpq_elem, which uses a C volatile declaration), a copy of kqa_max (kqpq_max, to avoid remote memory latency), and a field indicating the processing unit owning the lock (kqpq_ownereng). Optionally, fields for tracking statistics are included. Keeping statistics has the advantage of monitoring specific aspects of performance to determine how the system can be modified to improve performance. The following statistics fields included in the array element are defined as unsigned integers (uint) unless otherwise noted.

TABLE 5

| Field | Description |
| --- | --- |
| kqpq_pcnt | Number of P operations. |
| kqpq_spincnt | Number of times not first p_in system. |
| kqpq_newqcnt | Number of times inserted new queue element for the present quad to start spin. |
| kqpq_cutscnt | Number of times successfully "took cuts." |
| kqpq_nocutovf | Number of times couldn't take cuts because of KQAE_NUSES overflow. |
| kqpq_nocutpass | Number of times couldn't take cuts because kqa_elem_t already passed up. |
| kqpq_cpcnt | Number of CP operations. |
| kqpq_cpfailcnt | Number of failed CP operations. |
| kqpq_rruptcnt | Number of times a rrupt ended a spin. |
| kqpq_rruptcnt1 | Number of times a rrupt raced with lock grant to that lock had to be given up before entering handler. |
| kqpq_rruptcnt2 | Number of times lock passed us by during the interrupt. |
| kqpq_holdtime | Accumulated hold time in microseconds. Defined as a time field. |
| kqpq_queuetime | Accumulated spin time in microseconds. Defined as a long time field. |
| kqpq_ptime | Time of last acquisition. Defined as a time field. |
| kqpq_ownerret | Return address of last acquirer. Defined as void. |

Instead of the exemplary fields, a subset of the fields or additional statistics could be tracked for each node, for each lock, or for the system as a whole.

cp_kqalock: Conditionally Acquire a Lock

Pseudo-code for the function cp_kqalock is shown in Table 6. Conditionally acquiring a kqalock requires avoiding spinning on the lock and avoiding irrevocably changing the state until it is clear the lock can be immediately acquired. It is not advisable to use the same backout mechanism the interrupt entry primitive uses because that results in a memory-leak trap if a processing unit issues failing $cp_{13}$ kqalock operations in quick succession, exhausting the supply of kqa_elem_t structures. Therefore, the function does not modify the queue unless and until the lock can be immediately acquired.

TABLE 6 cp_kqalock(kqalock_t *kp, spl_t s)
1. Acquire pointer to requesting processing unit's quad's portion of the kqalock_t in kqpq.
2. Count the attempted conditional acquisition in kqpq->kqpq_cpcnt and record the current time in a local variable ptime (used to measure lock hold time).
3. Suppress interrupts.
4. If the kqa_tail pointer is non-NULL, fail immediately (but restore interrupts and then increment kqpq->cpfailcnt in order to count the failure).
5. Allocate a kqa_elem_t. Check l.pl_kqa_elem_t first, and use the below-described kqa_elem_alloc( ) if NULL.
6. Initialize the kqa_elem_t, setting as follows:
    a) Set the kqae_lockp field to the kp lock pointer.
    b) Set the kqae_next field to NULL.
    c) Set the kqae_quad field to QUAD_NUM( ). This field is used only for debug purposes; it does not affect the algorithm.
    d) Set the kqae_spin bitfields as follows: KQAE_NSPINS_UDF to zero, KQAE_NREFS_UDF to zero, KQAE_NREFS to 1, KQAE_NUSES to 1, and KQAE_NSPINS, KQAE_RSRV,

TABLE 6-continued

KQAE_AVAIL_OVF, and KQAE_AVAIL all to zero.
7. Elevate SPL, retaining the old SPL and checking for SPL misnesting (but forgive SPL misnesting if booting or already panicking).
8. atomic_cmpxchg_long( ) the kqa_tail pointer with the pointer to the newly-allocated kqa_elem_t, but only if the old value of kqa_tail is NULL. If the atomic_cmpxchg_long( ) fails, free the kqa_elem_t, restore interrupts, and return failure (and increment kqpq->cpfailcnt to count the failure).
9. Otherwise, complete the data-structure update:
10. Compare and exchange a pointer to the newly allocated kqa_elem_t with the kqpq->kqpq_elem pointer, using NULL as the old value. Ignore failure, which simply indicates that a race with a p_kqalock( ) won the important race (we have the lock) but lost the other race (their kqa_elem_t rather than ours will be used when other processing units on the present quad wish to "take cuts").
11. Store a pointer to the newly allocated kqa_elem_t into the kqa_head pointer.
12. Restore interrupts.
13. Mark this processing unit as the lock holder by storing ENG_NUM( ) into kqpq->kqpq_ownereng.
14. Indicate success by returning the old SPL.

p_kqalock: Acquire a Lock

Pseudo-code for the function p_kqalock is shown in Table 7. The example shown optimizes for extreme lock contention and streamlines the high-contention case, resulting in, slightly slower performance for low-contention acquisition and release. As a result there is no atomic-increment fastpath for the low-contention case. The variable prevkqaep stores the previous (i.e., old) kqaep.

TABLE 7 p_kqalock(kqalock_t *kp, spl_t s)
1. Get a pointer to the requesting processing unit's quad's portion of the kqalock_t in kqpq.
2. Check for self-deadlock using the kqpq_ownereng field and verify that interrupts are not suppressed.
3. Increment the kqpq_pcnt field and record the current time in the local variable spinstart.
4. Save the old value of the SPL, and check for SPL misnesting (but forgive SPL misnesting if booting or already panicking).
5. Repeat until we hold the lock (normally, only one pass through this loop is needed, but additional passes may be forced by interrupts and races with other processing units):
   a) Raise the SPL (note that it is already checked for misnesting) and suppress interrupts.
   b) Verify that there is a kqa_elem_t available on the pl_kqa_elem_t per-processing unit cache, and allocate one if there is none.
   c) Acquire the ql.ql_mutex gate.
   d) Set prevkqaep to NULL.
   e) Set kqaep to kpqp_elem, being careful to do the assignment from this volatile field exactly once.
   f) If kqaep is non-NULL, then there is some other processing unit on the present quad already spinning on or holding this lock. So attempt to "take cuts" as follows:
     i) Copy the kqae_spin field to a local variable. Appropriate volatile declarations are needed to keep the compiler from referencing the field twice.
     ii) If the KQAE_NSPINS_UDF bitfield is zero (indicating that this element has not yet been bypassed) or if the KQAE_NUSES bitfield is less than the kpqp_max field (indicating that it is time for the lock to move to some other quad):
       a) Copy the local copy of the kqae_spin field to a second local copy.
       b) In the second local copy of the kqae_spin field, increment the KQAE_NSPINS, KQAE_NREFS, and KQAE_NUSES fields, and set the KQAE_NREFS_UDF field to zero. If the KQAE_NSPINS_UDF field in the result is nonzero, an error has occurred.

TABLE 7-continued c) Compare the kqae_spin field to the first copy and atomically exchange in the second copy. If the cmpxchg fails:
         (1) Release the ql_mutex gate.
         (2) Restore interrupts.
         (3) Restore SPL.
         (4) Restart the top-level repeat loop ("continue" statement).
       d) Otherwise, release the ql_mutex gate.
       e) Increment the kqpq_cutscnt statistic and invoke p_kqalock_spin( ) to wait for the lock to become available. If TRUE is returned, we have the lock, so add the time sice spinstart to kqpq_queuetime, and return the old SPL to the caller.
       f) Otherwise (if p_kqalock_spin returned FALSE) restart the top-level repeat loop ("continue" statement).
     iii) Otherwise, increment kqpq_nocutovf if KQAE_NUSES was too large, otherwise, increment kqpq_nocutpass (because the kqa_elem_t was passed up, possibly because all of the processing units that had been spinning on it were interrupted when the lock became available).
     iv) Set prevkqaep to kqpq_elem for the cmpxchg below.
   g) Logic reaches this statement when it is impossible to take cuts.
   h) Release the ql.ql_mutex gate.
   i) Take the cached kqa_elem_t from pl_kqa_elem_t and initialize it as follows:
     i) Set the kqae_lockp field to the kp lock pointer.
     ii) Set the kqae_next field to NULL.
     iii) Set the kqae_quad field to QUAD_NUM( ). This field is used only for debug purposes; it does not affect the algorithm.
     iv) Set the kqae_spin bitfields as follows:
       KQAE_NSPINS_UDF to zero, KAQE_NSPINS to 1,
       KQAE_NREFS_UDF to zero, KQAE_NREFS to 2,
       KQAE_NUSES to 1, and KQAE_RSRV,
       KQAE_AVAIL_OVF, and KQAE_AVAIL all to zero.
   j) Compare and exchange a pointer to the newly allocated kqa_elem_t with the kqpq->kqpq_elem pointer, using prevkqaep as the old value. If this fails, free up the newly-allocated kqa_elem_t, restore SPL, restore interrupts, and restart the top-level repeat loop ("continue" statement).
   k) NULL out the pl_kqa_elem_t pointer to indicate that we are now using the previously cached copy.
   l) Set a local ptime variable to the current time.
   m) Atomically exchange a pointer to the newly allocated kqa_elem_t with the kqa_tail pointer, storing the old value of kqa_tail into a local variable prevkqaep.
   n) If prevkqaep is NULL, we hold the lock:
     i) Store the contents of the local variable ptime into kqpq_ptime.
     ii) Store the pointer to the new kqa_elem_t into kqa_head using atomic exchange.
     iii) Atomically decrement the KQAE_NSPINS and KQAE_NREFS bitfields using xadd. Note that we don't have a destructive race with some other processing unit taking cuts and then being interrupted, because the element is marked "not available". Therefore, by the time we hand off, we will see the other processing unit either interrupted or not - if the other processing unit delays between sampling and cmpxchg, the cmpxchg will fail.
     iv) In a debug kernel, verify that the kqa_element_t had both references and spinners before the atomic decrement.
     v) Set kqpq_ownereng to ENG_NUM( ) to record the owner.
     vi) Restore interrupts.
     vii) Return the old SPL to the caller.

TABLE 7-continued o) Otherwise, we must spin:
  i) Count the start of a spin cycle started on a new kqa_elem_t in kqpq_newqcnt.
  ii) Store a pointer to the newly-enqueued kqa_elem_t into prevkqaep->kqae_next.
  iii) Invoke p_kqalock_spin( ) to wait for the lock to become available. If TRUE is returned, we have the lock, so accumulate the time since spinstart into kqpq_queuetime, and return the old SPL to the caller.
6. (Since the previous step is an indefinite repeat loop, the logic does not reach this step.)

The p_kqalock_spin function spins on the lock; pseudo-code is shown in Table 8. The spinning occurs at low SPL and with interrupts enabled. Spinning is terminated either by acquiring the lock (in which case the function returns TRUE) or being passed by while interrupted (in which case the function returns FALSE). In the latter case, the caller is responsible for requeuing. Note that the caller is responsible for suppressing interrupts. The function restores interrupts before returning.

p_kqalock_spin

TABLE 8 p_kqalock_spin(kqalock_t *kp, spl_t s)
1. Count the additional spin start in kqpq_spincnt.
2. Set l.pl_kqalockp[INT_NESTING( )] to kqaep so the interrupt handler will be able to detect we are spinning on a queued lock.
3. Repeat the following steps indefinitely. In the simple case where the lock is not contended by any other processing unit on the present quad, only one pass is needed. Additional passes through the loop are forced if the lock becomes available, but some other processing unit on the present quad beats us to the lock. If we are interrupted, and the lock passes us by while we are interrupted, then we break out of the loop so that the caller can requeue us.
  a) Drop SPL to oldspl and restore interrupts.
  b) Set the ptime local variable to the current time.
  c) Spin while l.pl_kqalockp[INT_NESTING( )] remains non-NULL and the KQAE_NSPINS_UDF and KQAE_AVAIL bitfields remain zero, with checks in that order while interrupts are suppressed. Set the ptime local variable to the current time on each pass through the loop. Make sure that interrupts are enabled between checks of these conditions.
  d) Suppress interrupts and raise SPL to "newspl".
  e) If l.pl_kqalockp[INT_NESTING( )] is NULL, we were passed up and the queue element was freed. Restore SPL, restore interrupts, and return FALSE so that p_kqalock( ) will requeue us.
  f) Make a copy of the kqae_spin field in the spinold local variable.
  g) If KQAE_AVAIL is nonzero, then the lock is available to processing units on the present quad. Attempt to acquire the lock as follows:
    i) Make a copy of spinold, setting the KQAE_NREFS_UDF, KQAE_AVAIL, and KQAE_AVAIL_OVF bitfields to zero.
    ii) Compare-and-exchange the result back into the kqae_spin field. If this fails, restart the top-level repeat loop ("continue" statement).
    iii) Otherwise, we have the lock:
      a) Set l.pl_kqalockp[INT_NESTING( )] to NULL to record the fact that we are no longer spinning.
      b) Set the kqpq_ptime statistic to the ptime local variable.
      c) Set kqpq_ownereng to ENG_NUM( ) to record the fact that this CPU holds the lock.
      d) Restore interrupts.
      e) Return TRUE to let the caller know that we hold the lock.
  h) Otherwise, another processing unit on the present quad beat us to the lock. Go through the repeat loop again to try again.
4. (Since the previous step is an indefinite repeat loop, the logic never reaches this step.)

v_kqalock: Release a Lock

Similar to the example shown for p_kqalock( ), the exemplary pseudo-code shown in Table 9 for the v_kqalock function dispenses with fastpath.

TABLE 9 v_kqalock(kqalock_t *kp, spl_t s)
1. Suppress interrupts.
2. If kp->kqa_head->kqpq_ownereng is not equal to ENG_NUM( ), the processing unit is releasing a lock that some other processing unit acquired. So, if this happends, an error has occurred.
3. Set kqpq_ownereng to ANYENG to indicate that we no longer own it (or will shortly not own it).
4. Invoke v_kqalock_dequeue(kp).
5. Set the SPL to "s".
6. Restore interrupts.

v_kqalock_dequeue

Pseudo-code for the v_kqalock_dequeue function p_kqalock is shown in Table 10.

TABLE 10 v_kqalock_dequeue(kqalock_t kp)
1. Set local variable kqpq to kp->kqa_q[QUAD_NUM( )].
2. Set acqstart to kqpq_ptime in order to avoid a race with any P operation that might follow this V operation.
3. Copy kp->kqa_head into a local variable kqaep.
4. Repeat the following steps. Normally, only one pass through this loop is needed, but races with interrupts on processing units that are spinning on this lock can force multiple passes.
   a) Using the atomic_xadd_long( ) primitive on kqaep->kqae_spin, decrement KQAE_NSPINS and KQAE_NREFS and increment KQAE_AVAIL. Note that decrementing these fields means adding all ones-bits to them, and further adding a one-bit to KQAE_NSPINS_UDF.
   b) If the original value of the KQAE_NREFS bitfield was zero or if the original value of KQAE_AVAIL was 1, an error has occurred.
   c) If the previous value returned by atomic_xadd_long( ) has nonzero KQAE_NSPINS, then we are done, so we atomically add the time since acqstart to kqpq_holdtime, and return to the caller.
   d) Otherwise, all processing units currently spinning on the current element have been interrupted, and we must bypass the element.
   e) If kp->kqa_tail is equal to kqaep, and we can successfully compare-and-exchange NULL into kp->kqa_tail, then this was the last element on the queue. Remove it as follows:
      i) Atomically add the time since acqtime to kqpq_holdtime.
      ii) Compare-and-exchange a NULL into kp->kqa_head, comparing against kqaep. Ignore failure, since it just indicates that we raced against a P operation.
      iii) If the KQAE_NREFS was 1 before the decrement (zero after), then invoke kqalock_dequeue_free(kqpq, kqaep).
      iv) Return to the caller.
   f) Spin waiting for kqaep->kqae_next to become non-NULL.
   g) Store kqaep->kqae_next into kp->kqa_head and into local variable kqaep1.
   h) If the KQAE_NREFS was 1 before the decrement (zero after), then free up the element poointed to by kqaep by invoking kqalock_dequeue_free(kqpq, kqaep).
   i) Set local variable kqaep to kqaep1 and go through the loop again to try to pass the lock off to the next element in line.
5. (Since the previous step is an indefinite repeat loop, execution never reaches this step.)

kqalock_dequeue_free

Pseudo-code for the kqalock_dequeue_free function is shown in Table 11. When the function is invoked, the kqa_elem_t being freed belongs to the quad of which the freeing processing unit is a member. Therefore, it is legal to use the per-quad ql_mutex to decide races. The function should not be called unless KQAE_NREFS is zero. Note that once KQAE_NREFS becomes zero, it will remain zero because p_kqalock() does not reuse a kqa_elem_t that has a zero KQAE_NREFS field.

Ql_mutex is used to resolve races between processing units attempt to take cuts using the present kqa_elem_t and the present processing unit, which is trying to free the kqa_elem_t. However, ql_mutex can be accessed only from its own quad. The arrangement works because the logic does not reach this function unless freeing the kqa_elem_t for the present processing unit's quad, since there is no way to stop spinning except by being given the lock or being passed up by v_kqalock(). In either case, v_kqalock() is done with the kqa_elemt before processing units at the same quad are done with it.

TABLE 11 kqalock_dequeue_free(kqpq, kqaep)
1. Acquire ql.ql_mutex. Note that kqaep must point to the present processing unit's quad in this case as explained in the above text.
2. Compare-and-exchange a NULL pointer into kqpq->kpqp_elem, comparing against kqaep. Ignore any compare-and-exchange failures; they would just mean that we lost a race with a p_kqalock( ).
3. Release ql.ql_mutex.
4. Free up the element pointed to by kqaep. Since any new references to the element are acquired under ql.ql_mutex, and since no new references are acquired to an element whose KQAE_NREFS bitfield is zero, we are safe from races that might otherwise result in a reference to an element on the freelist.

kqalock_alloc

Exemplary pseudo-code for the kqalock_alloc function is shown in Table 12.

TABLE 12 kqalock_alloc( )
1. Allocate a kqalock_t structure and zero it. Calculate its size based on the number of quads in the system.
2. Set kqa_max field to an appropriate default to limit number of "cuts" allowed. An alternative is to modify the algorithm to use elapsed time rather than number of "cuts" taken.
3. For each quad:
   a) Set the corresponding kqpq_ownereng field to ANYENG.
   b) Set the kqpq_max field to the value of kqa_max shifted up to align with KQAE_NUSES.
4. Return a pointer to the newly-allocated kqalock_t.

kqalock_dealloc

The kqalock_dealloc function deallocates the kqalock_t structure specified (*kp). Its size is calculated based on the number of quads in the system.

kqalock_rrupt_enter_chk

Exemplary pseudo-code for the kqalock_rrupt_enter_chk function is shown in Table 13. The function adjusts state to allow for interruption of the present processing unit. In this way, the logic avoids handing the lock off to a processing unit that cannot use it (i.e., is interrupted). Note that interrupts are suppressed by the function's caller.

TABLE 13 kqalock_rrupt_enter_chk( )
1. If l.pl_kqalockp[INT_NESTING( )] is NULL, the present processing
   unit is not currently spinning on a kqalock_t (at least not within
   the immediately interrupted context), so return.
2. Otherwise, copy l.pl_kqalockp[INT_NESTING( )] to a local variable
   kqaep.
3. Increment the kqpq_rruptcnt statistic.
4. Repeat the following steps until any races with being granted the
   lock and other processing units starting to acquire the lock are
   resolved. Normally, one pass suffices.
   a) Copy kqaep->kqae_spin to a local variable spinold.
   b) If the KQAE_NSPINS_UDF field is set, then we were already
      passed up. Just return and let kqalock_rrupt_exit_chk( )
      handle the logic.
   c) If the KQAE_AVAIL bitfield is not set or if KQAE_NSPINS is
      not equal to 1:
      i) Copy spinold to spinnew, decrementing
         KQAE_NSPINS, incrementing KQAE_NRRUPTS,
         setting KQAE_NREFS_UDF and KQAE_AVAIL_OVF to
         0. Note that KQAE_NSPINS is decremented by
         adding the mask and also adding
         KQAE_NSPINS_UDF's mask.
      ii) Compare and exchange spinnew into kqaep-
          >kqae_spin, comparing against spinold.
      iii) If the compare-and-exchange fails, restart the repeat
           loop ("continue" statement).
      iv) Otherwise, return.
   d) If the logic reaches this step, we are the only processing
      unit on the present quad currently spinning for the lock and
      the lock has been passed off to us. We therefore must
      pass it on, since we can't use it just now.
   e) Copy spinold to spinnew, setting KQAE_NREFS_UDF,
      KQAE_AVAIL_OVF, and KQAE_AVAIL all to 0.
   f) Compare and exchange spinnew into kqaep->kqae_spin,
      comparing against spinold.
   g) If the compare-and-exchange fails, restart the repeat loop
      ("continue" statement).
   h) Otherwise, we have (unwillingly) acquired the lock.
   i) Increment the kqpq_rruptcnt1 statistic.
   j) Invoke v_kqalock_dequeue(kqaep->kqae_lockp) to pass the
      lock on.
   k) NULL out l.pl_kqalockp[INT_NESTING( )] to indicate that we
      no longer hold a reference to the kqa_elem_t.
5. (Since the preceding step is an indefinite repeat, the logic does
   not reach this step.)

kqa_rrupt_exit_chk

Exemplary pseudo-code for the kqa_rrupt_exit_chk function is shown in Table 14. The function adjusts state to allow for the return of the present processing unit from an interrupt. If the lock has not yet reached the processing unit's queue element, the queue element is adjusted to reflect the processing units return from the interrupt; otherwise, an arrangement is made so that p_kqalock_spin() will requeue itself. Interrupts are to be suppressed by this function's caller.

TABLE 14 kqalock_rrupt_exit_chk( )
1. If l.pl_kqalockp[INT_NESTING( )] is NULL, return.
2. Otherwise, copy l.pl_kqalockp[INT_NESTING( )] to a local variable
   kqaep.
3. Repeat the following steps until races with lock grant and with
   other processing units aquiring the lock have been resolved:
   a) Copy kqaep->kqae_spin to a local variable oldspin.
   b) if KQAE_NSPINS_UDF is nonzero, we have been passed,
      and must let go of the passed-up kqa_elem_t (and possibly
      free it up) as follows:
      i) Clean up state so that the present processing unit no
         longer appears to be spinning on the lock. This
         cleanup requires an atomic compare-and-exchange,
         which is prone to failure at high contention. We
         therefore repeat the following steps until the
         compare-and-exchange succeeds:
         a) Decrement the KQAE_NREFS and
            KQAE_NRRUPTS bitfields, set the
            KQAE_NREFS_UDF and KQAE_AVAIL_OVF
            bitfields to zero.

TABLE 14-continued b) Compare-and-exchange the result back into the kqae_spin field. If successful, break out of this compare-and-exchange loop.
    c) Make another local copy of the kqae_spin field.
  ii) If the result of the decrement of KQAE_NREFS was zero:
    a) Spin waiting for the kqa_head pointer to not equal kqaep. This step is required in order to safely resolve races between a p_kqalock( ) and a v_kqalock( ) operation. Without this step, we could end up freeing an element before the p_kqalock( ) in question had filled in the kqae_next pointer, but after this operation had exchanged with the kqa_tail pointer. This would cause both operations to manipulate an element on the freelist, leading to undesirable results.
    b) Invoke kqalock_dequeue_free(kp, kqaep).
  iii) Set l.pl_kqalockp[INT_NESTING( )] to NULL to record the fact that we are no longer spinning.
  iv) Increment kqpq_rruptcnt2 to record the fact that we were passed up while interrupted.
  v) Return, so that p_kqalock_spin( ) and p_kqalock( ) will requeue us.
 c) Otherwise, KQAE_NSPINS_UDF is zero, and we have not yet been passed. Do the following (d–f) to re-declare our intentions of taking the lock when it becomes available:
 d) Copy oldspin to newspin, incrementing KQAE_NSPINS, and setting KQAE_NREFS_UDF and KQAE_AVAIL_OVF to 0.
 e) Compare and exchange newspin into kqaep->kqae_spin, comparing against oldspin.
 f) If the compare-and-exchange succeeds, return.
4. (This step is not reached, since the preceding step is an indefinite repeat.)

kqa_elem_alloc

This function can be defined in terms of kmem_struct_alloc(). It allocates a kqa_elem_t from a pool of kqa_elem_t's.

kqa_elem_free

This function can be defined in terms of kmem_struct_free(). Frees a kqa_elem_t to a pool of kqa_elem_t's An implementation using elapsed time for fairness control would track time instead of or in addition to number queue element uses. For example, after recording a time value when the lock first moves to a quad, the value could be subtracted from the current time and compared to a predetermined maximum time value.

Example of Queue Element States

Figure 11A:
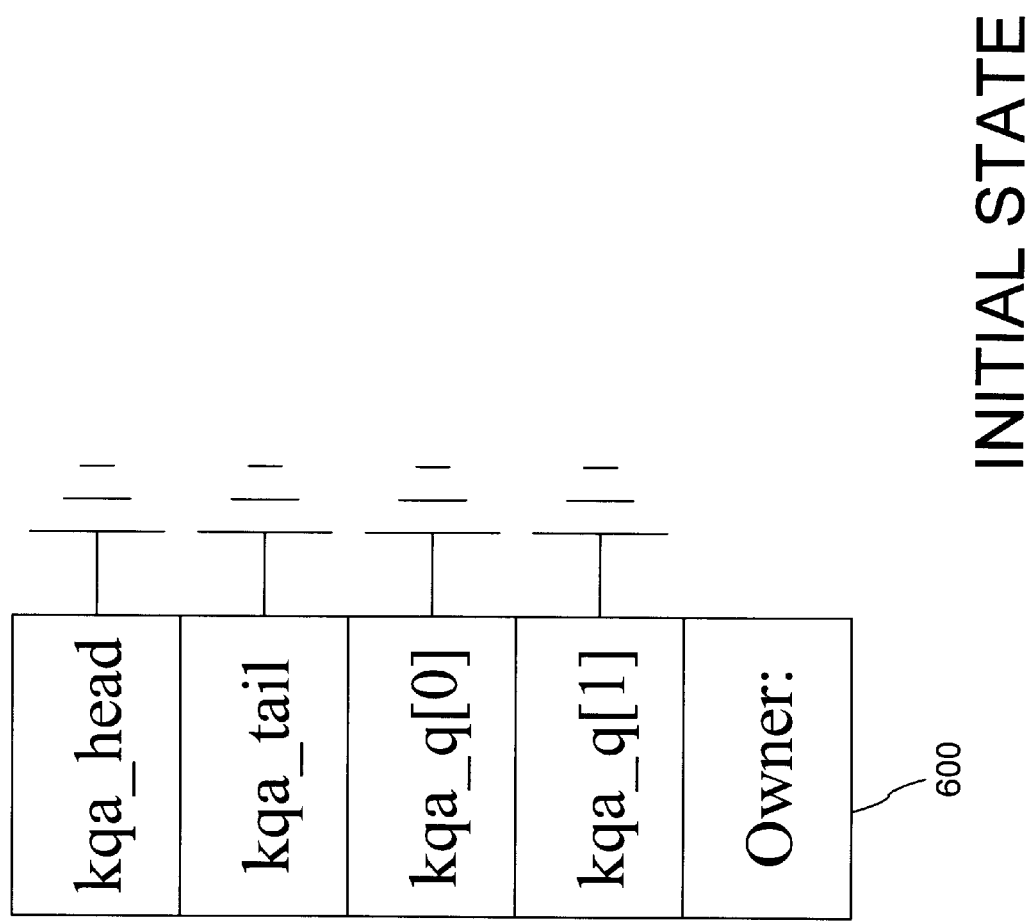
FIGS. 11A–11P are block diagrams showing a walk through of a kernel-level implementation of a lingering lock scheme.
Figure 11B:
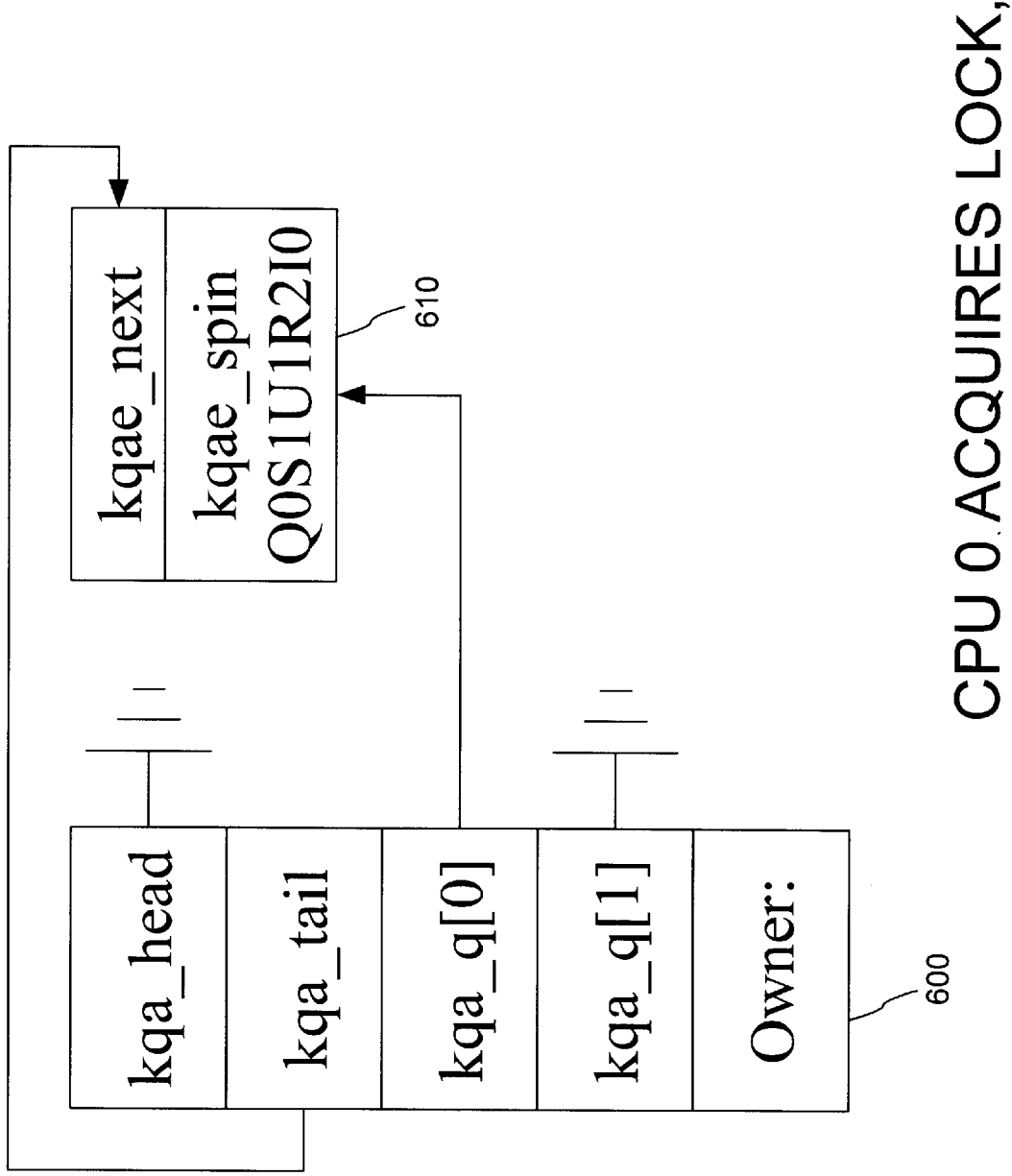
Figure 11D:
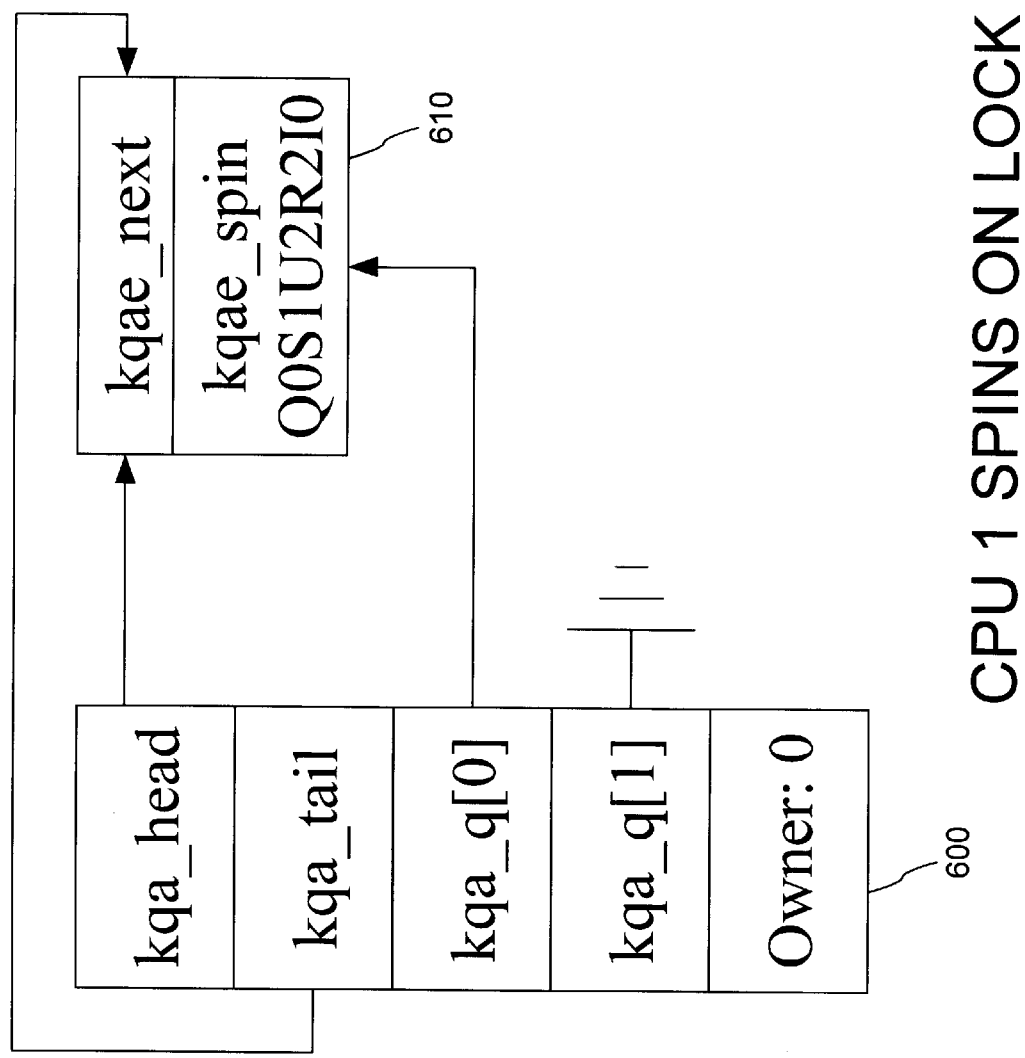
Figure 11G:
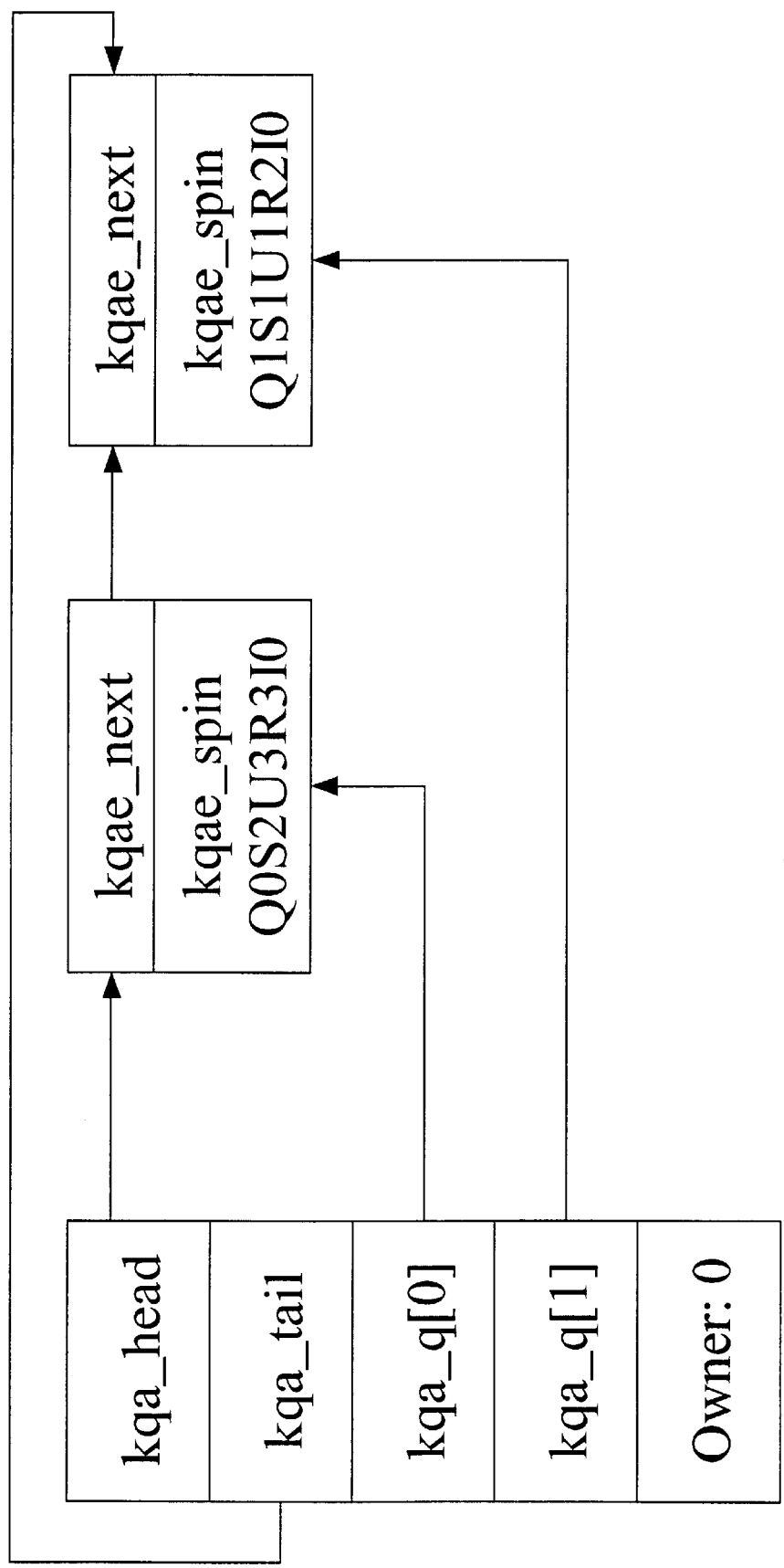
Figure 11H:
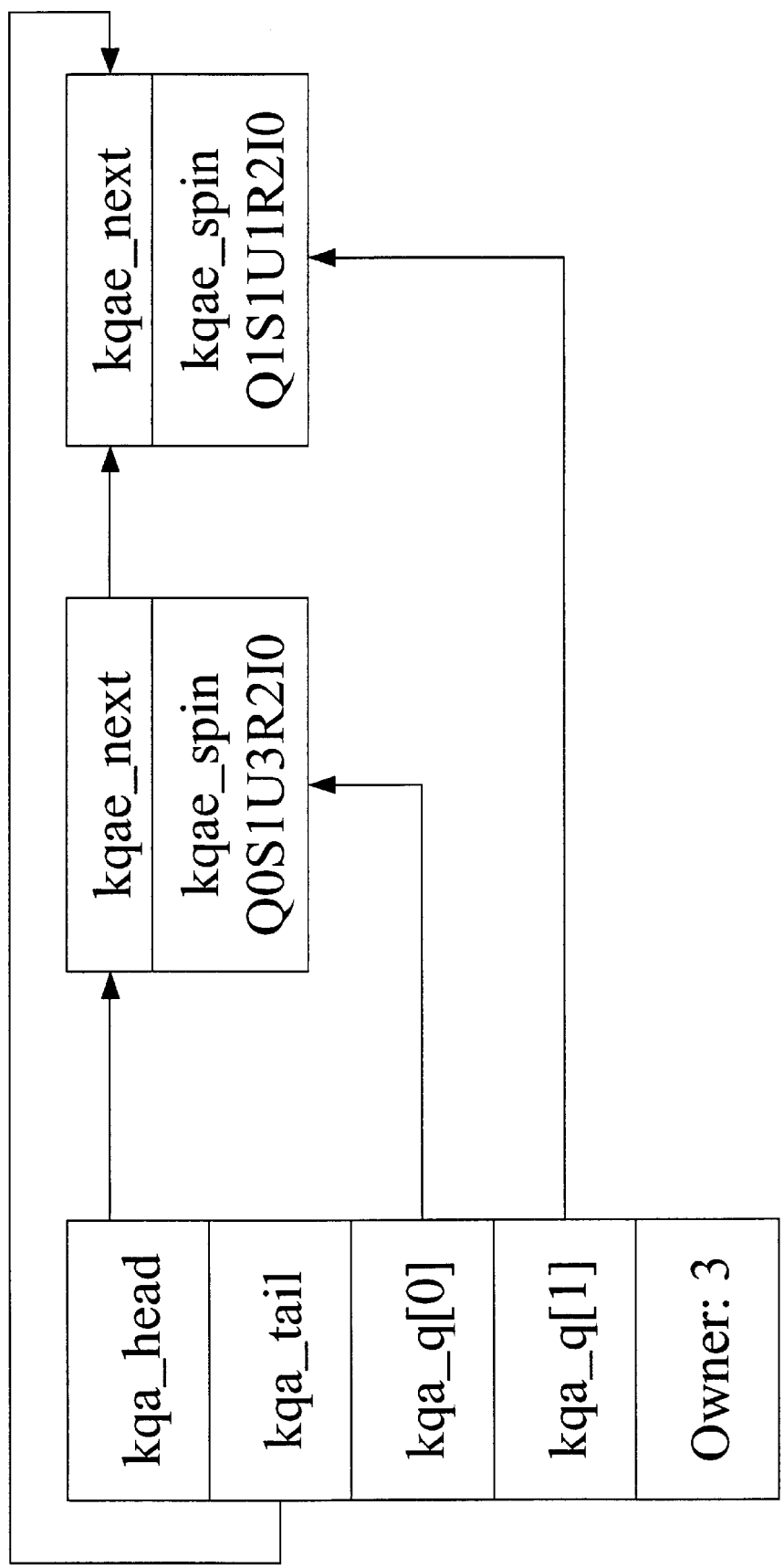
Figure 11K:
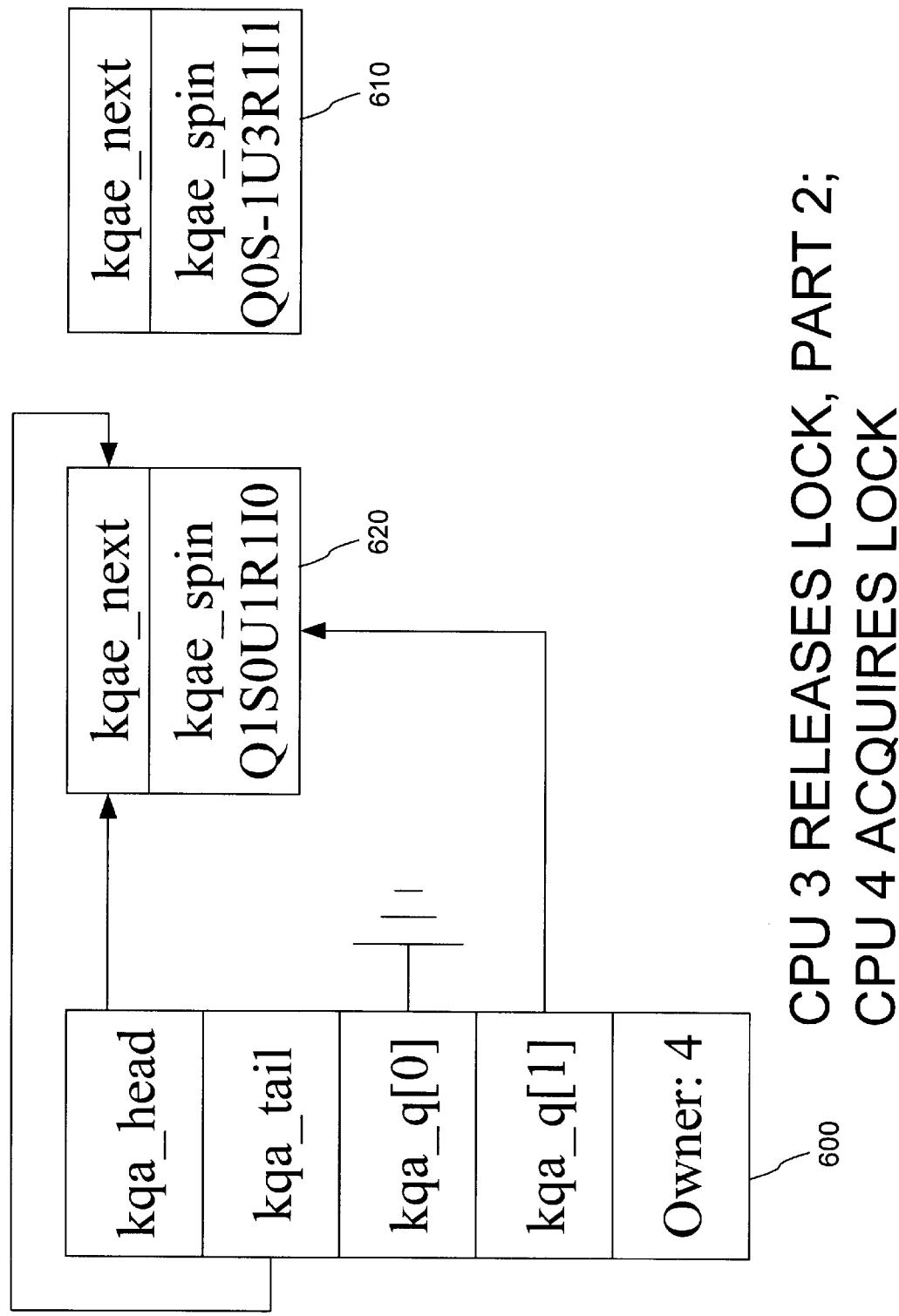
Figure 11L:
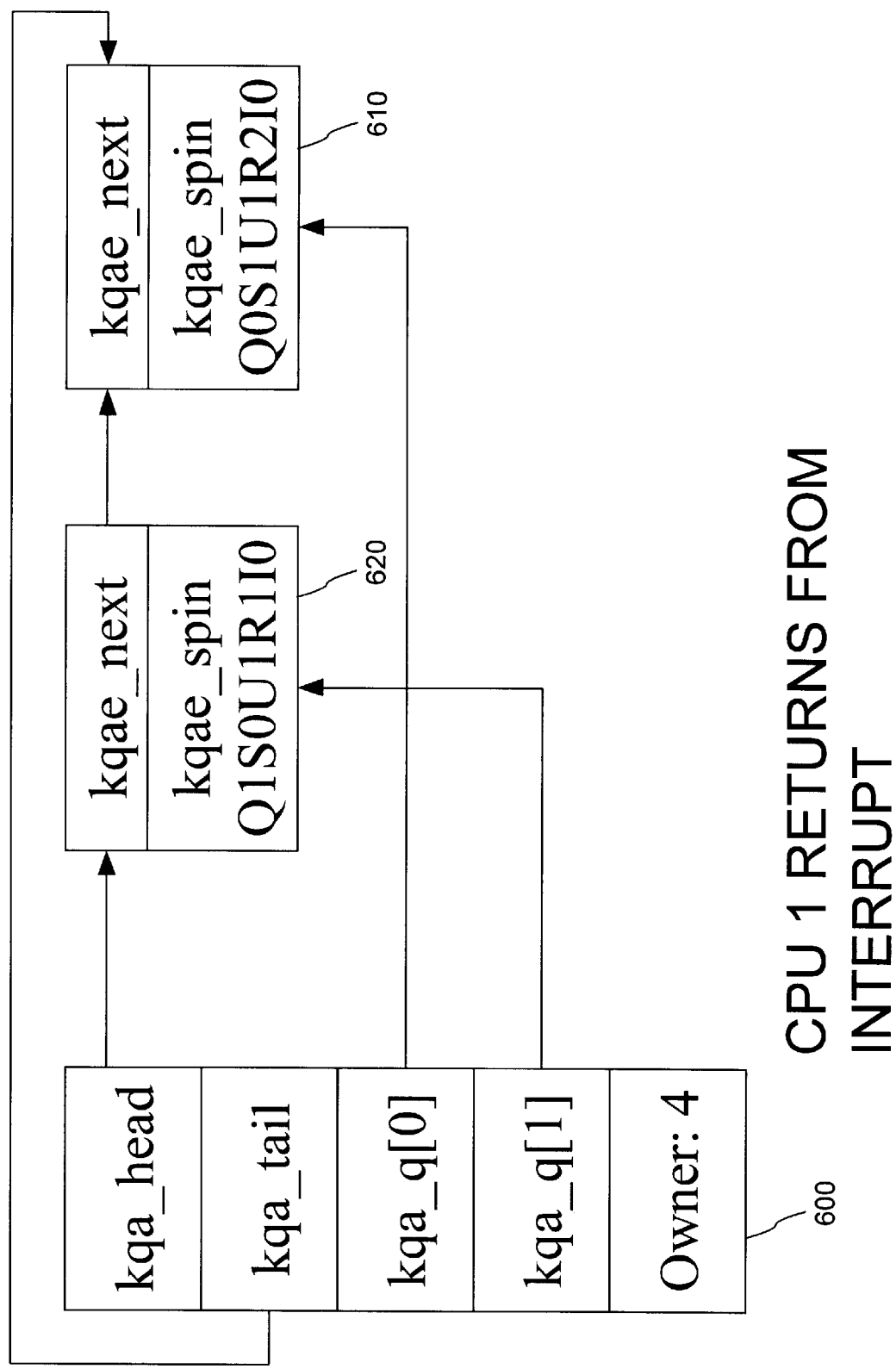
Figure 11P:
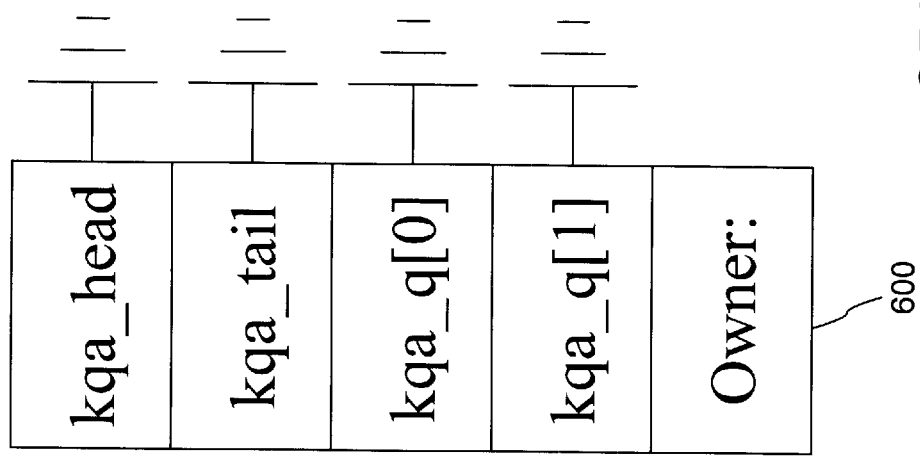

An exemplary walk through of a lingering lock scheme showing queue element states is depicted in FIGS. 11A–11P. In the example, the computer system has a first node, quad 0, with four processing units, CPUs 0–3, and a second node, quad 1, with four processing units, CPUs 4–7. An exemplary header data structure 600 tracks the head and tail of the queue, and points to queue elements for quad 0 and quad 1. An optional field (Owner) tracks the current processing unit owning the lock and can be used for debugging purposes. The initial state is shown in FIG. 11A; no processing unit owns the lock, and the lock is available to any requesting processing unit.

At FIG. 11B, CPU 0 invokes the lock acquisition primitive. CPU 0 fills in a new queue element 610 indicating that it is on quad 0 (Q=0), that it is spinning (S=1), that there has been one use of this element (U=1), that there are two references, one for CPU 0 and one for whoever will pass the lock to it (R=2), and that there are no interrupted spinners (I=0). Since quad 0's kqa_q[ ] element is NULL, there is no one to "take cuts" behind. So, CPU 0 atomically exchanges the old value of kqa_tail with a pointer to its new element. Since the old value of kqa_tail is NULL, CPU 0 holds the lock.

Since CPU 0 holds the lock, it fills in kqa_head with a pointer to quad 0's element, and atomically decrements the number of spinners since it holds the lock and need not spin (S=0) and at the same time atomically decrements the number of references since there is no current lock holder to give the lock to it (R=1) as shown in FIG. 11C.

At FIG. 11D, CPU 1 invokes the lock acquisition primitive. Since quad 0's kqa_q[ ] element is non-NULL, CPU 1 can take cuts. The method atomically increments the number of spinners (S=1), the number of uses (U=2), and the number of references (R=2) to allow for CPU 1's presence. CPU 1 then spins on this queue element 610, waiting for the "available" bit (not shown, since it is usually zero) to be set.

At FIG. 11E, CPU 4 invokes the lock acquisition primitive. Quad 1 's kqa_q[ ] element is NULL (see FIG. 11D), so CPU 4 must enqueue another element 620. This time, the old value of kqa_tail is non-NULL, so CPU 4 uses the old pointer to link the queue element 620 into the list, as shown in FIG. 11F.

At FIG. 11F, CPU 4 links the queue element 620 onto the kqae_next pointer of the previously-last element 610.

At FIG. 11G, CPU 3 invokes the lock acquisition primitive. Quad 0's kqa q[ ] element is non-NULL, so CPU 3 atomically increments the number of spinners, uses, and references to account for its presence (S=2, U=3, R=3) on the queue element 610.

At FIG. 11H, CPU 0 invokes the: lock release primitive. CPU 0 atomically decrements the number of spinners and number of references, and, at the same time, atomically sets the available bit (again, not shown) for the queue element 610. Since the number of spinners is greater than or equal to zero, CPU 0 is done. In this example, CPU 3 beats CPU 1 to the lock by atomically clearing the available bit and acquiring the lock. In the illustrated implementation, fairness control within a quad is not enforced, but an alternative could track to which CPUs the lock has been granted to enforce fairness within the quad.

At FIG. 11I, CPU 1 is interrupted. When CPU 1 takes the interrupt, it atomically decrements the number of spinners and, at the same time, atomically increments the number of interrupted spinners on the queue element 610. Since the available bit is clear and the number of spinners is not less than zero, CPU 1 does not have to release the lock before starting its interrupt handler.

At FIG. 11J, CPU 3 invokes the lock release primitive. CPU 3 releases the lock, but when it atomically decrements the number of spinners and references and (irrelevantly) sets the available bit of the queue element 610, it finds that the number of spinners is now less than zero. This means that there is no one on the present quad to take the lock; CPU 1 is still in its interrupt handler. But since the number of references is greater than zero, CPU 3 cannot free up the queue element 610.

At FIG. 11K, CPU 3 removes the old quad 0 queue element 610 from the queue, but does not free it up, since CPU 1 will reference it as soon as it returns from its interrupt handler. CPU 3 moves to the next queue element 620, atomically decrementing the number of spinners and the number of references, and, at the same time, atomically setting the available bit. Since the number of spinners is not less than zero, CPU 3 is done. CPU 4 sees the available bit, atomically clears it and takes possession of the lock.

At FIG. 11L, CPU 1 returns from interrupt. When CPU 1 returns from interrupt, it sees that the number of spinners is less than zero (see element 310 in FIG. 9K), which means that CPU 1 has been bypassed. CPU 1 therefore requeues itself and begins spinning again. Since the number of references to the old queue element 610 was zero, CPU 1 can recycle it.

At FIG. 11M, CPU 4 invokes the lock release primitive. CPU 4 atomically decrements the number of spinners and the number of references, while at the same time (irrelevantly) atomically setting the available bit of the queue element 620. Since the number of spinners is less than zero, CPU 4 must advance to the next queue element 610. But since the number of references is zero, it must first dequeue and free quad 1's element 620, as shown in FIG. 11N.

At FIG. 11N, CPU 4 atomically decrements the number of spinners and the number of references, while at the same time atomically setting the available bit of the queue element 610. Since the number of spinners is not less than zero, CPU 4 is done. CPU 1 sees the available bit, atomically clears it and takes possession of the lock.

At FIG. 11O, CPU 1 invokes the lock release primitive. CPU 1 atomically decrements the number of spinners and the number of references, while at the same time (irrelevantly) atomically setting the available bit of queue element 610. Since the number of spinners is less than zero and the number of references is zero, CPU 1 must remove this element 610 from the list and free it.

At FIG. 11P, since the list is now empty, CPU 1 is done and the lock is free.

Distributed Round Robin Lock Scheme

A second set of illustrated embodiments illustrate a user-level locking scheme also known as a distributed round robin scheme, or "drlock." In the following illustrated embodiments, a computer system implementing an SCI interconnect has three nodes called quads, each quad having four processors; however, the invention could be implemented in a variety of other configurations. The drlock primitives encapsulate a simple spinlock in a data structure mediating access to the spinlock by allowing access from only one node at a time. The illustrated encapsulation increases performance by decreasing the number of times the spinlock (and the data structures protected by the spinlock) shuttle between quads across the SCI interconnect. The encapsulation also allows existing code and tools crafted for a simple spinlock to operate correctly on a drlock, thereby preserving backwards compatibility.

The overall data structure for an implementation of the drlock scheme is shown in FIG. 12. The encapsulating data structure has a per-quad component (e.g., 660, 670, and 680) and a global component 650. The global component 650 has the simple spinlock (drlg_latch) and a bit mask with one bit per quad (drlg_spinmask). A bit set in the bit mask indicates at least one processing unit on the corresponding quad holds or is attempting to acquire the drlock.

The per-quad component 660 has a bit mask with one bit per processing unit (drl_spinmask) and counts of consecutive acquisitions and acquisition attempts (drl_onquadcnt). A bit set in the bit mask indicates the corresponding processing unit on the present quad holds or is attempting to acquire the lock. The count of consecutive acquisitions is used to prevent a quad from monopolizing the lock: after a certain number of consecutive acquisitions, the lock is passed off to some other quad, regardless of whether other processing units on the quad wish to acquire the lock. Alternatively, an implementation could use a certain time period instead of a number of consecutive acquisitions. Various other fields track pointers and values for administration of the lock, as explained in more detail below.

In the illustrated embodiments, the per-quad components are placed in memory local to the quad (i.e., memory not requiring remote access to another quad), so the processing units at a quad can spin on memory local to the quad. The data structures are dynamically allocated, to ensure the local memory arrangement. The first processing unit on a particular quad to attempt to acquire the lock will set the quad's bit in the global bit mask as well as the processing unit's bit in the per-quad bit mask. Subsequent processing units will see that the per-quad bit mask is non-zero, indicating that the subsequent processing units need not manipulate the global bit mask. Therefore, the arrangement avoids global memory accesses, except those used to manipulate the global bit mask and to pass the lock off from one quad to another.

If multiple locks are required, one such arrangement as shown in FIG. 12 is used for each lock. The illustrated implementation uses number of acquisitions, rather than elapsed time, to determine when the lock should be handed off to some other quad. An elapsed-time version would involve some modifications from the illustrated design. For example, the time the lock initially moves to a node could be recorded, subtracted from the current time and compared to a predetermined time value.

In FIG. 12, the global data structure 650 references three instances 660, 670, and 680 of the per-quad data structure. The global data structure (drlock_t) 650 fields are as follows:

TABLE 15

1. drlg_latch is the underlying spinlock. It is protected by the underlying atomic operations making up the standard locking primitives.
2. drlg_owner is the processing unit number of the processing unit currently holding the drlock if that processing unit used p_drlock( ) to acquire the drlock, or ANYENG if it instead used cp_drlock( ). This field is protected by drlg_latch.
3. drlg_pad1 is required on some architectures to prevent false sharing between drlg_spinmask and the first two fields. Some architectures may achieve better performance with these three fields sharing a common cache line, depending on the relative memory latencies and characteristics of the workload.
4. drlg_spinmask is a bit mask, with one bit per quad. Each bit, when set, indicates that the corresponding quad has at least one processing unit attempting to acquire or holding the spinlock. This field is protected by use of atomic operations.
5. drlg_pad2 is required on some architectures to prevent false sharing between drlg_spinmask and the drlg_quad fields. Again, some architectures may achieve better performance with these fields sharing a common cache line, depending on the relative memory latencies and characteristics of the workload.
6. Each drlg_quad[ ] array entry contains a pointer to the corresponding per-quad drlock_quad_t structure. In the illustration, this field is constant.

TABLE 16

1. drl_spinmask is a bit mask, with one bit per processing unit on the quad. Each bit, when set, indicates that the corresponding processing unit is attempting to acquire or is holding the spinlock. This field is protected by use of atomic operations.
2. drl_onquadcnt is the count of the number of consecutive times that the present quad has held the lock, or the value contained in drl_maxonquadcnt if none of the processing units on the present quad currently holds the lock and none have timed out on spinning, or greater than the value contained in drl_maxonquadcnt if some of the processing units on the present quad have timed out spinning and have now blocked on the semaphore indicated by drl_semid. This field is protected by use of atomic operations.
3. drl_lastonquadcnt contains the value that drl_onquadcnt contained when the processing unit on the present quad that currently holds the lock first acquired it. The value in this field enables a processing unit releasing the lock to determine whether to hand the lock off to another processing unit within the present quad, or to a processing unit in some other quad. This field is protected by drlg_latch.
4. drl_gbl contains a pointer to the global drlock_t structure 650. In the illustration, this field is constant.
5. drl_maxonquadcnt contains the maximum number of consecutive times that processing units on the present quad may hold the lock without attempting to pass the lock off to processing units on other quads. In the illustration, this field is constant.
6. drl_maxspins contains a value that limits the amount of time that a particular processing unit will spin when attempting to acquire the lock before their associated thread is blocked. Blocked threads are awakened when the lock is handed off from some other quad. In the illustration, this field is constant.
7. drl_quadno contains the quad ID corresponding to this drlock_quad_t. In the illustration, this field is constant.
8. drl_semid contains a reference to the semaphore that is blocked on when drl_maxspins is exceeded. In the illustration, this field is constant.

An implementation using elapsed time to determine when to hand the lock off could have another field in the drlock_quad_t indicating the time at which handoff should occur. The drl_onquadcnt and drl_lastonquadcnt fields would still be used in order to determine whether more processing units on a quad are still spinning directly on the underlying spinlock (drlg_latch).

In addition to the per-lock drlock_t 650 and drlock_quad_t structures 660, 670, and 680, there is also a per-processing unit drlock_cpu_t structure (also known as the drlc entry, not shown) that records various per-processing unit constants used by the drlock primitives. The fields are as follows:

TABLE 17

1. drlc_cpu: This processing unit's identifying number. Processing units are numbered consecutively starting at zero; however, the algorithms described in this embodiment could accommodate other numbering schemes.
2. drlc_cpubit: A bit mask with a bit set corresponding to this processing unit's position within a quad.
3. drlc_quad: This processing unit's quad's identifying number. Quads are numbered consecutively starting at zero, however, the algorithms described in this embodiment could accommodate other numbering schemes.
4. drlc_quadfirstCPU: The ID of the first processing unit within the present quad.
5. drlc_quadbit: Bit mask with a bit set corresponding to the present quad's position within the system.
6. drlc_quadpribit: Bit mask with bits set for [0:drlc_quad].
7. drlc_quadinvpribit: Bit mask for [drlc_quad + 1:Nquad−1], where Nquad is the number of quads in the system.
8. drlc_cpuinquad: The quantity (drlc_cpu−drlc_quadfirstCPU), or the position of this processing unit within its quad.
9. drlc_Nengine_quad: The number of processing units in the present quad.

There is an array of these per-processing unit structures called drlc (e.g., processing unit 5's structure may be accessed via drlc[5]). There is also an array of pointers to the per-processing unit structures for the first processing unit in each quad named drlcq (e.g., the structure corresponding to the second processing unit on the third quad may be accessed via drlcq[2][1]; processing units and quads are numbered starting from zero.) The per-processing unit structures are stored local to their related quad.

Basic Logic for Distributed Round-Robin Lock Scheme

Figure 13:
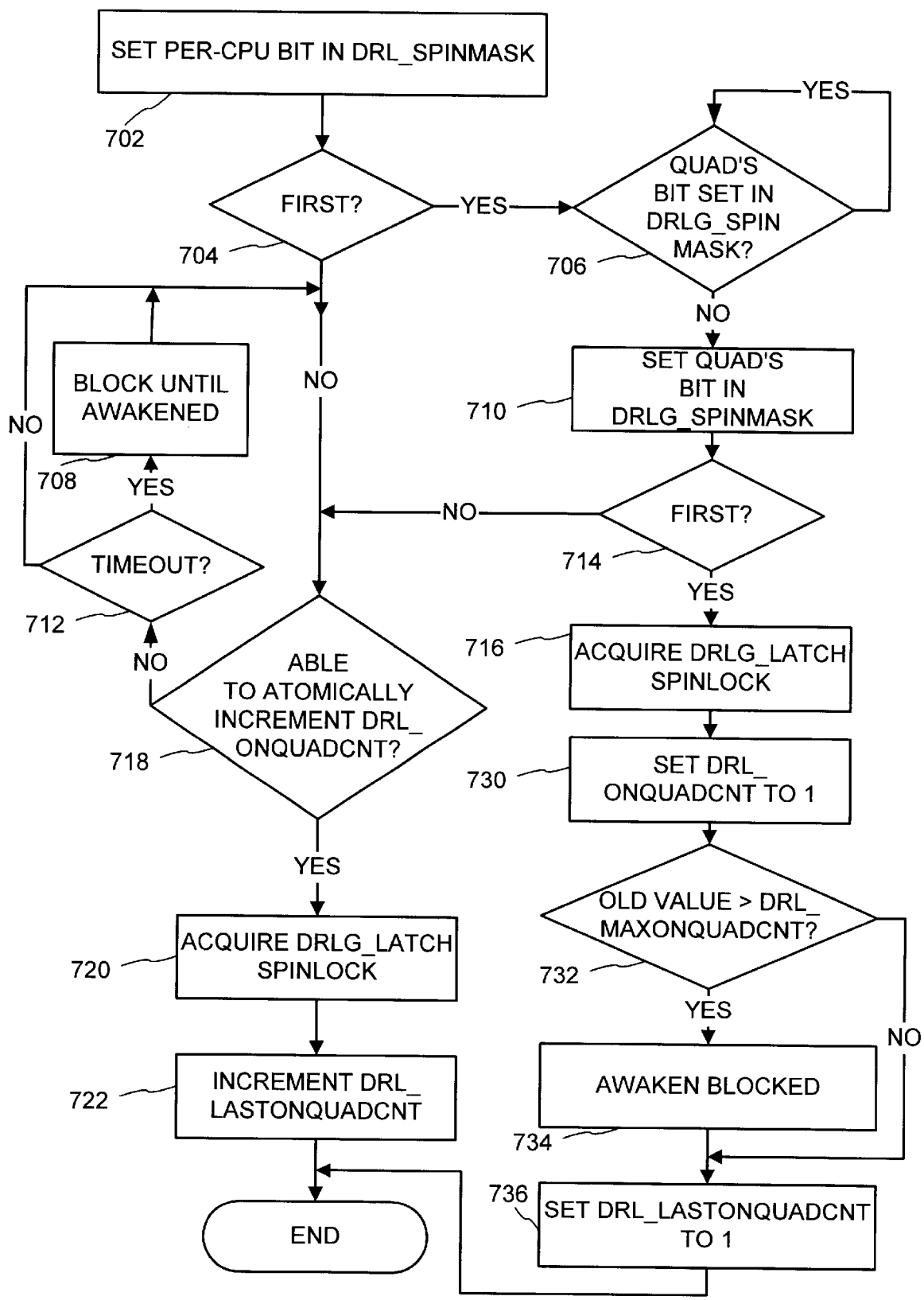
FIG. 13 is a flowchart showing the, general logic for acquiring a lock in a user-level distributed round-robin locking scheme.

A method in accordance with the invention for granting a lock (a p_drlock operation) in a lingering lock scheme with fairness control is illustrated generally in the flow chart of FIG. 13. The flow in an actual implementation would typically be varied, in order to account for races that can occur.

Upon invocation of the lock granting function, the per-CPU bit is set in drl_spin mask (step 702). Then it is determined if the processing unit is the first on the present quad to request the lock (step 704). If not, the processing unit spins on the lock (step 718). If so, the present quad's bit in the drlg_spinmask is checked until it is not set (step 706). Then, the present quad's bit is set in the drlg_spinmask (step 710). Another check is made to see if the processing unit is the first on the present quad to request the lock (step 714). If not, the processing unit spins on the lock (step 718). If so, the drlg_latch spinlock is acquired (716), drl_onquadcnt is set to 1 (step 730), and it is determined if the old value of drl_maxonquadcnt was over the maximum (step 732). If so, blocked threads are awakened (step 734). Then, the old number of spinners is set to 1 (step 736).

When spinning (step 718), the processing unit also determines whether a timeout is appropriate (step 712). If so, it blocks until awakened (step 708). The timeout is achieved by blocking when the number of spins exceeds a predetermined maximum number of spins (i.e., maxspins). When the spin ends having successfully acquired the lock (step 720), the processing unit increments drl_lastonquadcnt (step 722).

Figure 14:
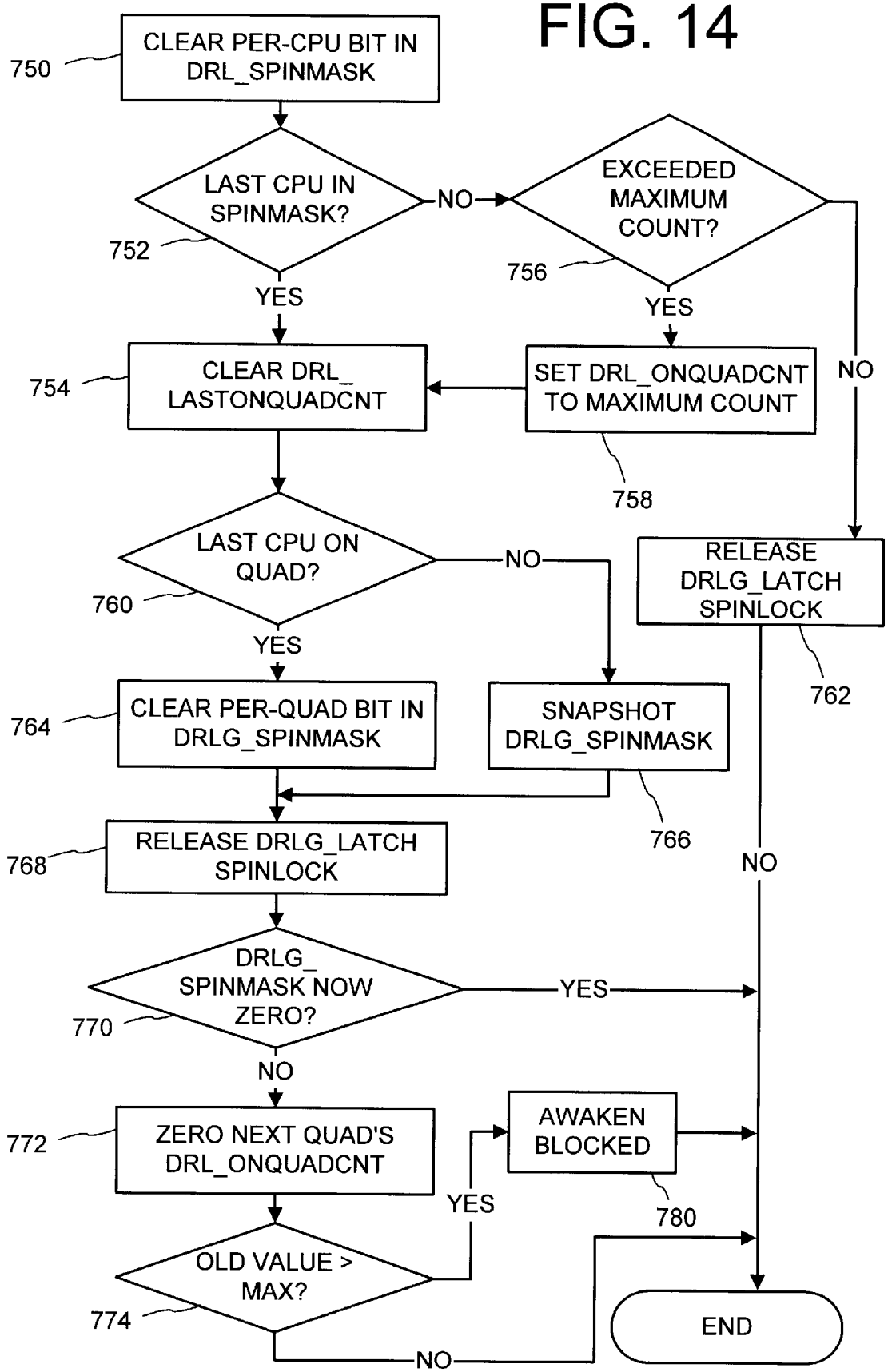
FIG. 14 is a flowchart showing the general logic for releasing a lock in a user-level distributed round-robin locking scheme.

A method in accordance with the invention for releasing a lock (a dr_drlock operation) in a lingering lock scheme with fairness control is illustrated generally in the flow chart of FIG. 14. The flow in an actual implementation would typically be varied, in order to account for races that can occur.

First, the processing unit clears the per-CPU bit in drl_spinmask (step 750). Then it is determined if the processing unit was the last processing unit in the spin mask. If not, the maximum count is checked (step 756). If exceeded, drl_onquadcnt is set to the maximum (step 758), and execution proceeds to step 754 as described in more detail below. If not exceeded, the drlg_latch spinlock is released (step 762).

If the processing unit was the last processing unit in the spin mask, drl_lastonquadcnt is cleared (step 754). Then it is determined if the processing unit was the last processing unit on the quad to be spinning on the lock (step 760). If not, a snapshot of drlg_spinmask is taken (step 766). If so, the per-quad bit in drlg_spinmask is cleared (step 764).

Then, the drlg_latch spinlock is released (step 768). Then the drlg_spinmask is checked to see if it is zero (step 770). If not, the next quad's drl_onquadcnt is zeroed (step 772), and the old value of drl_onquadcount is compared with the maximum value (step 774). If it was greater than the maximum count, blocked spinners are awakened (step 780).

Detailed Logic for Distributed Round-Robin Lock Scheme

The following describes pseudo-code accounting for races using the following locking primitives, including cp_drlock (conditionally acquire a lock), p_drlock (acquire a lock), and v_drlock (release a lock):

TABLE 18

| Function | Description |
| --- | --- |
| cp_drlock(drlock_t *drlg) | conditionally acquire a lock |
| p_drlock(drlock_t *drlg) | acquire a lock |
| v_drlock(drlock_t *drlg) | release a lock |
| v_drlock_wake(drlock_t *otherdrl, ulong_t n2wake) | Perform operations for p_drlock() and v_drlock() |
| drlock_alloc() | allocate structures |
| drlock_free(drlock_t *drlg) | free structures | cp_drlock: Conditionally Acquire a Lock

Conditionally acquiring a kqalock requires avoiding spinning waiting for the lock and avoiding irrevocably changing the state until it is clear the lock can be immediately acquired. The following pseudo-code performs the function:

TABLE 19 cp_drlock(drlock_t *drlg)
1. Set local variable drlcp to point to the drlc entry corresponding to the present processing unit (determined using ENG_NUM( )). Since TABLE 19-continued user processes may be moved from one processing unit to another at any time, it is important that this function access its processing unit number only this one time.
2. Set local variable drl to point to the drlock_quad_t structure corresponding to the present quad (drlg->drlg_quad[drlcp->drlc_quad]).
3. If the drl->drl_spinmask is zero, then no other processing unit on the present quad is currently spinning on or holding the lock. Therefore, conditionally acquire the underlying drlg_latch. If this succeeds, set the drlg->drlg_owner field to the special value ANYENG to indicate that we hold the latch without being queued up for it, and return TRUE.
4. Otherwise, we were unable to acquire the latch, so return FALSE.

p_drlock: Acquire a Lock

The following exemplary pseudo-code is optimized for extreme lock contention; therefore the low-contention acquisition and release are slightly slower to streamline the high-contention case. There is no fastpath for the low-contention case in the pseudo-code. The following pseudo-code performs the function:

TABLE 20 p_drlock(drlock_t *drlg)
1. Repeat the following steps to register this process at the drlock_quad_t level of the drlock:
   a) Set local variable drlcp to point to the drlc entry corresponding to the present processing unit. Since user processes may be moved from one processing unit to another at any time, it is important that this function access its processing unit number only this one time.
   b) Set local variable drl to point to the drlock_quad_t structure corresponding to the present quad (drlg->drlg_quad[drlcp->drlc_quad]).
   c) Set the local variable oldspinmask to drl->drl_spinmask. If this processing unit's bit is already set in this mask, block for a short time period; then restart this loop from the top.
   d) Otherwise, do an atomic compare and exchange with drl->drl_spinmask with oldspinmask bitwise or'ed with drlc->drlc_cpubit. If this succeeds, break out of the loop. Otherwise, restart this loop from the top.
2. If oldspinmask is zero, then no other processing unit on the present quad needs the lock. Attempt to acquire the underlying latch as follows:
   a) If the present quad's bit is already set in drlg->drlg_spinmask, spin waiting until it clears.
   b) Since we have set our processing unit's bit in the quad, no other process will be able to set the present quad's bit now that it is cleared. Therefore, atomically add the present quad's bit to drlg->drlg_spinmask. If the previous value of drlg->drlg_spinmask was zero, we are the only processing unit in the system currently trying for the lock, so acquire the underlying drlg->drlg_latch and update state as follows:
      i) Set drlg->drlg_owner to drlcp->drlc_cpu to indicate that we hold the latch.
      ii) Atomically set drl->drl_onquadcnt to 1, retaining the old value. If the old value was greater than the drl->drl_maxonquadcnt maximum, resolve a initialization race by invoking v_drlock_wake(drl, (oldonquadcnt-drl->drl_maxonquadcnt)).
      iii) Set drl->drl_lastonquadcnt to 1 and return to the caller.
3. If we get here, some other processing unit on some other quad is trying for or holding the lock. So set local variable spincnt to 0 and repeat the following steps:
   a) Set local variable oldonquadcnt to drl->drl_onquadcnt.
   b) Repeat the following steps as long as oldonquadcnt is greater than or equal to drl->drl_maxonquadcnt:
      i) Increment spincnt.
      ii) If spincnt is greater than drl->drl_maxspins, and if we successfully atomically compare-and-exchange drl->drl_onquadcnt, using oldonquadcnt as the old value and oldonquadcnt + 1 as the new value:
         (1) Block on drl->drl_semid.
         (2) We get here when awakened. Set spincnt to 0 and continue execution.
      iii) Set local variable oldonquadcnt to drl->drl_onquadcnt.
   c) If oldonquadcnt is less than drl->drl_maxonquadcnt (in other words, the present quad has not yet exceeded its quota of consecutive acquisitions), and if we successfully atomically compare-and-exchange drl->drl_onquadcnt using oldonquadcnt as the old value and oldonquadcnt + 1 as the

TABLE 20-continued new value, then break out of the loop.
4. Acquire the underlying drlg->drlg_latch.
5. Set drlg->drlg_owner to drlcp->drlc_cpu to indicate that we hold the latch.
6. Increment drl->drl_lastonquadcnt and return to the caller.

v_drlock: Release a Lock

The following exemplary pseudo-code is optimized for extreme lock contention; therefore the low-contention acquisition and release are slightly slower to streamline the high-contention case. There is no fastpath for the low-contention case in the pseudo-code. The following pseudo-code performs the function:

TABLE 21 v_drlock(drlock_t *drlg)
1. If drlg->drlg_owner is equal to ANYENG, then the lock was acquired via cp_drlock( ), so simply release drlg->drlg_latch and return without executing the following steps.
2. Set local variable drlcp to point to the drlc entry corresponding to the value of drlg->drlg_owner. Since user processes may be moved from one processing unit to another at any time, it is important that this function access its processing unit number only this one time.
3. Set local variable drl to point to the drlock_quad_t structure corresponding to the present quad (drlg->drlg_quad[drlcp->drlc_quad]).
4. Atomically subtract drlcp->drlc_cpubit from drl->drl_spinmask, placing the previous value into the local variable oldcpuspinmask.
5. If the present quad has not yet exceeded its quota of consecutive acquisitions (drl->drl_lastonquadcnt is less than drl->drl_maxonquadcnt), then attempt to hand off to another processing unit on the present quad:
   a) If oldcpuspinmask has bits set for other processing units on the present quad, set drlg->drlg_owner to ANYENG, release drlg->drlg_latch, and return without executing the following steps.
   b) Atomically assign the value of drl->drl_maxonquadcnt to drl->drl_onquadcnt in order to causse subsequent processing units on the present quad to wait until the lock is handed off to the present quad.
6. We get here if we cannot hand off to a processing unit on the present quad. Set drl->drl_lastonquadcnt to zero to initialize for the next round of activity on the present quad.
7. If no other processing unit on the present quad is trying for the lock, atomically remove the present quad's bit (drlcp->drlc_quadbit) from the global mask (drlg->drlg_spinmask), placing the new value of the global mask into the local variable nextquadspinmask. Otherwise, simply place the current value of the global mask into nextquadspinmask.
8. Release drlg->drlg_latch.
9. If nextquadspinmask is zero (in other words, if there are no quads with processing units trying to get the latch), simply return to the caller.
10. From the value in nextquadspinmask, determine the next quad in round-robin order that is trying to acquire the latch, and place that quad's ID in the local variable nextquad. Note that if no other quad is attempting to go for the lock, the current quad's ID will be chosen.
11. Set local variable otherdrl to point to the drlock_quad_t corresponding to nextquad (drlg->drlg_quad[nextquad]).
12. Atomically assign zero to otherdrl->drl_onquadcnt, placing the old value into the local variable oldonquadcnt.
13. If oldonquadcnt is greater than otherdrl->drl_maxonquadcnt, then some processing units on nextquad have blocked. Invoke v_drlock_wake (otherdrl, oldonquadcnt-otherdrl->drl_maxonquadcnt) to awaken them.
14. Return to the caller.

v_drlock wake

The following pseudo-code performs the function:

TABLE 22 v_drlock_wake(drlock_t *otherdrl, ulong_t n2wake)
1. Obtain the current value of the otherdrl->drl_semid semaphore and place it into local variable semctlret.
2. If semctlret plus n2wake is not greater than the number of processing units on the quad, set nwillwake to n2wake, otherwise, set nwillwake to the number of processing units on the quad minus semctlret.
3. Increment the otherdrl->drl_semid semaphore by nwillwake.

drlock_alloc

The following pseudo-code performs the function:

TABLE 23 drlock_alloc( )
1. Allocate a drlock_t, but return NULL if the allocation fails.
2. Initialize the drlock_t by setting drlg_latch to zero, drlg_spinmask to 0, and each of the entries of the drlg_quad array to NULL.
3. For each quad on the system, allocate a drlock_quad_t and set the corresponding drlg->drlg_quad element to point to it. If any of these allocations fail, free up all previous allocation, including that of the drlock_t, and return.
4. Initialize each drlock_quad_t by setting drl_spinmask to zero, drl_onquadcnt to DRL_MAXQUADCNT, drl_lastonquadcnt to DRL_MAXQUADCNT, drl_gbl to point to the drlock_t, drl_maxonquadcnt to DRL_MAXQUADCNT, drl_maxspins to DRL_MAXSPINS, and drl_quadno to the ID of the corresponding quad. In addition, allocate a semaphore and place its ID in drl_semid.
5. Return a pointer to the drlock_t.

drlock_free

The following pseudo-code performs the function:

TABLE 24 drlock_free(drlock_t *drlg)
1. Free each of the drlock_quad_t structures pointed to by the entries of the drlg_quad array, after first returning the semaphore indicated by each drl_semid field to the system.
2 Free the drlock_t.

Although the above pseudo code implements a round-robin lock scheme among the nodes while maintaining fairness control, the code could be modified to implement some other scheme (e.g., random among the nodes or first-come-first-served among the nodes).

Test Results

Figure 15:
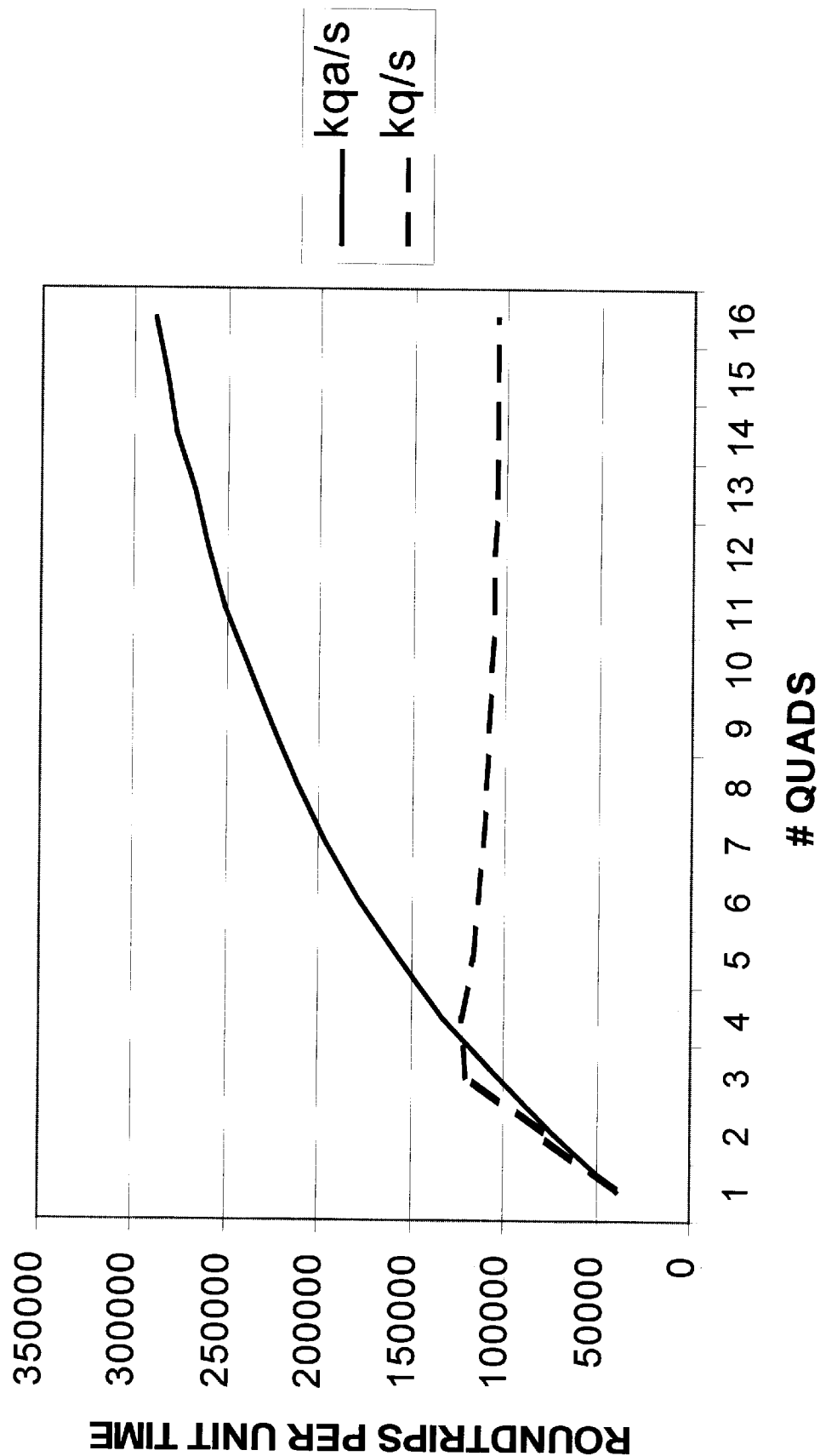
FIG. 15 is a chart showing test results comparing throughput for a traditional locking scheme and a lingering lock scheme.
Figure 16:
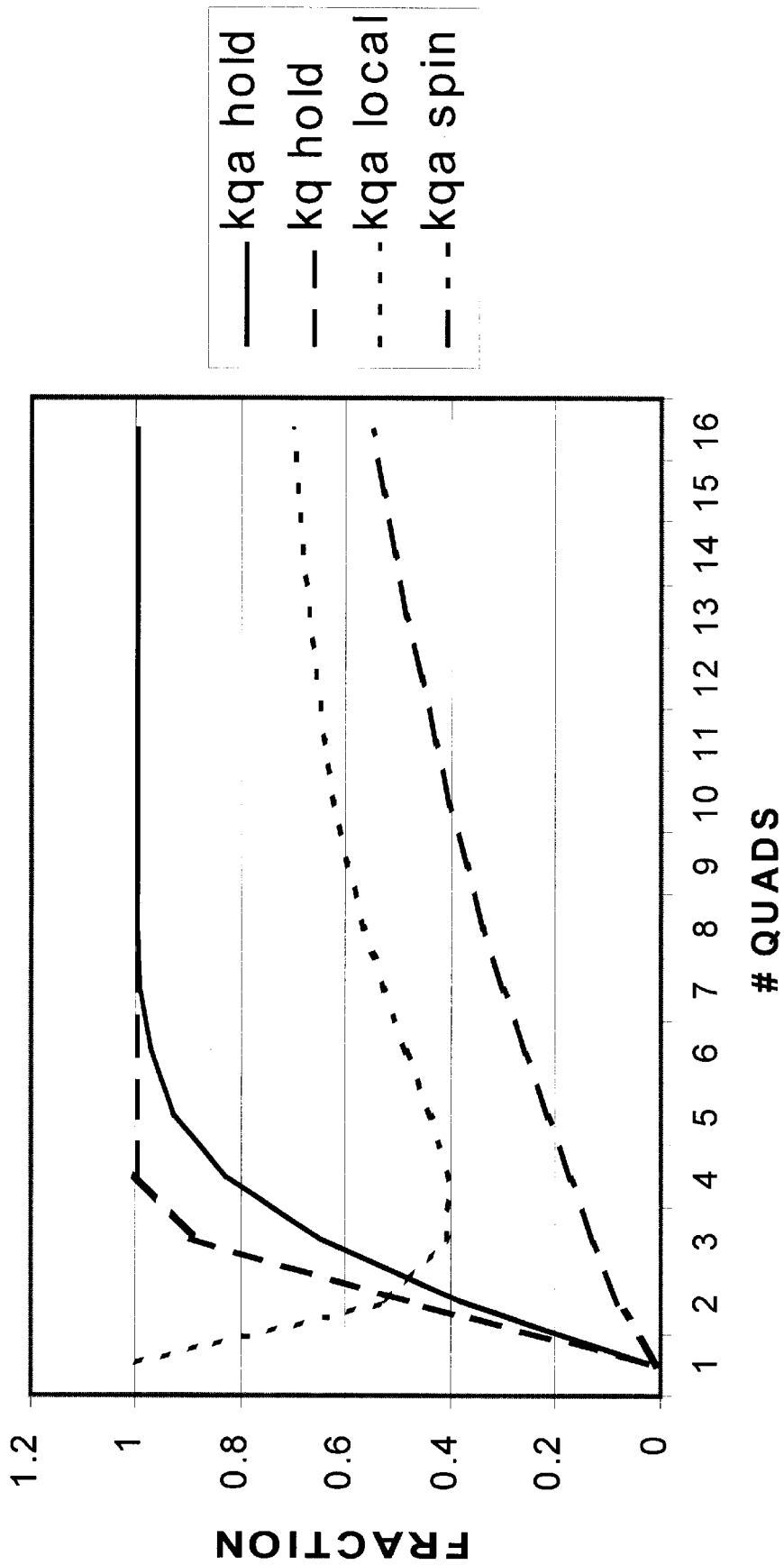
FIG. 16 is a chart showing test results comparing hold times and spin fractions for a traditional locking scheme and a lingering lock scheme.

FIGS. 15 and 16 show simulated test results comparing performance of a traditional first-come-first-served locking scheme (the kqlock scheme) and the lingering lock scheme with fairness control (the kqalock scheme).

FIG. 15 shows throughput for the: kqlock scheme compared to the kqalock scheme. The y axis shows the number of lock roundtrips per second, and the x axis shows the number of four processing unit nodes (quads) in a computer system. The kqalock scheme clearly outperforms the kqlock scheme in systems having five or more quads.

FIG. 16 shows hold times and spin fractions for the kqlock scheme compared to the kqalock scheme. The y axis shows the fraction (e.g., 1 equals 100%), and the x axis shows the number of four processing unit nodes (quads) in a computer system. "kqa hold" is the fraction of time the kqalock is held. "kq hold" is the fraction of time the kqlock is held. "kqa local" is the fraction of time that the kqalock is passed to another processing unit at the same quad as the previous holder. "kqa spin" is the fraction of aggregate system processing unit time spent spinning on the kqalock.

Having illustrated and described the principles of the invention in exemplary embodiments, it should be apparent to those skilled in the art that the illustrative embodiments can be modified in arrangement and detail without departing from such principles. For example, the invention may be used in other locking systems and for purposes for other than locking, such as providing related synchronization services. Some of the data structures can be alternatively implemented in a variety of ways. For example, the functionality of a linked list can be implemented in an array. Many of the software aspects of the embodiments may be implemented in hardware and many of the hardware aspects may be implemented in software. The steps shown in the flowcharts can be carried out in different orders that still perform the same way and achieve the same results. Finally, as pointed out earlier, the nodes of a computer for practicing the embodiments may have some number of processing units other than four (e.g., one or more). In view of the many possible embodiments to which the principles of the invention may be applied, it should be understood that the illustrative embodiments are intended to teach these principles and is not intended to be a limitation on the scope of the invention defined in the following claims. We therefore claim as our invention all that comes within the scope and spirit of these claims and their equivalents.

We claim:

1. In a computer having a number of interconnected nodes each having at least one processing unit, a method of keeping a lock at a node while maintaining fairness among the nodes, the method comprising:

providing a fairness control criterion;

tracking requests from processing units for a lock held by a processing unit at a first node; and when the lock is released by the processing unit at the first node, if there is an outstanding lock request by a processing unit at a second node and the fairness control criterion has been met, forcing the lock to the second node.

2. A computer-readable medium on which are stored computer instructions for executing the steps of claim 1.

3. The method of claim 1 wherein the fairness control criterion is one of the following:

the lock has been kept at the first node for more than a predetermined maximum number of consecutive grants;

the lock has been kept at the first node for longer than a predetermined time; and the lock has been released by a processing unit granted a last outstanding lock request in a set of lock requests grouped by node, wherein the set is limited to a predetermined size.

4. The method of claim 1 wherein forcing the lock to the second node comprises moving the lock to the second node in a round robin order, skipping nodes with no outstanding lock requests.

5. The method of claim 1 wherein the requests for the lock comprise conditional requests for the lock.

6. The method of claim 1 wherein the requests for the lock are grouped by associated node and stored in memory local to the associated node.

7. The method of claim 6 wherein the processing units spin on a data structure in the memory local to the associated node to determine when the lock is available.

8. In a computer having a number of interconnected nodes each having at least one processing unit, a method of keeping a lock at a node while maintaining fairness among the nodes, the method comprising:

tracking requests for the lock from requesting processing units by node;

when the lock is released by a processing unit at a first node, keeping the lock at the first node if there is an outstanding lock request from a processing unit residing at the first node; and overriding the keeping step by forcing the lock to a second node if there is an outstanding lock request by a processing unit residing at the second node and the lock has been kept at the first node for more than a predetermined number of consecutive grants.

9. The method of claim 8 further comprising:

when the lock moves to the processing unit at the first node, setting a consecutive grants value to indicate one consecutive grant at the first node, wherein the keeping step comprises adjusting the consecutive grants value to indicate an additional consecutive grant; and the overriding step determines when to force the lock to the second node by comparing the consecutive grants value and the predetermined number.

10. The method of claim 8 wherein a processing unit having an outstanding lock request spins on a variable local to the processing unit's node, the variable indicating to the processing unit whether the lock is available.

11. The method of claim 8 further comprising:

blocking a thread after the thread has spun on the lock for more than a predetermined amount of spin time; and unblocking the thread when the lock is made available to a processing unit at the node on which the thread was last spinning.

12. The method of claim 8 further comprising:

when processing units at the first node request the lock, checking a structure in memory local to the first node to determine if other processing units at the first node have outstanding lock requests; and if other processing units at the first node do not have outstanding lock requests, modifying the structure to indicate an unreleased lock request at the first node.

13. In a computer having a number of interconnected nodes each having at least one processing unit, a method of keeping a lock at a node while maintaining fairness among the nodes, the method comprising:

tracking requests for the lock from requesting processing units by node;

when the lock is released by a processing unit at a first node, keeping the lock at the first node if there is an outstanding lock request from a processing unit residing at the first node; and overriding the keeping step by forcing the lock to a second node if there is an outstanding lock request by the second node and the lock has been kept at the first node for more than a predetermined time.

14. In a computer having a number of interconnected nodes each having at least one processing unit, a method of keeping a lock at the nodes while maintaining fairness among the nodes, the method comprising:

grouping lock requests into sets by node;

when the lock is released by a processing unit at a first node, keeping the lock at the first node if there is an outstanding lock request from a processing unit residing at the first node; and overriding the keeping step by forcing the lock to a second node when releasing a last outstanding lock request in one of the sets.

15. The method of claim 14 wherein each of the sets is represented by a lock request data structure, the method further comprising:

before receiving any lock requests, preallocating in memory a number of lock request data structures sufficient to avoid allocating memory for a lock request data structure when a lock request is received.

16. The method of claim 14 further comprising:

if one of the received lock requests is passed by because a processing unit was interrupted when the lock became available, providing a passed by indication to the interrupted processing unit and reissuing the lock request.

17. The method of claim 14 wherein lock requests by an interrupted processing unit are not deemed to be outstanding lock requests.

18. In a computer having a number of interconnected nodes each having at least one processing unit, a method of keeping a lock at a specific node while maintaining fairness among the nodes by maintaining a queue of requests, the method comprising:

enqueuing a plurality of lock requests into the queue, each lock request originating from one of the processing units, wherein each processing unit is associated with a single node;

tracking from which node each lock request originates in the queue;

tracking the number of preemptive positions conferred for each node; and upon receiving a lock request from a requesting processing unit at a node for which a lock request already exists in the queue, conferring a preemptive position in the queue to the requesting processing unit if the number of preemptive positions conferred for the node does not exceed a predetermined number.

19. The method of claim 18 further comprising:

when the lock becomes available, ignoring a lock request having a preemptive position in the queue for an interrupted processing unit next in the queue.

20. In a computer having a number of interconnected nodes each having at least one processing unit, a method of keeping a lock requestable by the processing units at a node while maintaining fairness among the nodes by maintaining a queue of node queue elements with a head and a tail to track lock requests, each node queue element corresponding to one of the nodes, the method comprising:

if the lock is requested by a first processing unit when the lock is available and the queue is empty, granting the lock to the first processing unit and placing a node queue element in the queue corresponding to the node of the first processing unit;

if the lock is requested by a second processing unit when the lock is unavailable and the queue contains a node queue element corresponding to the second processing unit's node not used more than a predetermined maximum number of times, preemptively queuing the lock request at the node queue element and spinning the second processing unit on the element;

if the lock is requested by a third processing unit when the lock is unavailable and the queue does not contain a node queue element corresponding to the third processing unit's node not used more than a predetermined number of times, queuing a node queue element at the tail of the queue and spinning the third processing unit on the element;

when the lock becomes available and the queue has at least one node queue element on which at least one processing unit is spinning, modifying the node queue element at the head of the queue to indicate that the lock is available to processing units spinning on the node queue element at the head of the queue, thereby granting the lock to a processing unit at a node corresponding to the node queue element at the head of the queue; and when the lock is released by a releasing processing unit and a node queue element at the head of the queue indicates that no more processing units are spinning on the element, dequeueing the node queue element.

21. A computer-readable medium having stored thereon a data structure for tracking requests for a lock in a computer having a number of interconnected nodes each having at least one processing unit, the data structure comprising:

an ordered queue of spin state data structures with a head and a tail, each of the spin state data structures comprising:

an available field upon which requesting processing units can spin, indicative of when the lock is available;

a number-of-spinners field indicative of how many processing units are spinning on the spin state data structure; and a uses field indicative of how many times the spin state data structure has been used to acquire a position in the queue and limited to a predetermined number to enforce fairness among the nodes, wherein each spin state data structure is associated with one of the interconnected nodes, wherein the spin state data structure at the head of the queue indicates to which node the lock should be next granted if the number-of-spinners field is greater than zero; and a header structure facilitating management of the queue, the header structure comprising a reference to the head of the ordered queue, a reference to the tail of the queue, and a reference to a queue element, if any, for each of the interconnected nodes.

22. The computer-readable medium of claim 21 wherein the ordered queue contains more than one spin state data structure for a node, the first spin state data structure for the node having a uses field equal to the predetermined maximum, wherein the header structure refers to the last spin state data structure in the queue for the node.

23. The computer-readable medium of claim 21 wherein each of the spin state data structures is stored in memory local to the node associated with the spin state data structure, whereby processing units at the associated node can spin on the data structure by referencing memory local to the processing units.

24. The computer-readable medium of claim 21 wherein the spin state data structure further comprises:

a future references field indicative of how many references will be made to the spin state data structure at a future time, whereby it can be determined when the spin state data structure is to be deallocated.

25. The computer-readable medium of claim 24 wherein the spin state data structure further comprises:

an interrupted-spinners field indicative of how many unfulfilled lock requests using the spin state data structure have been interrupted, wherein the interrupted-spinners field is equal to the future references field minus the number-of-spinners field minus one.

26. A computer-readable medium having stored thereon a data structure for tracking requests for a lock in a computer having a number of interconnected nodes each having at least one processing unit, the data structure comprising:

a local structure for each node, the local structure comprising:
  a processing unit bit mask field comprising one bit per processing unit at the local structure's node, wherein each bit is set to indicate processing units acquiring the lock and nodes having processing units holding the lock;
  a spin state field indicating the number of consecutive times the local structure's node has held the lock if the lock is being held by a processing unit at the local structure's node, and indicating a maximum number of consecutive times if the lock is held by none of the processing units at the local structure's node, whereby at least one processing unit at the local structure's node can spin on the spin state field in order to acquire the lock;
  a previous spin state field indicating the value of the spin state field immediately before a processing unit at the local structure's node having the lock acquired the lock; and
  a pointer to a global structure shared by the nodes; and the global structure shared by the nodes, the global structure comprising:
    a latch value for indicating whether the lock is available;
    a field indicating whether the lock was conditionally acquired;
    a node bit mask field with one bit per node, wherein each bit is set to indicate nodes acquiring the lock and processing units holding the lock; and
    an array of pointers comprising a pointer for each node, the pointer pointing to the local structure for each node.

27. The computer-readable medium of claim 26 wherein the latch value is a lock available field for a simple spin lock encapsulated within the global structure to provide backwards compatibility.

28. The computer-readable medium of claim 26 wherein the local structure is stored in a location available locally to the local structure's node and remotely accessible to other nodes.

29. A computer-readable medium having stored thereon a data structure for tracking requests for a lock in a computer having a number of interconnected nodes each having at least one processing unit, the data structure associated with one of the nodes and able to be enqueued into an ordered list, the data structure comprising:

a number-of-spinners bitfield indicative of how many processing units are actively spinning on the data structure;

a number-of-uses bitfield indicative of how many times processing units have acquired a position in the ordered list with the data structure;

a lock available field indicative of when the lock is available to one of the processing units actively spinning on the data structure;

a number-of-references bitfield indicative of how many processing units require future access to the data structure; and a plurality of guard fields arranged within the data structure to guard underflows of at least two of the bitfields during atomic operations on the bitfields and the lock available field.

30. The computer-readable medium of claim 29 wherein the guard fields are positioned at locations adjacent to and more significant than the bitfields they guard.

31. The computer-readable medium of claim 30 further comprising:

an interrupted-spinners bitfield indicative of how many processing units have been interrupted while spinning on the data structure.

32. The computer-readable medium of claim 31 wherein the number-of-spinners bitfield is at a position more significant than the other bitfields in the data structure and a number-of-spinners underflow field is positioned adjacent to the number-of-spinners bitfield and at a most significant location in the data structure.

* * * * *